(12) United States Patent
McDonald et al.

(10) Patent No.: US 7,050,491 B2
(45) Date of Patent: May 23, 2006

(54) ADAPTIVE EQUALIZATION OF DIGITAL MODULATING SIGNAL RECOVERED FROM AMPLITUDE-MODULATED SIGNAL SUBJECT TO MULTIPATH

(76) Inventors: James Douglas McDonald, 2307 S. First St. # 304, Champaign, IL (US) 61820; Allen Le Roy Limberg, 2500 Lakevale Dr., Vienna, VA (US) 22181

( * ) Notice: Subject to any disclaimer, the term of this patent is extended or adjusted under 35 U.S.C. 154(b) by 744 days.

(21) Appl. No.: 10/271,386

(22) Filed: Oct. 15, 2002

(65) Prior Publication Data

US 2003/0072363 A1  Apr. 17, 2003

Related U.S. Application Data

(60) Provisional application No. 60/329,424, filed on Oct. 15, 2001.

(51) Int. Cl.
*H03H 7/30* (2006.01)
*H04B 1/10* (2006.01)
*H04B 7/02* (2006.01)
*H04B 1/38* (2006.01)

(52) U.S. Cl. ............ 375/232; 375/350; 375/267; 375/219

(58) Field of Classification Search ........ 375/267, 375/232, 350
See application file for complete search history.

(56) References Cited

U.S. PATENT DOCUMENTS

| | | | |
|---|---|---|---|
| 3,614,673 A | 10/1971 | Kang | |
| 4,027,258 A | 5/1977 | Perreault | |
| 5,065,242 A | 11/1991 | Dietrich et al. | |
| 5,251,033 A | 10/1993 | Anderson et al. | |
| 5,479,449 A | 12/1995 | Patel et al. | |
| 5,799,037 A | 8/1998 | Strolle et al. | |
| 6,377,312 B1 | 4/2002 | Limberg et al. | |

*Primary Examiner*—Khai Tran
*Assistant Examiner*—Cicely Ware

(57) ABSTRACT

An adaptive equalizer for amplitude-modulation (AM) signal received by over-the-air radio transmission comprises feed-forward finite-impulse-response (FIR) filtering and further comprises infinite-impulse-response (IIR) filtering for feeding back decisions. The echo content of baseband signal demodulated from the AM signal is measured for initially determining the reception channel impulse response (CIR) in the time-domain. Thereafter, the CIR is updated by decision feedback. Periodically, the CIR is normalized with respect to the strength of a cursor component thereof. The strengths of longer-delay post-echoes in the normalized CIR are used to determine the weighting coefficients of the IIR filtering, which suppresses the longer-delay post-echoes. The pre-echo and short-delay post-echo portion of the normalized CIR is convolved with the normalized CIR to generate a synthetic normalized CIR. The strengths of pre-echoes and short-delay post-echoes in the synthetic normalized CIR are used to determine the weighting coefficients of the feed-forward FIR filtering, which suppresses the pre-echoes and short-delay post-echoes.

20 Claims, 28 Drawing Sheets

ADAPTIVE EQUALIZATION OF DIGITAL MODULATING SIGNAL RECOVERED FROM AMPLITUDE-MODULATED SIGNAL SUBJECT TO MULTIPATH

This application is filed under 35 U.S.C. 111(a) claiming, pursuant to 35 U.S.C. 119(e)(1), benefit of the filing date of provisional U.S. patent application Ser. No. 60/329,424 filed Oct. 15, 2001, pursuant to 35 U.S.C. 111(b).

The invention relates to adaptive channel-equalization and echo-suppression filtering of digital modulating signal recovered from an amplitude-modulation signal, such as a broadcast digital television signal, that is subject to multipath distortion.

BACKGROUND OF THE INVENTION

The broadcasting of digital television (DTV) signal in the United States has been done in accordance with a Digital Television Standard published in 1995 by the Advanced Television Systems Committee (ATSC) as Document A/53. An eight-level digital modulating signal controls the generation of a vestigial-sideband (VSB) signal with a suppressed very-high-frequency (VHF) or ultra-high-frequency (UHF) natural carrier, which VSB signal is transmitted together with a fixed-amplitude pilot carrier corresponding in frequency and phase with the suppressed natural carrier. The channel through which this VSB signal is transmitted with accompanying pilot carrier from the radio-frequency transmitter through the ether to the receiver is apt to include a number of component paths. Presuming there is no intervening barrier to transmission, the shortest of these paths is a direct line-of-sight path. Usually the channel will comprise a number of longer paths that result from the reflection of transmitted signal from objects outside the line-of-sight path. Multipath reception is a condition occurring when the channel includes a number of different paths, more than one of which contains sufficient energy to affect the recovery of digital modulating signal at the receiver.

The component of the broadcast DTV signal to which a DTV receiver synchronizes its operations is called the principal signal, and the principal signal is usually the strongest component of the broadcast DTV signal. The direct line-of-sight path is usually the strongest component of the broadcast DTV signal, if the direct line-of-sight path is not blocked by any intervening barrier to transmission. Therefore, the multipath signal components of the broadcast TV signal received over other paths are usually delayed with respect to the principal signal and appear as lagging multipath signals. It is possible however, that the direct or shortest path signal is not the signal to which the receiver synchronizes. When the receiver synchronizes its operations to a (longer path) signal that is delayed respective to the direct signal, there will be a leading multipath component caused by the direct signal. There may also be other leading signals caused by other reflected signals of lesser delay than the signal to which the receiver synchronizes. In the DTV art the multipath components of received signal are customarily referred to as "echoes", because of their similarity to echoes in transmission lines that are terminated other than with their characteristic impedance. The leading multipath components are referred to as "pre-echoes", and the lagging multipath components are referred to as "post-echoes". The echoes vary in number, amplitude and delay time from location to location and from channel to channel at a given location. Post-echoes with significant energy have been reported as being delayed from the reference signal by as many as sixty microseconds. Pre-echoes with significant energy have been reported leading the reference signal by as many as thirty microseconds. Because of these variations in echo conditions adaptive filtering is used for suppressing multipath components other than the principal signal. Such an adaptive filter is commonly referred to as an "adaptive channel-equalization filter" or an "adaptive echo-suppression filter" or, more simply as an "adaptive equalizer" or "adaptive echo suppressor". In this specification adaptive filtering used for channel equalization and echo suppression will be referred to as "adaptive equalizer" or just "equalizer". The adaptive filtering is customarily digital filtering. The adaptive filtering can be performed on the IF DTV signal, if the IF DTV signal is digitized. However, in most designs the adaptive filtering is performed on the digital baseband DTV signal.

The approach generally followed in DTV receiver design is down-conversion of the radio-frequency (RF) DTV signal to an intermediate-frequency (IF) DTV signal and synchronous detection of the IF DTV signal to obtain a baseband DTV signal for application to the adaptive equalizer. In some designs the synchronous detection of the IF DTV signal is done in the analog regime, with the resulting analog baseband DTV signal being digitized for application to the adaptive equalizer. In other designs the IF DTV signal is digitized and synchronous detection of the digitized IF DTV signal is done in the digital regime, to generate the digital baseband DTV signal applied to the adaptive equalizer.

In some prior-art designs the adaptive equalizer is operative on a real-only baseband DTV signal. This signal is supplied from an in-phase synchronous detector that synchronously detects the IF DTV signal in accordance with a carrier that is synchronized with the suppressed carrier of the IF DTV signal and with the corresponding pilot carrier as converted to intermediate frequency. In many of these designs the real-only baseband DTV signal is sampled at twice Nyquist rate and the adaptive equalizer is of fractional type. In others of these designs, the adaptive equalizer is of synchronous type, with the real-only baseband DTV signal being subjected to a procedure known as phase-tracking before being sampled at Nyquist rate to supply input signal to the adaptive equalizer.

Other prior-art designs employ an adaptive equalizer that is complex in nature, being operative not only on a real component of baseband DTV signal supplied from an in-phase synchronous detector, but also on an imaginary component of baseband DTV signal supplied from an in-phase synchronous detector. J. D. McDonald and A. L. R. Limberg describe an alternative type of adaptive equalizer that is complex in nature in U.S. Pat. No. 6,975,689 issued 13 Dec. 2005 from application Ser. No. 09/823,500 filed 30 Mar. 2001. The patent and application are both titled "DIGITAL MODULATION SIGNAL RECEIVER WITH ADAPTIVE CHANNEL EQUALIZATION EMPLOYING DISCRETE FOURIER TRANSFORMS". In this alternative type of adaptive equalizer synchronous detection is performed nominally at −45° phasing and at +45° phasing respective to the suppressed carrier of the IF DTV signal. The adaptive equalizer has respective portions for equalizing the response of the synchronous detector detecting at a nominally −45° carrier phase and for equalizing the response of the synchronous detector detecting at a nominally +45° carrier phase. The responses of these two portions of the adaptive equalizer are additively combined to recover a real baseband DTV signal and are differentially combined to recover an imaginary baseband DTV signal. The imaginary baseband DTV signal is lowpass filtered to develop an automatic phase control (APC) signal for the carrier generator generating −45°-phase and +45°-phase carrier signals used by the synchronous detectors. The result of performing synchronous detection at −45° phasing is the negative of the result of performing synchronous detection at +135° phasing as described herein.

U.S. Pat. No. 5,065,242 titled "DEGHOSTING APPARATUS USING PSEUDORANDOM SEQUENCES" issued 23 Aug. 1994 to Charles Dietrich and Arthur Greenberg. Pat. No. 5,065,242 describes the computation of the weighting coefficients of adaptive filters used for deghosting analog DTV signals, which computation is based on measurements of the channel impulse response (CIR) made during the reception of triple-PN127 sequences in a vertical-retrace-interval scan line. U.S. Pat. No. 6,975,689 describes adaptive equalizers in which weighting coefficients of the equalization filters are calculated from discrete Fourier transforms (DFTs) of data. Earlier adaptive equalizers for DTV receivers used auto-regression techniques based on the detection of reception error for adjusting the weighting coefficients of the adaptive equalizer by reducing the gradient of departures of equalizer response from ideal transmission symbols. In a procedure that is novel, the DTV receivers described in this specification use the detection of reception error for updating an initial measurement of CIR to track current reception conditions. Periodically, the weighting coefficients of the equalization filters are re-calculated based on a strobe of the continually updated CIR.

The synchronization of DTV receiver operations to the principal signal has been a source of long-standing problems for receiver designers. These problems have to do with developing an echo-free baseband DTV signal that is optimally sampled at baud rate, so each successive symbol of the recovered digital modulating signal experiences as little intersymbol interference (ISI) from preceding or succeeding samples as possible when subjected to data slicing procedures. Constraining the baseband DTV signal to Nyquist bandwidth makes the elimination of ISI possible, providing correct symbol synchronization can be achieved. That is, data slicing requires that sampling of the echo-free baseband DTV signal at the baud rate of the symbols be done in the exact phasing that minimizes ISI.

U.S. Pat. No. 5,479,449 titled "DIGITAL VSB DETECTOR WITH BANDPASS PHASE TRACKER, AS FOR INCLUSION IN AN HDTV RECEIVER" issued 26 Dec. 1995 to C. B. Patel and A. L. R. Limberg. U.S. Pat. No. 5,479,449 describes a symbol synchronization procedure that adjusts digital oversampling of a baseband DTV signal to optimize phasing for decimation to Nyquist rate. The oversampling samples preceding peak oversampling samples are accumulated, the oversampling samples succeeding peak oversampling samples are accumulated, and the accumulation results are compared to determine whether the oversampling clock should be advanced or retarded in phase so peak samples recovered at Nyquist rate through decimation are optimally phased. S. U. H. Qureshi in his paper "Timing Recovery for Equalized Partial-Response Systems", IEEE TRANSACTIONS ON COMMUNICATIONS, December 1976, pp. 1326–1330 earlier described a similar method used for symbol synchronization of QAM signals. The adjustment of sample phasing moves the data-slicer window together with phasing of the Nyquist sample in these previously employed methods.

The DTV receivers described in this specification use a different method of symbol synchronization, in which the data-slicer window recurs at a predetermined phasing of the Nyquist sampling clock. A twice-Nyquist-rate sampling clock is determined from the symbol clock rate, as recovered by bright-line spectral recovery techniques. The digital baseband DTV signal is sampled in accordance with the twice-Nyquist-rate sampling clock. The oversampled digital baseband DTV signal is decimated by alternate sample selection techniques to generate two digital baseband DTV signals, each sampled at Nyquist rate by a sampling clock that is in staggered phasing with respect to the sampling clock of the other. These two digital baseband DTV signals, each sampled at Nyquist rate, are re-timed in accordance with the same Nyquist-rate sampling clock as will be used for data slicing and are then synchronously equalized independently of each other. The equalizer results are additively combined in preparation for data slicing, which additive combining is done in proportions subject to adjustment. The adjustment is made so that the additively combined equalizer results resample the synchronously equalized digital baseband DTV signal to be in temporal alignment with the data-slicer window that recurs at predetermined phasing of the Nyquist sampling clock. In effect, in DTV receivers described in this specification, the phase of the digital baseband DTV signal is adjusted vis-à-vis recurring data-slicer windows of predetermined phasing. This is done rather than following the practice in prior-art DTV receivers in which practice the data-slicer window is adjusted in phase to attempt to quantize the digital baseband DTV signal optimally.

SUMMARY OF THE INVENTION

The invention in various of its aspects is embodied in channel-equalization and echo-suppression filtering connected for processing successive samples of a demodulation signal resulting from demodulation of an amplitude-modulation signal descriptive of digital symbols occurring at a baud rate. The demodulation signal is subject to being accompanied by unwanted echoes because of the amplitude-modulation signal being received via a channel that at times has more than one length of propagation path therethrough. These unwanted echoes are to be suppressed in successive baud-rate samples of a baseband response of the channel-equalization and echo-suppression filtering to successive samples of the demodulation signal. The channel-equalization and echo-suppression filtering includes adaptive digital transversal filtering with adjustable weighting coefficients. The adaptive digital transversal filtering is connected for receiving as an input signal thereof successive samples of the demodulation signal and for supplying as an output signal thereof the response of the channel-equalization and echo-suppression filtering to those successive samples of the demodulation signal. The channel-equalization and echo-suppression filtering includes apparatus for determining an initial channel impulse response (CIR) that characterizes the reception channel in the time-domain, preferable forms of which apparatus are novel in the art. The channel-equalization and echo-suppression filtering includes apparatus for generating estimates of the digital modulation of the amplitude-modulation signal at the transmitter thereof and a reception error detector connected for generating a reception error signal responsive to the amount by which the baseband response of the channel-equalization and echo-suppression filtering differs from estimates of the digital modulation of the amplitude-modulation signal as originally transmitted. A filter coefficients computer for computing updated weighting coefficients for the adaptive digital transversal filtering by novel procedures is connected for receiving the initial CIR and the reception error signal. The filter coefficients computer is operable for continually updating the CIR responsive to said reception error signal, for periodically normalizing the CIR with respect to a principal component thereof to generate a periodically-updated normalized CIR, and for computing updated weighting coefficients for the adaptive digital transversal filtering from each periodically-updated normalized CIR.

BRIEF DESCRIPTION OF THE DRAWING

FIG. 22 or 23 is further modified to incorporate a Costas loop for carrier recovery.

DETAILED DESCRIPTION

Figure 1:
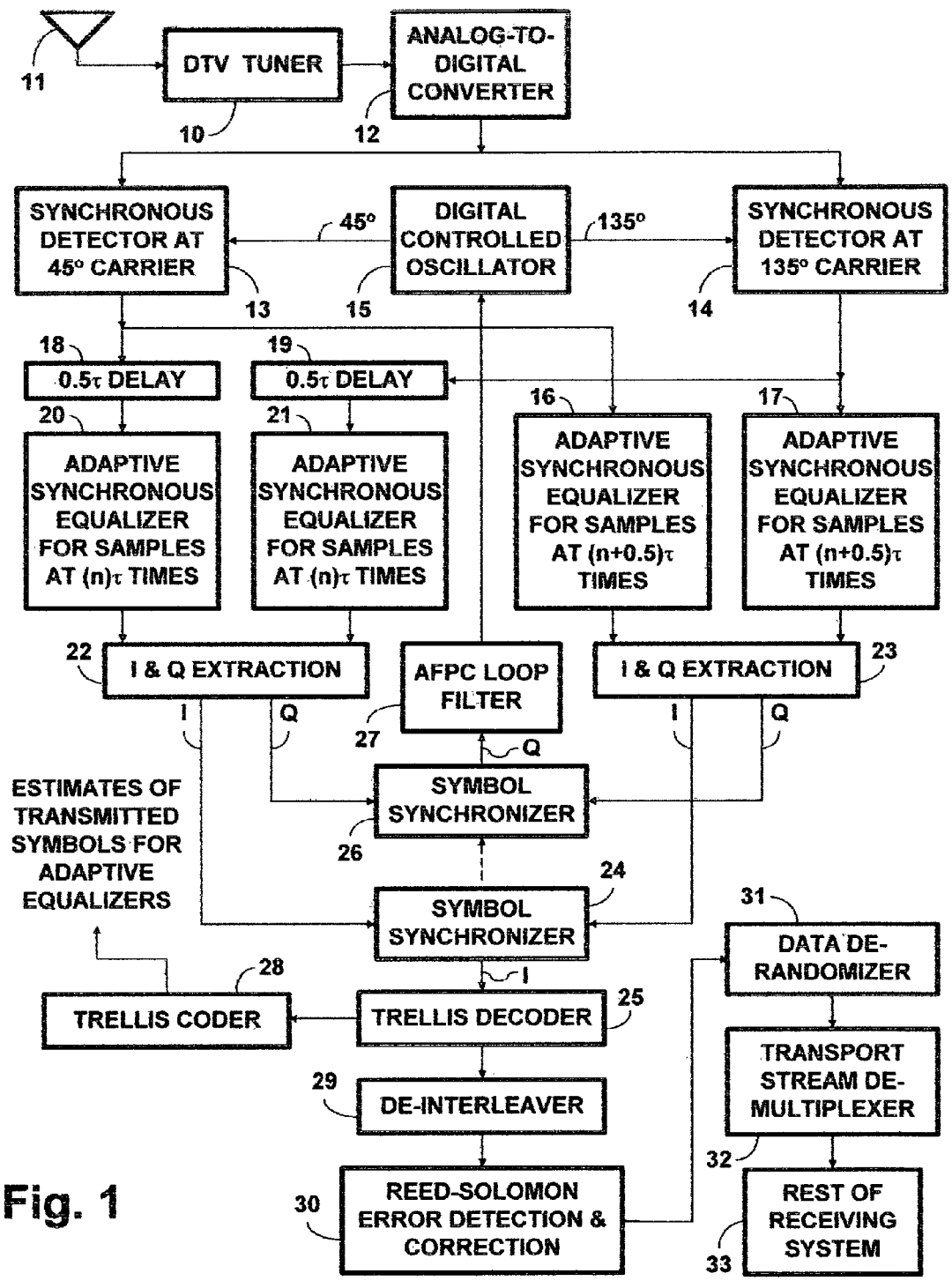
FIG. 1 is a schematic diagram of a DTV receiver in which the invention is embodied.

The FIG. 1 DTV receiver includes a tuner 10 connected for receiving radio-frequency (RF) DTV signals from a receiving antenna 11. The tuner 10 selects one of the RF DTV signals from the receiving antenna 11 or other source for conversion to an intermediate-frequency (IF) DTV signal. The tuner 10 provides gain for the selected RF DTV signal and for the IF DTV signal. The tuner 10 includes automatic gain control (AGC) that regulates the amplitude of the amplified IF DTV signal that the tuner 10 supplies to an analog-to-digital converter 12 as input signal thereto, so that the dynamic range of the ADC 12 is fully exploited. The ADC 12 samples the IF DTV signal at twice Nyquist rate and digitizes the samples to provide a digitized IF DTV signal, preferably one with at least 10 bits of resolution over full range of its response.

The ADC 12 is connected to apply digitized IF DTV signal as a respective input signal to each of two synchronous detectors 13 and 14, which perform respective synchronous detection procedures nominally at +45° phasing and at +135° phasing respective to the suppressed carrier of the IF DTV signal. In actual practice the two synchronous detectors 13 and 14 are usually constructed as parts of a shared structure including digital complex multiplier apparatus. The digitized IF DTV signal is supplied to a phase-splitter in this shared structure for conversion to a complex digital multiplicand for the digital complex multiplier apparatus. A digital controlled oscillator (DCO) 15 is connected for supplying the digital complex multiplier apparatus with a digital complex multiplier signal. This digital complex multiplier signal is composed of two digital carrier signals orthogonal in their respective phasings. Nominally, one of these two digital carrier signals is advanced 45° respective to the suppressed carrier of the digitized IF DTV signal, and the other of these two digital carrier signals is advanced 135° respective to tile suppressed carrier of the digitized IF DTV signal. The demodulation results for the synchronous detectors 13 and 14 are the real and imaginary components, respectively, of the complex product signal generated by the digital complex multiplier apparatus in their shared structure. The demodulation results for the synchronous detectors 13 and 14 are each composed of a set of samples of baseband DTV signals generated at twice Nyquist rate. Each of these sets of samples may be considered as consisting of interleaved subsets of Nyquist-rate samples, one subset occurring at $n\tau$ times and the other subset occurring at $(n+0.5)\tau$ times, n being all integer values and $\tau$ being the periodicity of Nyquist-rate samples. The samples of the baseband DTV signals from the synchronous detectors 13 and 14 occurring at $(n+0.5)\tau$ times are applied as input signals to adaptive equalizers 16 and 17, respectively, in a 2:1 decimation procedure. The samples of the baseband DTV signals from the synchronous detectors 13 and 14 are delayed $0.5\tau$ by re-clocking in shim delay circuitry 18 and 19, respectively. The re-clocked samples originally occurring at $n\tau$ times in the baseband DTV signals from the synchronous detectors 13 and 14 are applied as input signals to adaptive equalizers 20 and 21, respectively, in a 2:1 decimation procedure. The re-clocking in delay circuitry 18 and in delay circuitry 19 temporally aligns the subsets of samples occurring at $n\tau$ times in the synchronous detector 13 and synchronous detector 14 responses that are applied to the adaptive equalizers 20 and 21, respectively, with the subsets of samples occurring at $(n+0.5)\tau$ times in the synchronous detector 13 and synchronous detector 14 responses that are applied to the adaptive equalizers 16 and 17, respectively. The operations of the adaptive equalizers 16, 17, 20 and 21 will be explained in detail further on in this specification.

I-and-Q-extraction circuitry 22 combines the responses of the adaptive equalizers 20 and 21 to generate an equalized in-phase (I) real component and an equalized quadrature-phase (Q) imaginary component of a baseband DTV signal, as expressed in samples originally occurring at $n\tau$ times. In simplest form, the I-and-Q-extraction circuitry 22 is essentially just a digital adder and a digital subtractor. The digital adder additively combines the responses of the adaptive equalizers 20 and 21 to generate the equalized imaginary (Q) component of the baseband DTV signal, as expressed in samples originally occurring at $n\tau$ times. The digital subtractor differentially combines the responses of the adaptive equalizers 20 and 21 to generate the equalized real (I) component of the baseband DTV signal, as expressed in samples occurring at $n\tau$ times. In more sophisticated form, as described further on in this specification with reference to FIG. 4 of the drawing, the I-and-Q-extraction circuitry 22 is a de-rotator circuit.

I-and-Q-extraction circuitry 23 combines the responses of the adaptive equalizers 16 and 17 to generate an equalized in-phase (I) real component and an equalized quadrature-phase (Q) imaginary component of a baseband DTV signal, as expressed in samples originally occurring at $(n+0.5)\tau$ times. In simplest form, the I-and-Q-extraction circuitry 23 is essentially just a digital adder and a digital subtractor. The digital adder additively combines the responses of the adaptive equalizers 16 and 17 to generate the equalized imaginary (Q) component of the baseband DTV signal, as expressed in samples originally occurring at $(n+0.5)\tau$ times. The digital subtractor differentially combines the responses of the adaptive equalizers 16 and 17 to generate the equalized real (I) component of the baseband DTV signal, as expressed in samples occurring at $(n+0.5)\tau$ times. In more sophisticated form, as described further on in this specification with reference to FIG. 5 of the drawing, the I-and-Q-extraction circuitry 23 is a de-rotator circuit.

A symbol synchronizer 24 combines the equalized real (I) component of the baseband DTV signal, as expressed in samples originally occurring at $n\tau$ times, with the equalized real (I) component of the baseband DTV signal, as expressed in samples originally occurring at $(n+0.5)\tau$ times, to generate the equalized real (I) component of a baseband DTV signal applied to a subsequent trellis decoder 25. As will be explained in detail further on in this specification, the symbol synchronizer 24 combines the equalized real (I) components of the baseband DTV signal supplied from the I-and-Q-extraction circuitry 22 and from the I-and-Q-extraction circuitry 23 to generate the samples of the equalized real (I) component of baseband DTV signal applied to the trellis decoder 25, so those samples are timed to occur at $\tau$ intervals that minimize inter-symbol interference (ISI).

A symbol synchronizer 26 combines the equalized imaginary (Q) component of the baseband DTV signal, as expressed in samples occurring at $n\tau$ times, with the equalized imaginary (Q) component of the baseband DTV signal, as expressed in samples occurring at $(n+0.5)\tau$ times, to generate an equalized imaginary (Q) component of a baseband DTV signal with samples timed to occur at the same $\tau$ intervals as the samples from the symbol synchronizer 24. FIG. 1 shows (in dashed line) a control connection from the symbol synchronizer 24 to the symbol synchronizer 26 for timing the samples of the equalized imaginary (Q) component of the baseband DTV signal generated by the symbol synchronizer 26. These samples are supplied to an AFPC loop filter 27, which responds with an automatic-phase-and-frequency-control (AFPC) signal for the digital controlled oscillator 15. The AFPC loop formed by feeding back the AFPC signal to the DCO 15 is designed to control the phases of the orthogonal digital carrier signals to keep synchrodyning of the digitized IF signal by the synchronous detector 13 advanced 45° and to keep synchrodyning of the digitized IF signal by the synchronous detector 14 advanced 135°, as compared to the suppressed carrier of the digitized IF DTV signal.

More particularly, the AFPC loop filter 27 includes a digital lowpass filter that has a time constant of at least a few milliseconds. The time constant of the AFPC loop is made long enough that it does not affect the adaptive equalization processes in the equalizers 16, 17, 20 and 21 appreciably. This avoids the feedback loops associated with adaptation of the weighting coefficients of digital filters in the equalizers 16, 17, 20 and 21 being de-stabilized by the AFPC loop controlling the phases of demodulation. The long time constant of the AFPC loop filter 27 means that rapid change in carrier phase owing to dynamic multipath reception conditions will not be tracked by the DCO 15 oscillations. The AFPC loop for the DCO 15 functions primarily as an automatic frequency control (AFC) loop. The equalized I signals generated by the I-and-Q-extraction circuitry 22 and 23, however, do track changes in the amplitudes and phasing of spectral components that arise during dynamic multipath reception conditions, even rapid changes. So, the equalized I signal the symbol synchronizer 24 subsequently supplies to the trellis decoder 25 tracks those changes. The speed with which the weighting coefficients of the adaptive equalizers 16, 17, 20 and 21 can be adapted is determined primarily by the speed of the algorithms used for such adaptation. By design the oscillations from the DCO 15 are essentially of constant frequency and phase insofar as the adaptation of the weighting coefficients of the adaptive equalizers 16, 17, 20 and 21 is concerned.

Developing AFPC signal for the DCO 15 from equalized imaginary (Q) component of tie baseband DTV signal, rather than from an imaginary (Q) component of the baseband DTV signal before equalization, maintains the AFPC loop controlling the phases of demodulation under control of the principal component of received signal, rather than allowing it to be affected by variation in the other multipath components of received signal. Furthermore, if the component of received signal chosen as principal signal is changed with regard to computation of the equalized real (I) component of the baseband DTV signal, the newly chosen principal signal can immediately be used in the computation of the equalized quadrature (Q) component of the baseband DTV signal, with lessened discontinuity in the operation of the AFPC loop controlling the phases of demodulation.

A trellis coder 28 generates estimates of the transmitted symbols based on information it receives from the trellis decoder 25. These estimates of the transmitted symbols are used in the adaptation of the weighting coefficients of digital filters in the equalizers 16, 17, 20 and 21. This aspect of DTV receiver operation will be described in detail further on in this specification.

Otherwise, the operation of the FIG. 1 DTV receiver subsequent to the trellis decoder 25 can be substantially in accordance with prior-art practice, as described in "Guide to the Use of the ATSC Digital Television Standard" that the ATSC published in 1995 as Document A/54. The trellis decoder 25 performs a 12-phase symbol decoding procedure to recover data. A de-interleaver 29 is connected to receive the recovered data and to assemble them into bytes that are then convolutionally de-interleaved. Circuitry 30 for Reed-Solomon error detection and correction is connected to receive the de-interleaved bytes of data supplied from the de-interleaver 29. A data de-randomizer 31 is connected to receive the corrected data from the circuitry 30 and to supply de-randomized corrected data as a recovered transport stream to a transport stream de-multiplexer 32. The transport stream de-multiplexer 32 sorts packets from the transport stream to the rest 33 of the receiving system in accordance with packet identifier (PID) information in the data stream. The transport stream de-multiplexer 32 also discards data the circuitry 30 indicates could not be corrected.

Figure 2:
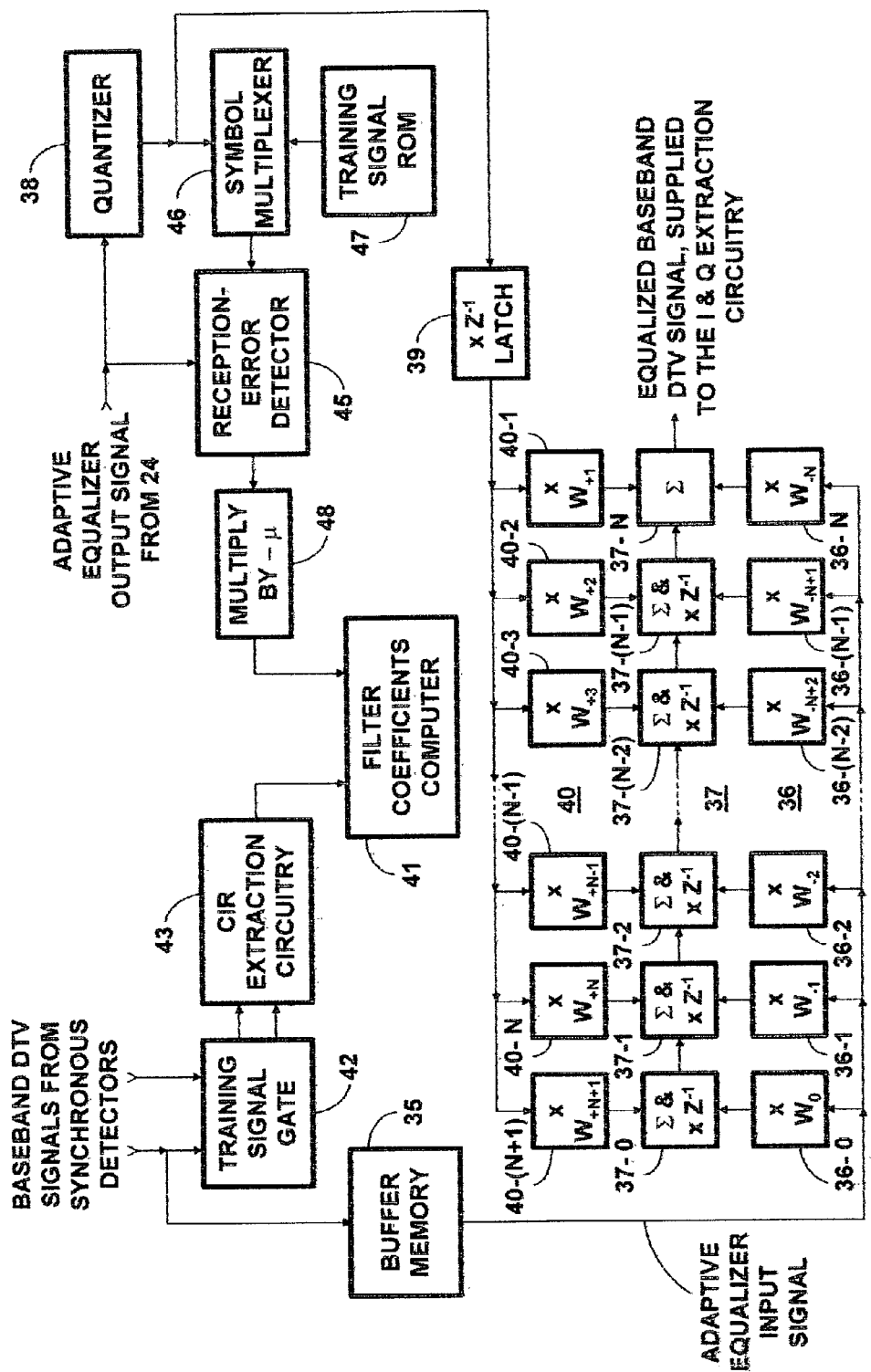
FIG. 2 is a schematic diagram of an adaptive equalizer useful for understanding how the adaptive equalizers in the FIG. 1 DTV receiver operate.

FIG. 2 is a schematic diagram of an adaptive equalizer structure useful in conceptualization of how the adaptive equalizers 16, 17, 20 and 21 can be operated. The baseband DTV signal supplied from the synchronous detector 13 or 14, as possibly delayed by shim delay circuitry 18 or 19, provides input signal to a buffer memory 35, which can temporarily store a few thousand symbol epochs of baseband DTV signal.

The adaptive equalizer configuration commonly used in prior-art adaptive equalizers cascades an infinite-impulse-response (IIR) digital filter for suppressing post-echoes after a finite-impulse-response (FIR) digital filter for suppressing pre-echoes. In a customary procedure known as "decision feedback", the response of the IIR filter is quantized before being weighted and fed back to be recursively combined with the FIR filter response that the IIR filter receives as input signal. The quantizing of the IIR filter response suppresses the growth of noise in the IIR filtering process. The suppression of a post-echo using an IIR filter does not generate unsuppressed repeats of the original post-echo.

The suppression of a pre-echo using an FIR filter does generate unsuppressed repeats of the original echoes, however. This comes about because the FIR filter output signal is a weighted summation of differentially delayed responses to the FIR filter input signal. The pre-echo component of a more-delayed response to the FIR filter input signal is suppressed by combining that response with an attenuated less-delayed response to the FIR filter input signal, rather than with an echo-free signal. So, the echoes of the attenuated less-delayed response to the FIR filter input signal appear in the FIR filter response.

Delayed baseband DTV signal supplied from the buffer memory 35 is the adaptive equalizer input signal applied as multiplicand input signal to a bank 36 of digital multipliers, which can be constructed in read-only memory so as to exhibit minimal delay. Digital multipliers 36-0, 36-1, 36-2, . . . 36-(N−2), 36-(N−1) and 36-N in the bank 36 weight the adaptive equalizer input signal by respective weights $W_0$, $W_{-1}$, $W_{-2}$, . . . $W_{-(N-2)}$, $W_{-(N-1)}$, and $W_{-N}$ to generate products applied as successive summands to a chain-of-adders register 37 formed from a plurality of adders, N in number. The adders 37-0, 37-1, 37-2, . . . 37-(N−2), and 37-(N−1) are successive clocked digital adders in the register 37, which adders together with a final unclocked digital adder 37-N form a tapped delay line for the variously weighted adaptive equalizer input signals. The bank 36 of multipliers and the chain-of-adders register 37 together function as an FIR digital filter for suppressing pre-echoes in the adder 37-N sum output signal that is the output signal of the adaptive equalizer.

FIG. 2 shows a quantizer 38 connected for quantizing the equalizer output signal supplied from the symbol synchronizer 24 to generate estimates of the symbols actually transmitted, and each successive symbol so estimated is temporarily stored in a sample latch 39. A single quantizer 38 can be shared by each of the adaptive equalizers 16, 17, 20 and 21. If ones of the adaptive equalizers 16, 17, 20 and 21 share a single quantizer 38, they can also share a sample latch 39 in common. The estimates of the symbols actually transmitted, as temporarily stored in the sample latch 39, are applied as multiplicand input signal to a bank 40 of digital multipliers, N+1 in number, which can be constructed in read-only memory so as to exhibit minimal delay. Digital multipliers 40-1, 40-2, 40-3, . . . 40-(N−1), 40-N and 40-(N+1) in the bank 40 weight the estimates of the symbols actually transmitted by respective weights $W_{+1}$, $W_{+2}$, $W_{+3}$, . . . $W_{+(N-1)}$, $W_{+N}$ and $W_{+(N+1)}$ for application to taps in the chain-of-adders register 37. These feedback connections complete an IIR digital filter configuration for the adder 37-N sum output signal. The adder 37-N sum output signal for the adaptive equalizer 16 or 17 is supplied to the I-and-Q-extraction circuitry 23, which supplies the in-phase signal component of the signal to the symbol synchronizer 24. The adder 37-N sum output signal for the adaptive equalizer 20 or 21 is supplied to the I-and-Q-extraction circuitry 22, which supplies the in-phase signal component of the signal to the symbol synchronizer 24. Completing the feedback connections for the IIR digital filter configuration through the chain-of-adders register 37 is a departure from common practice. This departure from common practice is advantageous because the IIR filter cancels more than just the post-echoes of the component of the adder 37-N sum output signal that results from the adaptive equalizer input signal weighted by $W_0$ and most delayed by the chain-of-adders register 37. (The adaptive equalizer input signal weighted by $W_0$ corresponds with the principal received signal component in the FIG. 2 adaptive equalizer response.) The IIR filter also cancels the post-echoes of the components of the adder 37-N sum output signal that result from the adaptive equalizer input signals weighted by $W_{-1}$, $W_{-2}$, . . . $W_{-(N-2)}$, $W_{-(N-1)}$, and $W_{-N}$ and that are less delayed by the chain-of-adders register 37. This significantly reduces the noise in the adder 37-N sum output signal when the transmission/reception channel is Rayleigh or is a Ricean channel with pronounced post-echo content. Only the pre-echoes of the components of the adder 37-N sum output signal that result from the adaptive equalizer input signal less delayed by the chain-of-adders register 37 survive to require additional FIR filtering for their suppression.

The IIR filtering done by the bank 40 of multipliers and the chain-of-adders register 37 is a non-linear filtering procedure owing to the samples in the adder 37-N sum output signal being quantized by the quantizer 38. These estimates of the symbols actually transmitted differ from the samples in the adder 37-N sum output signal in that these estimates are essentially free of digitized noise components, such as Johnson noise and lower energy multipath responses. The sample latch 39 could be used to feed back the adder 37-N sum output signal in a linear IIR filtering procedure, rather than feeding back quantized adder 37-N sum output signal in a non-linear filtering procedure. However, the adaptive-equalizer output signal supplied as adder 37-N sum output signal exhibits less noise using the non-linear filtering procedure.

The adaptive equalizers 16, 17, 20 and 21 share a weighting coefficients computer 41, a training signal gate 42, CIR extraction circuitry 43, a reception-error detector 45, a symbol multiplexer 46, a read-only memory 47 for training signal, and digital multiplier circuitry 48. The weighting coefficients computer 41 computes the weighting coefficients $W_0, W_{-1}, W_{-2}, \ldots W_{-(N-2)}, W_{-(N-1)}$, and $W_{-N}$ that the digital multipliers 36-0, 36-1, 36-2, . . . 36-(N−2), 36-(N−1) and 36-N respectively use as their multiplier input signals. The weighting coefficients computer 41 also computes the weighting Coefficients $W_{+1}, W_{+2}, W_{+3}, \ldots W_{+(N-1)}, W_{+N}$ and $W_{+(N+1)}$ that the digital multipliers 40-1, 40-2, 40-3, . . . 40-(N−1), 40-N and 40-(N+1) respectively use as their multiplier input signals. The initial values of these weighting coefficients are determined in reliance upon training signal information contained in the baseband DTV signal.

FIG. 2 shows a training signal gate 42 connected for selecting to CIR extraction circuitry 43 the training signal portions of the baseband DTV signals that the synchronous detectors 13 and 14 supply. The CIR extraction circuitry 43 extracts a complex transmission/reception channel impulse response (CIR) in the time-domain from these training signal portions selected by the training signal gate 42. Initial values of the weighting coefficients applied to the set of samples processed by a particular adaptive equalizer are determined from the component of this complex CIR extracted from the training signal portion of its baseband DTV input signal.

By way of example, in a DTV signal transmitted in accordance with the A/53 standard, the training signal gate 42 selects at least the PN511 sequence of the initial data segment of each data field to the CIR extraction circuitry 43. The CIR is forwarded from the CIR extraction circuitry 43 to the weighting coefficients computer 41, which temporarily stores the CIR in an echo measurement register. A component of the temporarily stored CIR provides the basis for initializing the weighting coefficients of the FIG. 2 adaptive equalizer, if a new transmission/reception channel is selected by the DTV tuner 10 of FIG. 1, or for re-initializing the weighting coefficients of the FIG. 2 adaptive equalizer, if tracking of dynamic multipath conditions is lost.

After initialization or re-initialization is completed, the computer 41 computes incremental adjustments to be made to the weighting coefficients used by the banks 36 and 40 of digital multipliers. The memory 35 delays the baseband DTV signal supplied from the synchronous detector for application as adaptive equalizer input signal. The delay is somewhat longer than the time for the weighting coefficients of the FIG. 2 adaptive equalizer to be initialized or re-initialized responsive to the CIR extracted from a training signal portion of the DTV baseband signal input to the memory 35. This delay permits the same training signal used for initialization or re-initialization to be supplied as a string of known symbols to the FIG. 2 adaptive equalizer after it has been initialized or re-initialized. This string of known symbols generates reception-error signals with a high confidence factor for the filter coefficients computer 41, facilitating more rapid adjustment of any errors in the adaptive-equalizer weighting coefficients remnant after initialization or re-initialization.

More particularly, the memory 35 can temporarily store a sequence of samples from the final data segment of a data field and from the initial data segment of the next data field for recycling through the adaptive equalizer. If multipath reception conditions are slowly changing, this two-segment sequence can, be recycled through the adaptive equalizer not just once, but 156 times in a data field. This practice speeds up Wiener adaptation on the known DFS sequence appreciably, compared with Wiener adaptation relying on the known DFS sequence being available once per data field.

The in-phase adaptive equalizer output signal from the symbol synchronizer 24 is supplied to the reception-error detector 45. The reception-error detector 45 is a digital subtractor that subtracts estimates of the originally transmitted data symbols supplied by the symbol multiplexer 46 from the in-phase adaptive equalizer output signal supplied by the symbol synchronizer 24. The resulting difference is a reception-error signal, which the digital multiplier circuitry 48 multiplies by factor $-\mu$ to generate an incremental reception-error signal supplied to the weighting coefficients computer 41. The number $\mu$ is customarily a small binary fraction.

During times the adaptive equalizer output signal responds to training signal portions of the delayed baseband DTV signal, the symbol multiplexer 46 selects samples of ideal training signal from the ROM 47 to the reception-error detector 45. Then, the reception-error detector 45 generates a reception-error signal by differentially comparing the adaptive equalizer output signal with the samples of the ideal training signal from the ROM 47. The digital multiplier 48 multiplies the reception-error signal by a negative multiplier signal, $-\mu$, and is connected for supplying the resulting product to the weighting coefficients computer 41 as an incremental reception-error signal. The value $\mu$ is a scaling coefficient much less than unity.

At all other times, the symbol multiplexer 46 selects the response of the quantizer 38 to the reception-error detector 45 to provide the estimates of the originally transmitted data symbols. At these times the reception-error detector 45 functions as a decision-feedback-error detector. Then, the reception-error detector 45 generates a reception-error signal by differentially comparing the adaptive equalizer output signal with those estimates of the originally transmitted data symbols. The digital multiplier 48 multiplies the reception-error signal by the negative multiplier signal, $-\mu$, and is connected for supplying the product signal to the weighting coefficients computer 41 as an incremental reception-error signal when training signal is not currently available.

The computer 41 is of a type for processing the incremental reception-error signal supplied from the digital multiplier 48 in accordance with known auto-regression techniques to compute incremental adjustments to be made to the weighting coefficients used as multiplier input signals by the banks 36 and 40 of digital multipliers. In accordance with ordinary practice, the computer 41 ascribes a higher confidence factor to samples of the reception-error signal generated by differentially comparing the adaptive equalizer output signal with the samples of the ideal training signal than the confidence factor the computer 41 ascribes to samples of the reception-error signal generated by differentially comparing the adaptive equalizer output signal with the estimates of the originally transmitted data symbols. However, in a departure from prior art practice the incremental adjustments are not made to the weighting coefficients $W_0$, $W_{-1}$, $W_{-2}$, ... $W_{-(N-2)}$, $W_{-(N-1)}$, and $W_{-N}$ that the digital multipliers 36-0, 36-1, 36-2, ... 36-(N−2), 36-(N−1) and 36-N respectively use as their multiplier input signals nor to the weighting coefficients $W_{+1}$, $W_{+2}$, $W_{+3}$, ... $W_{+(N-1)}$, $W_{+N}$ and $W_{+(N+1)}$ that the digital multipliers 40-1, 40-2, 40-3, ... 40-(N−1), 40-N and 40-(N+1) respectively use as their multiplier input signals. Instead, incremental adjustments are made to update the measured CIR, so the update CIR tracks current reception conditions. Periodically, the continuously updated CIR is strobed; and the weighting coefficients $W_0$, $W_{-1}$, $W_{-2}$, ... $W_{-(N-2)}$, $W_{-(N-1)}$, $W_{-N}$ and weighting coefficients $W_{+1}$, $W_{+2}$, $W_{-3}$, ... $W_{+(N-1)}$, $W_{+N}$ $W_{+(N+1)}$ are re-calculated based on the strobed CIR.

Figure 3:
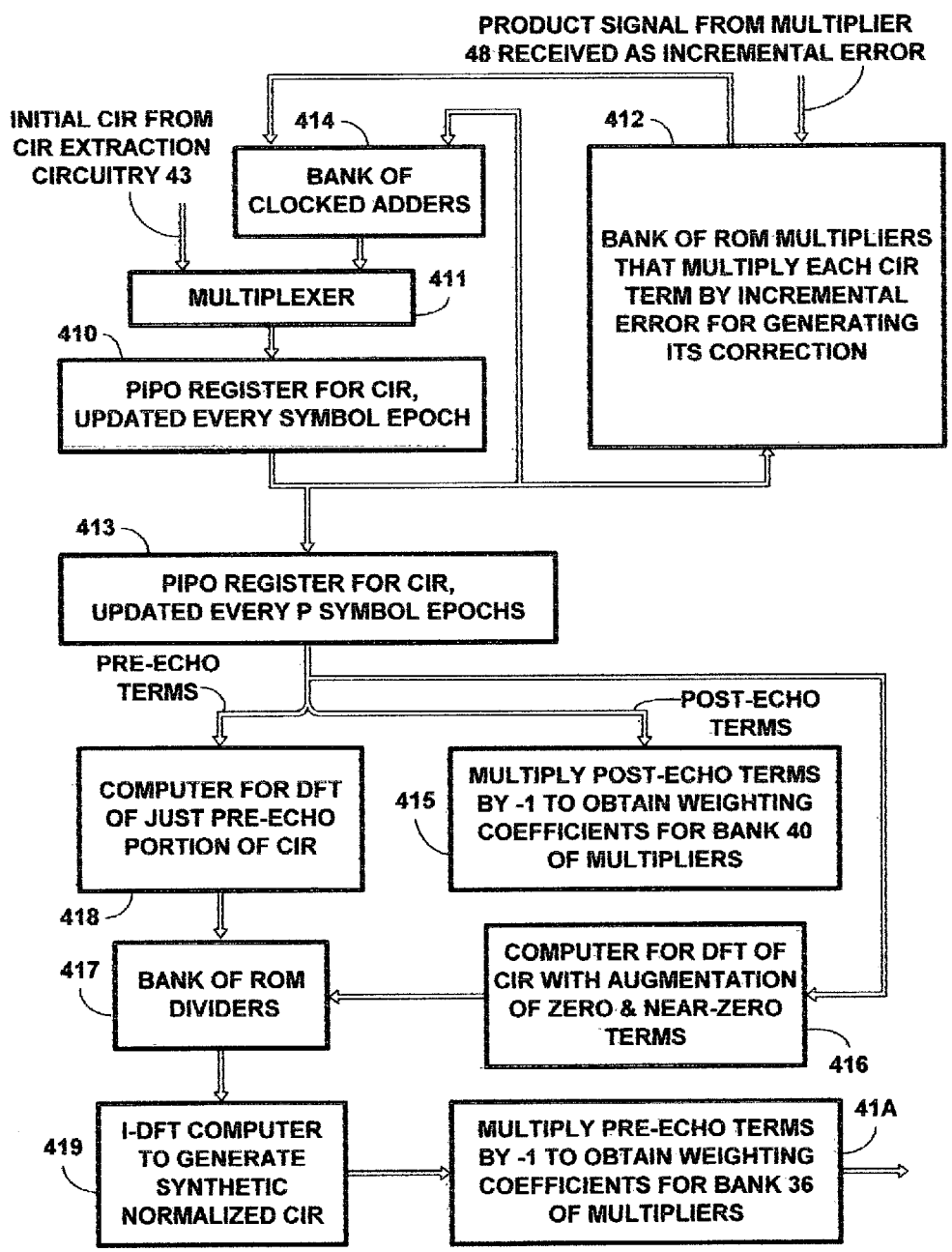
FIG. 3 is a schematic diagram showing details of circuitry in the filter coefficients computer of the FIG. 2 adaptive equalizer.

FIG. 3 depicts the filter coefficients computer 41 in detail. A CIR register 410 in the filter coefficients computer 41 stores the cepstrum—i.e., the transmission/reception channel impulse response in the time domain. This channel impulse response or CIR temporarily stored in the CIR register 410 is continually updated. Every P symbol epochs the CIR stored in the CIR register 410 at that time is used as the basis for generating a normalized CIR, in which the principal multipath component, or "cursor" component has +1 value.

FIG. 3 shows the CIR register 410 as a parallel-in, parallel-out (PIPO) register, the parallel loading of which is done via a multiplexer 411. The CIR register 410 is commanded to clear its previous contents and load new contents, in an overwrite procedure which is done for each symbol processed by the FIG. 2 adaptive synchronous equalizer. Near the conclusion of a data field when a new DTV channel is first received or when adaptive equalizer tracking is lost, the multiplexer 411 is conditioned to reproduce the CIR supplied from the FIG. 2 CIR extraction circuitry 43, for parallel loading into the cleared CIR register 410. Then, a bank 412 of read-only-memory multipliers multiplies each of the terms of the CIR temporarily stored in the CIR register 410 by the reciprocal of the amplitude of the principal "cursor" term to generate a normalized CIR that is loaded into another parallel-in, parallel-out (PIPO) register 413.

Thereafter, each symbol processed by the FIG. 2 adaptive synchronous equalizer for the next P symbol epochs is analyzed by the reception-error detector 45 to generate estimated error in each successive symbol. Circuitry 48 multiplies the estimated reception error in each successive symbol by an attenuation factor $-\mu$ to generate a factor that the bank 412 of ROM multipliers uses to multiply each term of the CIR stored in the CIR register 410. This generates a respective incremental correction that will be used for updating the CIR temporarily stored in the CIR register 410. Each of the terms of the CIR temporarily stored in the CIR register 410 and its incremental correction is supplied to a respective one of a bank 414 of clocked digital adders. The multiplexer 411 is conditioned to reproduce the sum output terms clocked forward from the bank 414 of digital adders, for accumulating the previous contents of the CIR register 410 with respective incremental corrections to update those previous contents.

Every P symbol epochs, in a step carried out between clock signals for the bank 414 of clocked digital adders, the bank 412 of read-only-memory multipliers multiplies each of the terms of the CIR then temporarily stored in the CIR register 410 by the reciprocal of the amplitude of the principal "cursor" term. This generates a normalized CIR that is loaded into the parallel-in, parallel-out (PIPO) register 413 for updating its contents. P is a number at least a few hundred and preferably not appreciably larger than half the number of terms in the discrete Fourier transforms that the filter coefficients computer 41 employs in its computation procedures. P is conveniently made equal to 832, since this facilitates comparing the CIR stored in the CIR register 414 at the beginning of a data field with the CIR extracted by the CIR extraction circuitry 43. This comparison can be used as a basis for deciding whether or not the weighting coefficients in the FIG. 2 adaptive equalizer should be re-initialized.

With a P of 832, the speed of tracking dynamic multipath conditions is faster than is generally needed. Larger values of P reduce processing speeds and conserve power. The A/53 data field has 313 data segments of 832 symbols. Since 313 is prime, P cannot be made a multiple of 832. However, supposing 4096-term DFTs are employed, P can be made 4 times 313, or 1252, to facilitate the CIR stored in the CIR register 414 at the beginning of a data field being compared on regular interval with the CIR extracted by the CIR extraction circuitry 43. With slight risk of wrap-around effects in the DFTs, P may instead be made 8 times 313, or 2504. The A/53 Digital Television Standard could be modified to specify a larger number of data segments per data field in order to accommodate a longer training signal. If the A/53 data field were extended to an even number of data segments, then, supposing 4096-term DFTs are employed, P would conveniently be made twice 832, or 1664, to facilitate CIR comparisons being made regularly each data field. If the A/53 data field were extended to 315 data segments to accommodate a longer training signal, then, supposing 4096-term DFTs are employed, P could be made thrice 832, or 2496, to facilitate CIR comparisons being made regularly each data field.

The cursor term of the CIR temporarily stored in the CIR register 413 is applied as a $W_0$ weighting coefficient to the multiplier 37-0 in FIG. 2 and to the I-and-Q-extraction circuitry 22 or 23 of FIG. 1. The post-echo terms of the CIR temporarily stored in the CIR register 413 are multiplied by minus one in circuitry 415. This generates the weighting coefficients $W_{+1}$, $W_{+2}$, $W_{+3}$, ... $W_{+(N-1)}$, $W_{+N}$ and $W_{+(N+1)}$ that the digital multipliers 40-1, 40-2, 40-3, ... 40-(N−1), 40-N and 40-(N+1) respectively use as their multiplier input signals. The IIR filtering performed by the chain-of-adders register 37 and the bank 40 of digital multipliers cancels all post-echoes, but pre-echoes remain to be suppressed by FIR filtering performed by the bank 36 of digital multipliers and the chain-of-adders register 37.

The problem is that the signals being differentially combined to cancel pre-echoes themselves are subject to pre-echoes of succeeding signals being included within them, rather than being echo-free. So the pre-echo terms of each CIR temporarily stored in the CIR register 413 cannot simply multiplied by minus unity for generating weights $W_{-1}$, $W_{-2}$, ... $W_{-(N-2)}$, $W_{-(N-1)}$, and $W_{-N}$ to be applied as multiplier input signals to the digital multipliers 36-1, 36-2, ... 36-(N−2), 36-(N−1) and 36-N, respectively, in the FIG. 2 bank 36 of ROM multipliers. The errors in such procedure are more pronounced if there is a larger number of echoes of substantial energy in the received DTV signal. The effect of these pre-echoes of succeeding signals is removed in accordance with an aspect of the invention. In this aspect of the invention the CIR is used to generate the deconvolution result for a DTV signal transmitted with flat frequency response and received through the actual transmission/reception channel. Incidentally, this deconvolution result generates the terms of an impulse response descriptive of an FIR filter that accounts for the echo-suppression components including post-echoes of preceding signals and pre-echoes of succeeding signals. While an FIR filter of this type could be employed as equalizer, the FIG. 2 adaptive equalizer uses an IIR filter to cancel the post-echoes of preceding signals using quantized equalizer response, which reduces noise in the equalizer response and improves stability of the IIR filter recursion loop. So, this deconvolution result that accounts for the echo-suppression components including post-echoes of preceding signals and pre-echoes of succeeding signals is convolved with the pre-echo only portion of the CIR. This convolution synthesizes the terms of a "synthetic" normalized CIR that accounts for the echo-suppression components including pre-echoes of succeeding signals, but being free of post-echoes. The calculation of the impulse response of the FIR filter, as modified so as to account for the echo-suppression components including only pre-echoes of succeeding signals, is more easily implemented using discrete Fourier transform (DFT) methods.

Accordingly, in FIG. 3 a component computer 416 computes the discrete Fourier transform (DFT) of each normalized CIR temporarily stored in the CIR register 413 to determine the channel impulse response in the frequency domain. This DFT provides the divisor terms for a bank 417 of read-only-memory dividers that perform a term-by-corresponding-term division process in the frequency domain, which process corresponds to a de-convolution process in the time domain. Term-by-corresponding-term division of a flat frequency-domain response (with all unity terms) by the DFT of the normalized CIR would generate the DFT of the overall response required of the FIG. 2 adaptive equalizer. If the DFT of the normalized CIR exhibits nulls for some frequency terms, the corresponding terms in the overall response of the FIG. 2 adaptive equalizer would be excessively boosted, leading to unacceptable exaggeration of noise components at the null frequencies. Accordingly, any terms of the DFT of the normalized CIR that the component computer 416 computes that would be smaller than a prescribed value associated with acceptably small noise growth are augmented by the computer 416, so as to replace the originally computed value with that prescribed value.

The CIR register 413 is connected for supplying only the pre-echo terms of each normalized CIR temporarily stored therein to a component computer 418. The component computer 418 computes the DFT of the then-current pre-echo terms for application to the bank 417 of ROM dividers as respective dividend terms for the term-by-corresponding-term division process in the frequency domain that corresponds to a de-convolution process in the time domain. The quotients from the bank 417 of ROM dividers specify a quotient DFT. A component computer 419 is connected to receive this DFT from the bank 417 of ROM dividers. The component computer 419 computes the inverse discrete Fourier transform (I-DFT) of the quotient DFT to synthesize the synthetic normalized CIR that is the impulse response in the time-domain that is to be compensated against by the FIR filter comprising the bank 36 of multipliers and the chain-of-adders register 37. The echo terms of this synthetic normalized CIR are multiplied by minus one in circuitry 41A to generate weights $W_{-1}, W_{-2}, \ldots W_{-(N-2)}, W_{-(N-1)}$, and $W_{-N}$ respectively applied as multiplier input signals to the digital multipliers 36-1, 36-2, ... 36-(N-2), 36-(N-1) and 36-N in the FIG. 2 bank 36 of ROM multipliers.

Figure 4:
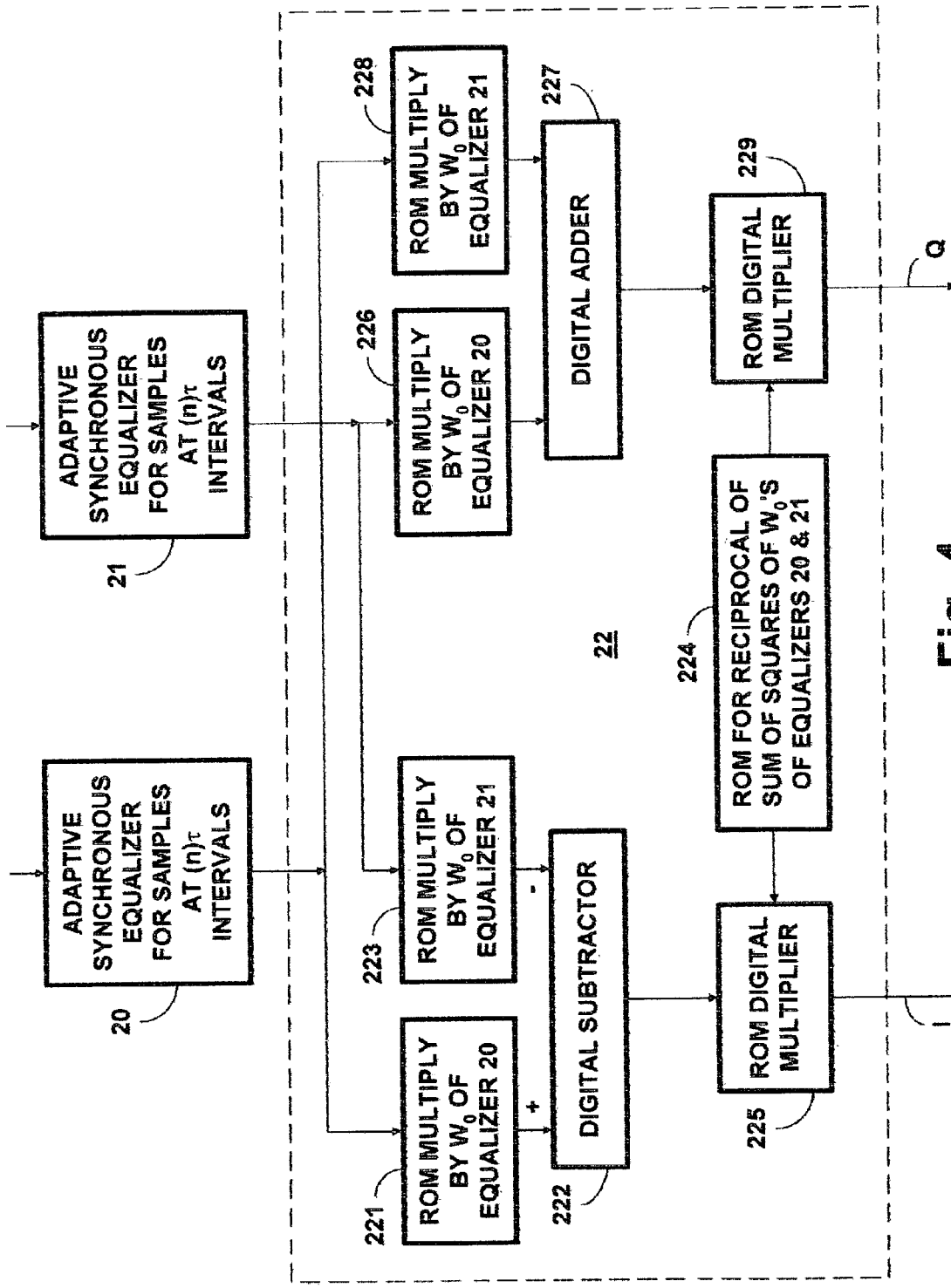
FIGS. 4 and 5 are schematic diagrams showing in detail the construction of I-and-Q-extraction circuitry following component adaptive equalizers in the FIG. 1 DTV receiver.

FIG. 4 shows in detail the construction of the I-and-Q-extraction circuitry 22 following the adaptive equalizers 20 and 21 in the FIG. 1 DTV receiver. The adaptive equalizers 20 and 21 supply respective output $R_{20}$ and $R_{21}$ responses. The adaptive equalizers 20 and 21 have respective $W_0$ weighting coefficients $W_{0-20}$ and $W_{0-21}$ in their respective channel impulse responses just before those CIRs are normalized. The reciprocals of these weighting coefficients $W_{0-20}$ and $W_{0-21}$ are used in the normalization of those CIRs.

The combined $R_{20}$ and $R_{21}$ responses are expressible as a phasor $R_{20}+jR_{21}$. The $W_{0-20}$ and $W_{0-21}$ weighting coefficients are expressible as a phasor $W_{0-20}+jW_{0-21}$. De-rotation of the phasor $R_{20}+jR_{21}$ is accomplished by dividing it by the phasor $W_{0-20}+jW_{0-21}$ to obtain the I signal.

$$I=(R_{20}+jR_{21})/(W_{0-20}+jW_{0-21}).$$

Multiplying by $(W_{0-20}-jW_{0-21})/(W_{0-20}-jW_{0-21})$:

$$I=(W_{0-20}R_{20}-W_{0-21}R_{21})/(W_{0-20}{}^2+W_{0-21}{}^2).$$

A read-only memory 221 is connected to receive the weighting coefficient $W_{0-20}$ and the $R_{20}$ response of adaptive equalizer 20 as respective partial input addresses and to supply their product $W_{0-20}R_{20}$ as minuend input signal to a digital subtractor 222. A read-only memory 223 is connected to receive the weighting coefficient $W_{0-21}$ and the $R_{21}$ response of adaptive equalizer 21 as respective partial input addresses and to supply their product $W_{0-21}R_{21}$ as subtrahend input signal to the digital subtractor 222. A read-only memory 224 is connected to respond to weighting coefficients $W_{0-20}$ and $W_{0-21}$ as respective partial input addresses to supply the reciprocal of the sum of their squares as its response. A read-only memory 225 is connected to receive the difference output signal $(W_{0-20}R_{20}-W_{0-21}R_{21})$ from the subtractor 222 as a partial input address for multiplication by the $1/(W_{0-20}{}^2+W_{0-21}{}^2)$ response of the ROM 224 received as the rest of its input address. The ROM digital multiplier 225 is connected to supply its $(W_{0-20}R_{20}-W_{0-21}R_{21})/(W_{0-20}{}^2+W_{0-21}{}^2)$ product output signal as the I signal output of the I-and-Q-extraction circuitry 22.

A phasor lagging the phasor $W_{0-20}+jW_{0-21}$ by 90° is:

$$-j(W_{0-20}+jW_{0-21})=W_{0-21}-jW_{0-20}.$$

Dividing the phasor $R_{20}+jR_{21}$ by the phasor $W_{0-21}-jW_{0-20}$ generates the Q signal.

$$Q=(R_{20}+jR_{21})/(W_{0-21}-jW_{0-20}).$$

Multiplying by $(W_{0-21}-jW_{0-20})/(W_{0-21}-jW_{0-20})$:

$$Q=(W_{0-21}R_{20}+W_{0-20}R_{21})/(W_{0-20}{}^2+W_{0-21}{}^2).$$

A read-only memory 226 is connected to receive the weighting coefficient $W_{0-20}$ and the $R_{21}$ response of adaptive equalizer 21 as respective partial input addresses and to supply their product $W_{0-20}R_{21}$ as a first summand to a digital adder 227. A read-only memory 228 is connected to receive the weighting coefficient $W_{0-21}$ and the $R_{20}$ response of adaptive equalizer 20 as respective partial input addresses and to supply their product $W_{0-21}R_{20}$ as a second summand to the digital adder 227. A read-only memory 229 is connected to receive the sum output signal $(W_{0-21}R_{20}+W_{0-20}R_{21})$ from the adder 227 as a partial input address for multiplication by the $1/(W_{0-20}{}^2+W_{0-21}{}^2)$ response of the ROM 224 received as the rest of its input address. The ROM digital multiplier 229 is connected to supply its $(W_{0-21}R_{20}+$ $W_{0-20}R_{21})/(W_{0-20}^2+W_{0-21}^2)$ product output signal as the Q signal output of the I-and-Q-extraction circuitry 22.

Figure 5:
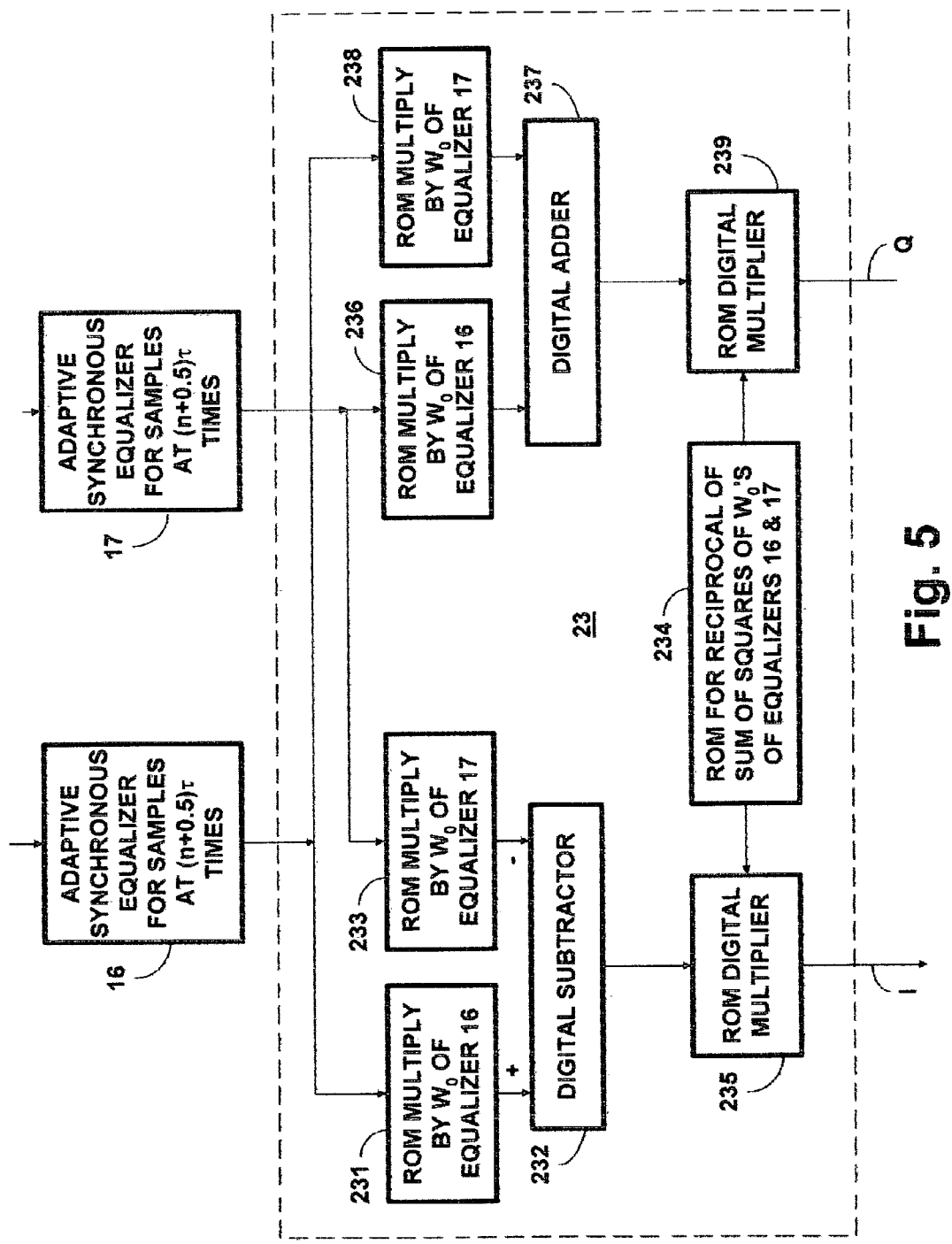

FIG. 5 shows in detail the construction of the I-and-Q-extraction circuitry 23 following the adaptive equalizers 16 and 17 in the FIG. 1 DTV receiver. The adaptive equalizers 16 and 17 supply respective output $R_{16}$ and $R_{17}$ responses. The adaptive equalizers 16 and 17 have respective weighting coefficients $W_{0-16}$ and $W_{0-17}$ in their respective channel impulse responses just before those CIRs are normalized in their respective filter coefficient computers 41. The reciprocals of these weighting coefficients $W_{0-16}$ and $W_{0-17}$ are used in the normalization of those CIRs.

A read-only memory 231 is connected to receive the weighting coefficient $W_{0-16}$ and the $R_{16}$ response of adaptive equalizer 16 as respective partial input addresses and to supply their product $W_{0-16}R_{16}$ as minuend input signal to a digital subtractor 232. A read-only memory 233 is connected to receive the weighting coefficient $W_{0-17}$ and the $R_{17}$ response of adaptive equalizer 17 as respective partial input addresses and to supply their product $W_{0-17}R_{17}$ as subtrahend input signal to the digital subtractor 232. A read-only memory 234 is connected to respond to weighting coefficients $W_{0-16}$ and $W_{0-17}$ as respective partial input addresses to supply the reciprocal of the sum of their squares as its response. A read-only memory 235 is connected to receive the difference output signal $(W_{0-16}R_{16}-W_{0-17}R_{17})$ from the subtractor 232 as a partial input address for nultiplication by the $1/(W_{0-16}^2+W_{0-17}^2)$ response of the ROM 234 received as the rest of its input address. The ROM digital multiplier 235 is connected to supply its $(W_{0-16}R_{16}-W_{0-17}R_{17})/(W_{0-16}^2+W_{0-17}^2)$ product output signal as the I signal output of the I-and-Q-extraction circuitry 23.

A read-only memory 236 is connected to receive the weighting coefficient $W_{0-16}$ and the $R_{17}$ response of adaptive equalizer 17 as respective partial input addresses and to supply their product $W_{0-16}R_{17}$ as a first summand to a digital adder 237. A read-only memory 238 is connected to receive the weighting coefficient $W_{0-17}$ and the $R_{16}$ response of adaptive equalizer 16 as respective partial input addresses and to supply their product $W_{0-17}R_{16}$ as a second summand to the digital adder 237. A read-only memory 239 is connected to receive the sum output signal $(W_{0-17}R_{16}+W_{0-16}R_{17})$ from the adder 237 as a partial input address for multiplication by the $1/(W_{0-16}^2+W_{0-17}^2)$ response of the ROM 234 received as the rest of its input address. The ROM digital multiplier 239 is connected to supply its $(W_{0-17}R_{16}+W_{0-16}R_{17})/(W_{0-16}^2+W_{0-17}^2)$ product output signal as the Q signal output of the I-and-Q-extraction circuitry 23.

In practice, the ROM digital multiplier 229 of FIG. 3 and the ROM digital multiplier 239 of FIG. 5 can both be dispensed with, to increase gain in the AFPC loop for the DCO 15 of FIG. 1. If this is done, the sum output signal $(W_{0-21}R_{20}+W_{0-20}R_{21})$ from the adder 227 of FIG. 4 and the sum output signal $(W_{0-17}R_{16}+W_{0-16}R_{17})$ from the adder 237 of FIG. 5 are supplied directly to the symbol synchronizer 26 of FIG. 1.

In effect, the procedures carried out in the I-and-Q-extraction circuitry 22 and in the I-and-Q-extraction circuitry 23 are phase rotation procedures for optimizing the phase of demodulation for best signal-to-noise ratio (SNR) of baseband DTV signal. The level of random noise in the I output signals from the I-and-Q-extraction circuitry 22 and 23 that is attributable to digitized Johnson noise from the FIG. 1 DTV tuner 10 does not change as the effective phase of demodulation is changed. Nor does quantization noise from the FIG. 1 ADC 12. SNR changes because the I output signals from the I-and-Q-extraction circuitry 22 and 23 have their largest amplitudes when the effective phase of demodulation is optimized.

Figure 6:
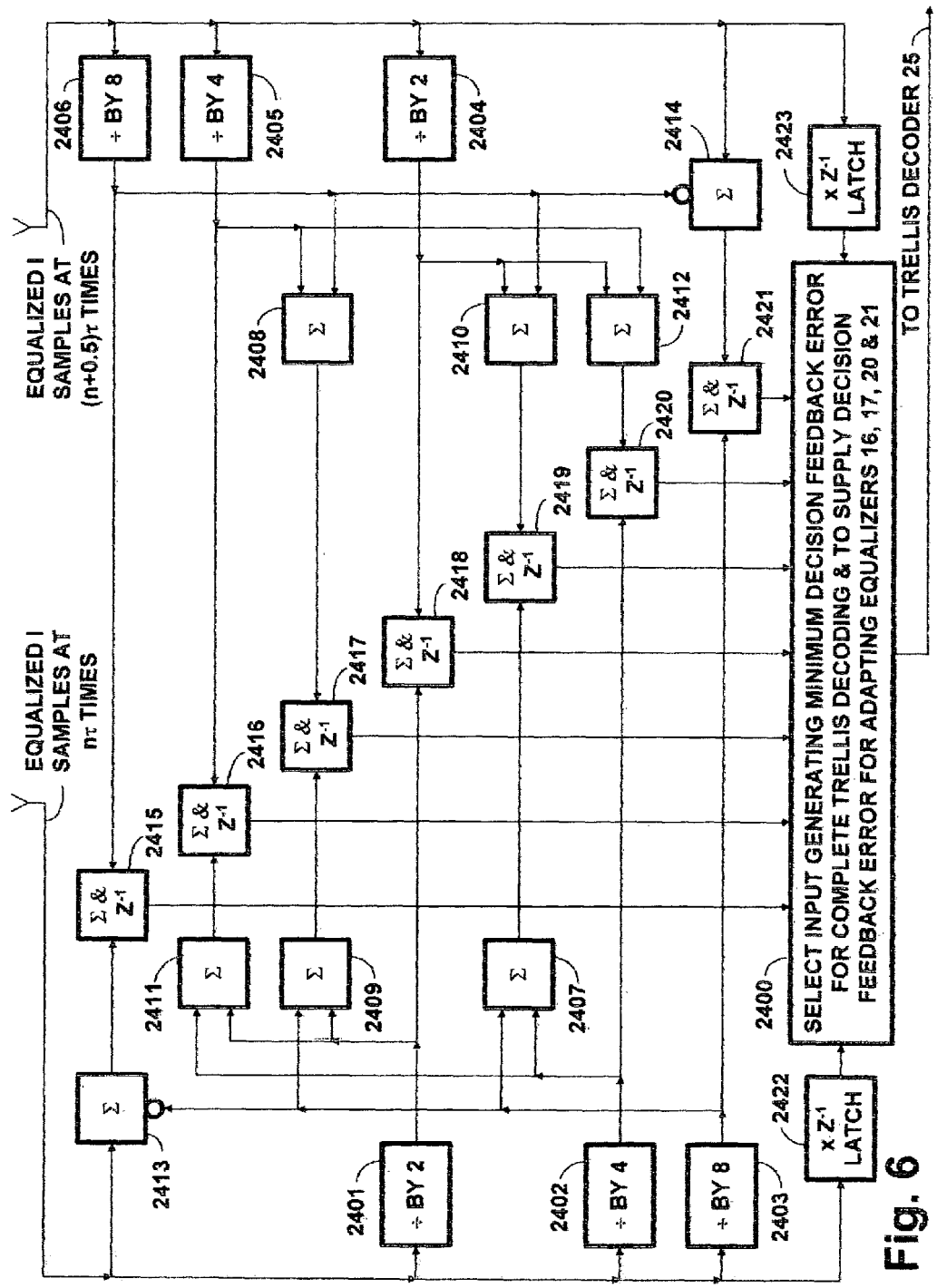
FIGS. 6 and 7 are schematic diagrams showing in detail the construction of the FIG. 1 DTV receiver symbol synchronizers for in-phase and quadrature-phase baseband DTV signals.

FIG. 6 shows the construction of the symbol synchronizer 24 in the FIG. 1 DTV receiver. To generate input samples for the trellis decoder 25, the symbol synchronizer 24 combines an input signal $I_{22}$ composed of equalized I samples from the I-and-Q-extraction circuitry 22 with an input signal $I_{23}$ composed of equalized samples from the I-and-Q-extraction circuitry 23. $I_{22}$ and $I_{23}$ are combined in various $v$ and $(1-v)$ proportions, where $v$ is a variable having a value of zero, one-eighth, one-quarter, three-eighths, one-half, five-eighths, three-quarters, seven-eighths or one. Selection circuitry 2400 selects the one of the combined signals for application to the trellis decoder 25 that will generate the smallest amounts of decision-feedback error. The following three paragraphs describe generation of the signals combining $I_{22}$ and $I_{23}$ in various $v$ and $(1-v)$ proportions for selection by the selection circuitry 2400.

The equalized in-phase signal $I_{22}$ from the I-and-Q-extraction circuitry 22 is divided by two, four and eight by digital dividers 2401, 2402 and 2403 to generate $I_{22}/2$, $I_{22}/4$ and $I_{22}/8$ signals. The equalized in-phase signal $I_{23}$ from the I-and-Q-extraction circuitry 23 is divided by two, four and eight by digital dividers 2404, 2405 and 2406 to generate $I_{23}/2$, $I_{23}/4$ and $I_{23}/8$ signals. Binary point shift division methods are the best way to construct the digital dividers 2401, 2402, 2403, 2404, 2405 and 2406. A digital adder 2407 adds the $I_{22}/4$ and $I_{22}/8$ signals from the dividers 2402 and 2403 to generate $3I_{22}/8$ signal; and a digital adder 2408 adds the $I_{23}/4$ and $I_{23}/8$ signals from the dividers 2405 and 2406 to generate $3I_{23}/8$ signal. A digital adder 2409 adds the $I_{22}/2$ and $I_{22}/8$ signals from the dividers 2401 and 2403 to generate $5I_{22}/8$ signal; and a digital adder 2410 adds the $I_{23}/2$ and $I_{23}/8$ signals from the dividers 2404 and 2406 to generate $5I_{23}/8$ signal. A digital adder 2411 adds the $I_{22}/2$ and $I_{22}/8$ signals from the dividers 2401 and 2403 to generate $3I_{22}/4$ signal; and a digital adder 2412 adds the $I_{23}/2$ and $I_{23}/4$ signals from the dividers 2404 and 2405 to generate $3I_{23}/4$ signal. A digital subtractor 2413 subtracts from the $I_{22}$ signal the $I_{22}/8$ signal from the divider 2403 to generate $7I_{22}/8$ signal; and a digital subtractor 2414 subtracts from the $I_{23}$ signal the $I_{23}/8$ signal from the divider 2406 to generate $7I_{23}/8$ signal.

A clocked digital adder 2415 adds the $7I_{22}/8$ difference output signal from the digital subtractor 2413 and the $I_{23}/8$ signal from the digital divider 2406 to generate a combined signal in which $v$ equals ⅞, for application to the selection circuitry 2400. A clocked digital adder 2416 adds the $3I_{22}/4$ sum output signal from the digital adder 2411 and the $I_{23}/4$ signal from the digital divider 2405 to generate a combined signal in which $v$ equals ¾, for application to the selection circuitry 2400. A clocked digital adder 2417 adds the $5I_{22}/8$ sum output signal from the digital adder 2409 and the $3I_{23}/8$ sum output signal from the digital adder 2408 to generate a combined signal in which $v$ equals ⅝, for application to the selection circuitry 2400. A clocked digital adder 2418 adds the $I_{22}/2$ and $I_{23}/2$ signals from the digital dividers 2401 and 2404 to generate a combined signal in which $v$ equals ½, for application to the selection circuitry 2400. A clocked digital adder 2419 adds the $3I_{22}/8$ sum output signal from the digital adder 2407 and the $5I_{23}/8$ sum output signal from the digital adder 2410 to generate a combined signal in which $v$ equals ⅜, for application to the selection circuitry 2400. A clocked digital adder 2420 adds the $I_{22}/4$ signal from the digital divider 2402 and the $3I_{23}/4$ sum output signal from the digital adder 2412 to generate a combined signal in which $v$ equals ¼, for application to the selection circuitry 2400. A clocked digital adder 2421 adds the $I_{22}/8$ signal from the digital divider 2403 and the $7I_{22}/8$ difference output signal from the digital subtractor 2414 to generate a combined signal in which ν equals ⅛, for application to the selection circuitry 2400.

Each successive sample of the equalized in-phase signal $I_{22}$ from the I-and-Q-extraction circuitry 22 is temporarily stored in a clocked sample latch 2422 to generate a signal in which ν equals unity, for application to the selection circuitry 2400. The clocked sample latch 2422 temporally aligns this signal in which ν equals unity with the sum output signals of the clocked digital adders 2415, 2416, 2417, 2418, 2419, 2420 and 2421. Each successive sample of the equalized in-phase signal $I_{23}$ from the I-and-Q-extraction circuitry 23 is temporarily stored in a clocked sample latch 2422 to generate a signal in which ν equals zero, for application to the selection circuitry 2400. The clocked sample latch 2423 temporally aligns this signal in which ν equals zero with the sum output signals of the clocked digital adders 2415, 2416, 2417, 2418, 2419, 2420 and 2421.

Figure 7:
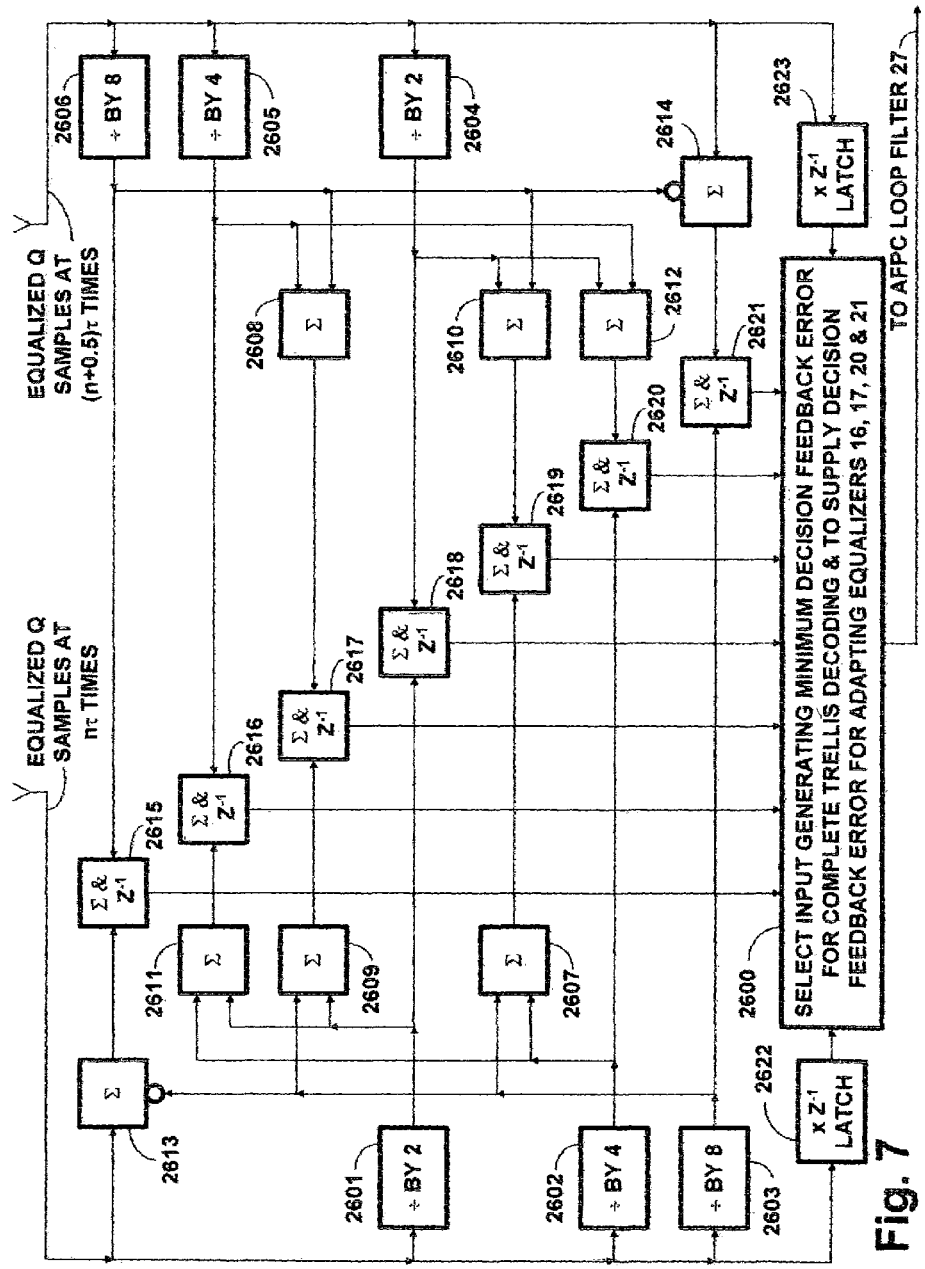

FIG. 7 shows the construction of the symbol synchronizer 26 in the FIG. 1 DTV receiver. To generate input samples for the AFPC loop filter 27, the symbol synchronizer 26 combines an input signal $Q_{22}$ composed of equalized Q samples from the I-and-Q-extraction circuitry 22 with an input signal $Q_{23}$ composed of equalized samples from the I-and-Q-extraction circuitry 23. $Q_{22}$ and $Q_{23}$ are combined in various ν and (1−ν) proportions, where ν is a variable having a value of zero, one-eighth, one-quarter, three-eighths, one-half, five-eighths, three-quarters, seven-eighths or one. Selection circuitry 2600 selects, as input signal to the AFPC loop filter 27, the one of the combined signals that corresponds with the combined signal that the selection circuitry 2400 selects to the trellis decoder 25. The following three paragraphs describe generation of the signals combining $Q_{22}$ and $Q_{23}$ in various ν and (1−ν) proportions for selection by the selection circuitry 2600.

The equalized quadrature-phase signal $Q_{22}$ from the I-and-Q-extraction circuitry 22 is divided by two, four and eight by digital dividers 2601, 2602 and 2603 to generate $Q_{22}/2$, $Q_{22}/4$ and $Q_{22}/8$ signals. The equalized quadrature-phase signal $Q_{23}$ from the I-and-Q-extraction circuitry 23 is divided by two, four and eight by digital dividers 2604, 2605 and 2606 to generate $Q_{23}/2$, $Q_{23}/4$ and $Q_{23}/8$ signals. Binary point shift division methods are the best way to construct the digital dividers 2601, 2602, 2603, 2604, 2605 and 2606. A digital adder 2607 adds the $Q_{22}/4$ and $Q_{22}/8$ signals from the dividers 2602 and 2603 to generate $3Q_{22}/8$ signal; and a digital adder 2608 adds the $Q_{23}/4$ and $Q_{23}/8$ signals from the dividers 2605 and 2606 to generate $3Q_{23}/8$ signal. A digital adder 2609 adds the $Q_{22}/2$ and $Q_{22}/8$ signals from the dividers 2601 and 2603 to generate $5Q_{22}/8$ signal; and a digital adder 2610 adds the $Q_{23}/2$ and $Q_{23}/8$ signals from the dividers 2604 and 2606 to generate $5Q_{23}/8$ signal. A digital adder 2611 adds the $Q_{22}/2$ and $Q_{22}/8$ signals from the dividers 2601 and 2603 to generate $3Q_{22}/4$ signal; and a digital adder 2612 adds the $Q_{23}/2$ and $Q_{23}/4$ signals from the dividers 2604 and 2605 to generate $3Q_{23}/4$ signal. A digital subtractor 2613 subtracts from the $Q_{22}$ signal the $Q_{22}/8$ signal from the divider 2603 to generate $7Q_{22}/8$ signal; and a digital subtractor 2614 subtracts from the $Q_{23}$ signal the $Q_{23}/8$ signal from the divider 2606 to generate $7Q_{23}/8$ signal.

A clocked digital adder 2615 adds the $7Q_{22}/8$ difference output signal from the digital subtractor 2613 and the $Q_{23}/8$ signal from the digital divider 2606 to generate a combined signal in which ν equals ⅞, for application to the selection circuitry 2600. A clocked digital adder 2616 adds the $3Q_{22}/4$ sum output signal from the digital adder 2611 and the $Q_{23}/4$ signal from the digital divider 2605 to generate a combined signal in which ν equals ¾, for application to the selection circuitry 2600. A clocked digital adder 2617 adds the $5Q_{22}/8$ sum output signal from the digital adder 2609 and the $3Q_{23}/8$ sum output signal from the digital adder 2608 to generate a combined signal in which ν equals ⅝, for application to the selection circuitry 2600. A clocked digital adder 2618 adds the $Q_{22}/2$ and $Q_{23}/2$ signals from the digital dividers 2601 and 2604 to generate a combined signal in which ν equals ½, for application to the selection circuitry 2600. A clocked digital adder 2619 adds the $3I_{22}/8$ sum output signal from the digital adder 2607 and the $5Q_{23}/8$ sum output signal from the digital adder 2610 to generate a combined signal in which ν equals ⅜, for application to the selection circuitry 2600. A clocked digital adder 2620 adds the $Q_{22}/4$ signal from the digital divider 2602 and the $3Q_{23}/4$ sum output signal from the digital adder 2612 to generate a combined signal in which ν equals ¼, for application to the selection circuitry 2600. A clocked digital adder 2621 adds the $Q_{22}/8$ signal from the digital divider 2603 and the $7Q_{22}/8$ difference output signal from the digital subtractor 2614 to generate a combined signal in which ν equals ⅛, for application to the selection circuitry 2600.

Each successive sample of the equalized quadrature-phase signal $Q_{22}$ from the I-and-Q-extraction circuitry 22 is temporarily stored in a clocked sample latch 2622 to generate a signal in which ν equals unity, for application to the selection circuitry 2600. The clocked sample latch 2622 temporally aligns this signal in which ν equals unity with the sum output signals of the clocked digital adders 2615, 2616, 2617, 2618, 2619, 2620 and 2621. Each successive sample of the equalized quadrature-phase signal $Q_{23}$ from the I-and-Q-extraction circuitry 23 is temporarily stored in a clocked sample latch 2622 to generate a signal in which ν equals zero, for application to the selection circuitry 2600. The clocked sample latch 2623 temporally aligns this signal in which ν equals zero with the sum output signals of the clocked digital adders 2615, 2616, 2617, 2618, 2619, 2620 and 2621.

Figure 8:
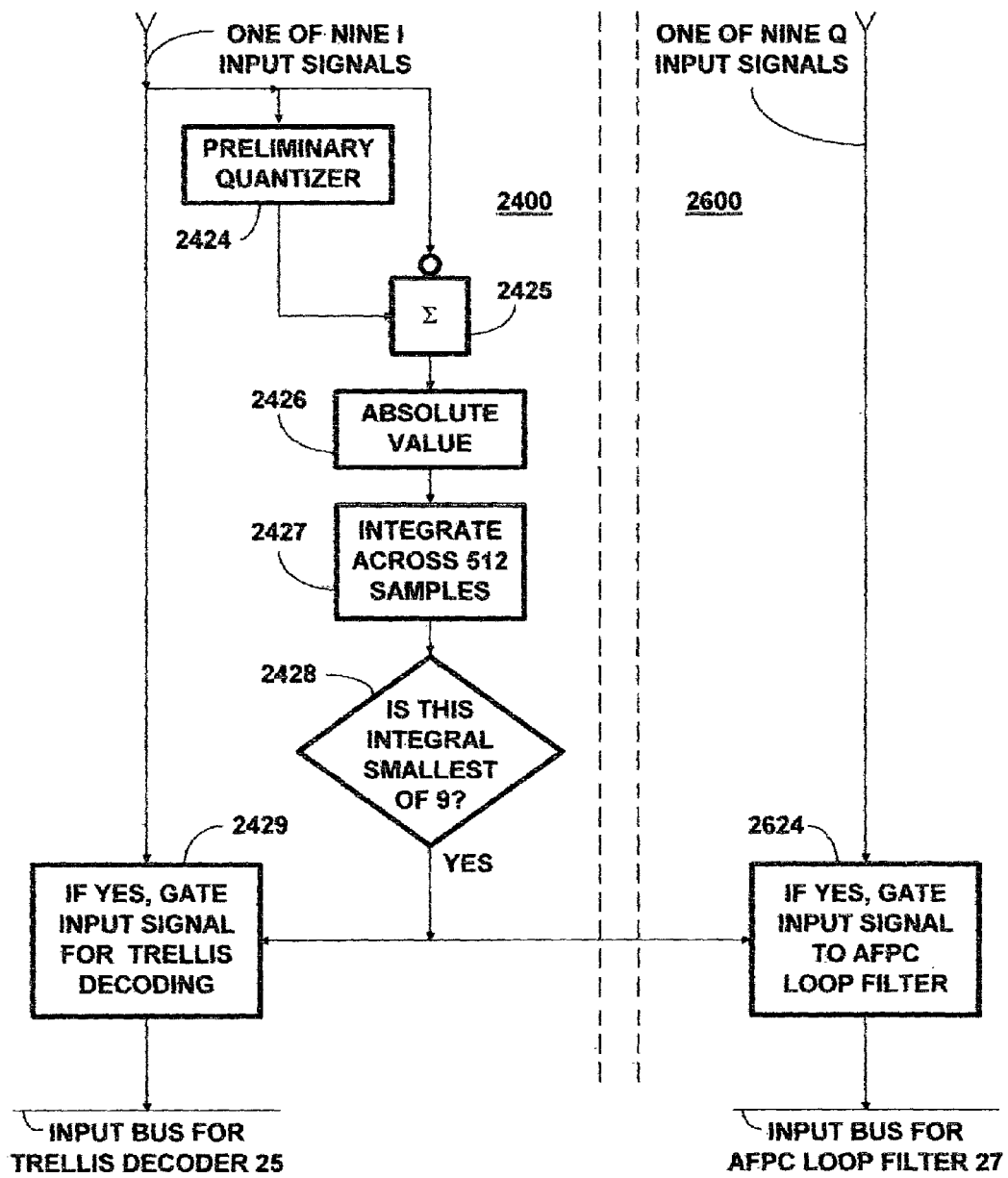
FIG. 8 is a schematic diagram showing further detail of the construction of the symbol synchronizers of FIGS. 6 and 7.

FIG. 8 shows one ninth of the internal structure of the FIG. 6 selection circuitry 2400, which internal structure is used in the processing of one of he nine I input signals supplied to the selection circuitry 2400. The successive samples of the I input signal are supplied to a preliminary quantizer 2424, which estimates the transmitted symbols giving rise to the samples. A clocked digital subtractor 2425 determines the departures of the successive samples of the I input signal from the estimates of the transmitted symbols. Absolute-value circuitry 2426 determines the absolute values of these departures, which are supplied to accumulator circuitry 2427 that integrates over a fixed interval, which fixed interval is indicated in FIG. 8 to span 512 symbol epochs. Comparator circuitry 2428 then ascertains whether the integration result obtained by the accumulator circuitry 2427 is the smallest of the integration results obtained for all nine of the I input signals supplied to the selection circuitry 2400. If and only if the integration result obtained by the accumulator circuitry 2427 is determined to be the smallest of the integration results obtained for all nine of the I input signals supplied to the selection circuitry 2400, a gate circuit 2429 is conditioned to forward the successive samples of the I input signal supplied to the preliminary quantizer 2424. The gate circuit 2429 is connected for supplying the forwarded samples to the trellis decoder 25 as its input signal.

FIG. 8 further shows one ninth of the internal structure of the FIG. 7 selection circuitry 2600, which internal structure is used in the processing of one of the nine Q input signals supplied to the selection circuitry 2600. Comparator circuitry 2428 in the selection circuitry 2400 is connected to control a gate circuit 2624 in the selection circuitry 2600. If and only if the integration result obtained by the accumulator circuitry 2427 is determined to be the smallest of the integration results obtained for all nine of the I input signals supplied to the selection circuitry 2400, the gate circuit 2624 is conditioned to forward the successive samples of the corresponding Q input signal samples to the AFPC loop filter 27 as its input signal.

As described earlier in this specification, the symbol synchronizer 24 re-samples twice-Nyquist-rate I samples to a number of streams of Nyquist-rate I samples in a number of parallel 2:1 decimation filtering steps performed in different phases. The symbol synchronizer 24 selects, as input to the trellis decoder 25, the stream of Nyquist-rate I samples that is phased so as to minimize intersymbol interference (ISI) in data slicing performed in the trellis decoder 25. This procedure avoids the interaction of a feedback loop for adjusting symbol synchronization with the feedback loops for adjusting weighting coefficients of the component adaptive synchronous equalizers 16, 17, 20 and 21. There is no lag of a feedback loop for adjusting symbol synchronization to affect the feedback loops for adjusting weighting coefficients of the component adaptive synchronous equalizers 16, 17, 20 and 21. Aspects of the invention are useful in equalizers that use types of symbol synchronization other than the preferred symbol synchronization described in this specification with reference to FIGS. 6, 7 and 8 of the drawing.

In preferred embodiments of the invention not all components of the IIR filtered decision feedback signal are generated from the response of a quantizer 38 supplying estimates of the symbols actually transmitted within a symbol epoch. Instead, the longer-delayed components of the IIR filtered decision feedback signal are generated from more reliable estimates of the symbols actually transmitted, which more reliable estimates are supplied from the trellis decoder 25. These connections are too complicated to show explicitly in a drawing figure of reasonable size. The delay in each of the more reliable estimates becoming available must be compensated for in applying weighted decision-feedback terms to the chain-of-adders register 37. The equalizer response is provided with delay that compensates for the delay in the most reliable estimates of the symbols actually transmitted becoming available, so the input signals for the reception-error detector are in proper temporal alignment with each other.

The description thusfar is intended to provide background for understanding the general design of the adaptive, complex, fractional equalizers that embody the invention. The preferred construction for the adaptive Asynchronous equalizers 16, 17, 20 and 21 differs somewhat from the pipeline structure shown in FIG. 2.

Figure 9:
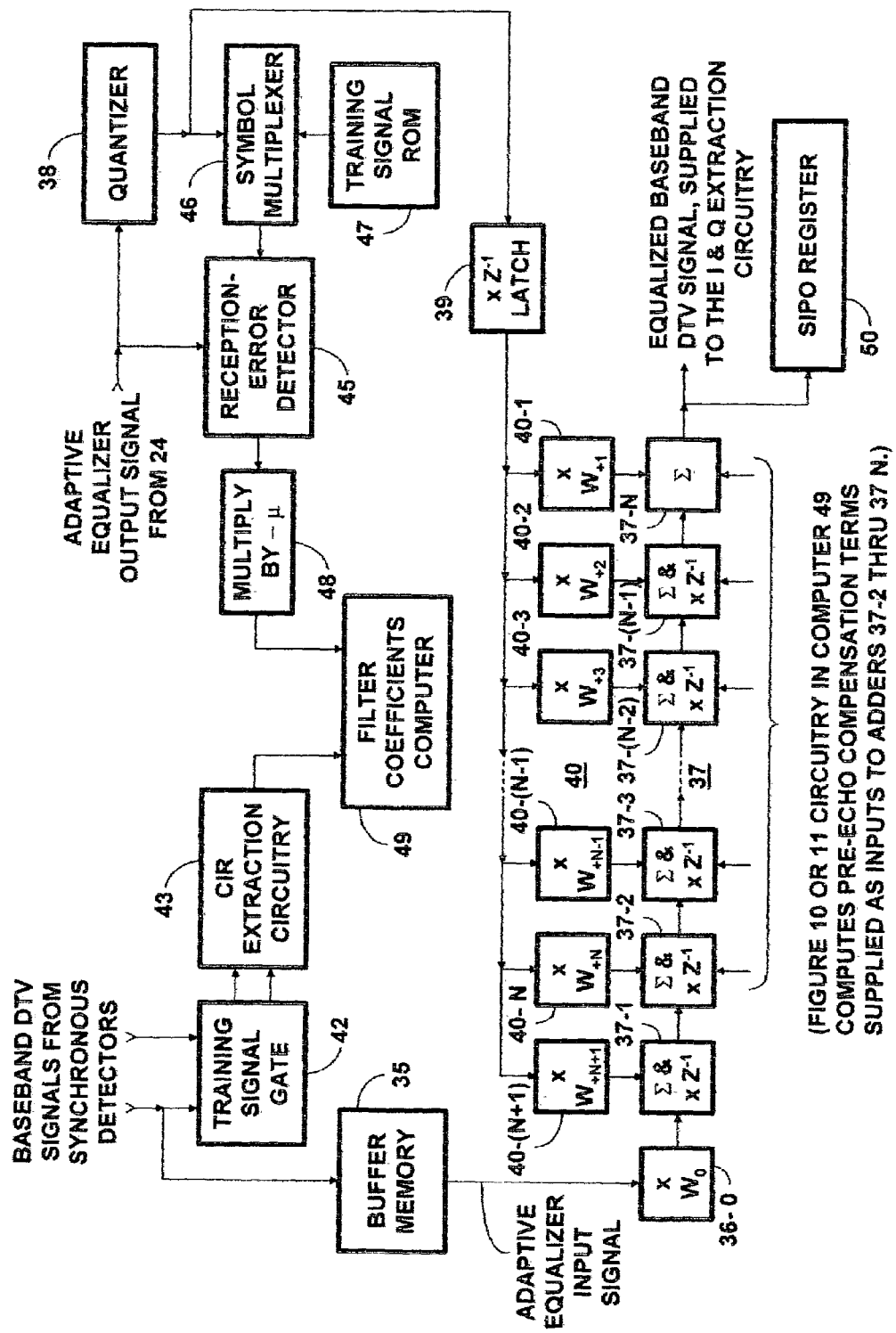
FIG. 9 is a schematic diagram of an adaptive equalizer alternative to that shown in FIG. 2.
Figure 10:
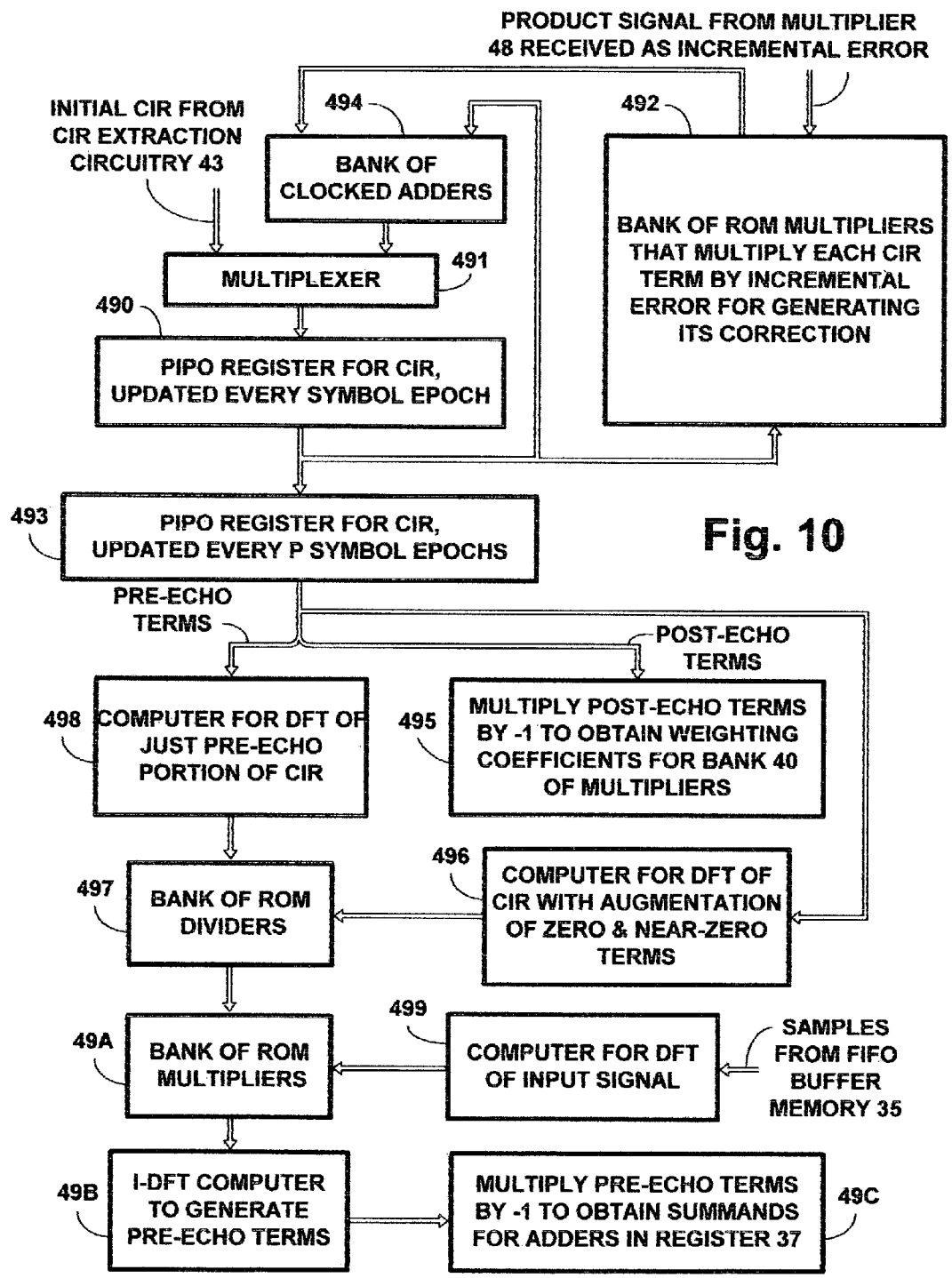
FIG. 10 is a schematic diagram showing in detail one way to construct the filter coefficients computer of the FIG. 9 adaptive equalizer.

FIG. 9 shows a structure for each of the adaptive synchronous equalizers 16, 17, 20 and 21 alternative to the structure shown in FIG. 2. The FIG. 9 structure differs from the FIG. 2 structure in that the filter coefficients computer 41 is replaced by a different filter coefficients computer 49, which includes component circuitry that FIG. 10 shows in some detail. The FIG. 9 structure further includes a serial-in, parallel-out (SIPO) register 50 connected for temporarily storing 512 samples of the adaptive equalizer output signal supplied as sum output signal from the final unclocked digital adder 37-N of the chain-of-adders register 37. The FIG. 9 portion of the alternative structure does not include the bank 36 of digital multipliers used in the FIG. 2 structure to weight the adaptive equalizer input signal by respective weights $W_0$, $W_{-1}$, $W_{-2}$, ... $W_{-(N-2)}$, $W_{-(N-1)}$, and $W_{-N}$ to generate products applied as successive summands to the chain-of-adders register 37. Instead, the adaptive equalizer input signal is applied directly to the clocked adder 37-0 as a summand input signal, its weight $W_0$ being presumed to have unit value, +1. The filter coefficients computer 49 computes pre-echo compensation signals respectively applied as summand input signals to the clocked adders 37-1, 37-2, . . . 37-(N−2), 37-(N−1) and the final unclocked digital adder 37-N. The FIG. 9 adaptive synchronous equalizer structure can also be used in the FIG. 20 DTV receiver or in the FIG. 21 DTV receiver.

FIG. 10 shows details of the filter coefficients computer 49 in which these pre-echo compensation signals are generated. The filter coefficients computer 49 includes a PIPO register 490 for CIR, a multiplexer 491, a bank 492 of ROM multipliers, a further PIPO register 493 for CIR, a bank 494 of adders, circuitry 495 for multiplying post-echo terms in PIPO register 493 by −1, a bank 497 of ROM dividers, and component computers 496 and 498. These elements correspond in structure and operation to the PIPO register 410 for CIR, the multiplexer 411, the bank 412 of ROM multipliers, the further PIPO register 413, the bank 414 of adders, the circuitry 415 for multiplying post-echo terms in PIPO register 413 by −1, the bank 417 of ROM dividers, and the component computers 416 and 418 that FIG. 3 shows as being included in the FIG. 2 filter coefficients computer 41. The cursor term of the CIR stored in the further PIPO register 493 is applied as a $W_0$ weighting coefficient to the multiplier 36-0 in FIG. 9 and to the I-and-Q-extraction circuitry 22 or 23 of FIG. 1.

A component computer 499 computes the discrete Fourier transform (DFT) of input signal samples stored in the buffer memory 35. This DFT is supplied to a bank 49A of read-only-memory digital multipliers connected for multiplying this DFT term-by-corresponding-term by the quotient DFT supplied from the bank 497 of ROM dividers. The product output signals of the bank 49A of ROM multipliers generate the DFT of pre-echoes in the input signal. The DFTs that are multiplied together term-by-corresponding-term by the bank 49A of ROM multipliers are zero-extended before that procedure, so that the product DFT can exhibit growth in the pre-echo terms without their wrapping around. A component computer 49B computes the inverse discrete Fourier transform (I-DFT) of the product DFT to recover samples of the pre-echoes in the input signal. These samples are multiplied by minus one in circuitry 49C to generate pre-echo compensation signals respectively applied as summand input signals to the clocked adders 37-1, 37-2, . . . 37-(N−2), 37-(N−1) and the final unclocked digital adder 37-N. After the application of these pre-echo compensation signals, these summand signals are zero-valued until P symbol epochs go by.

The term-by-corresponding-term multiplication of the DFT of input signal by the quotient DFT in the FIG. 10 bank 49A of ROM multipliers in the filter coefficients computer 49 of the FIG. 9 adaptive equalizer corresponds to the convolution in the time domain performed by the bank 36 of ROM multipliers in the FIG. 2 adaptive equalizer. Alternative constructions for the filter coefficients computer 49 take advantage of the fact that partially de-echoed signal with most of the post-echoes canceled is available in the registers 37 and 50.

Figure 11:
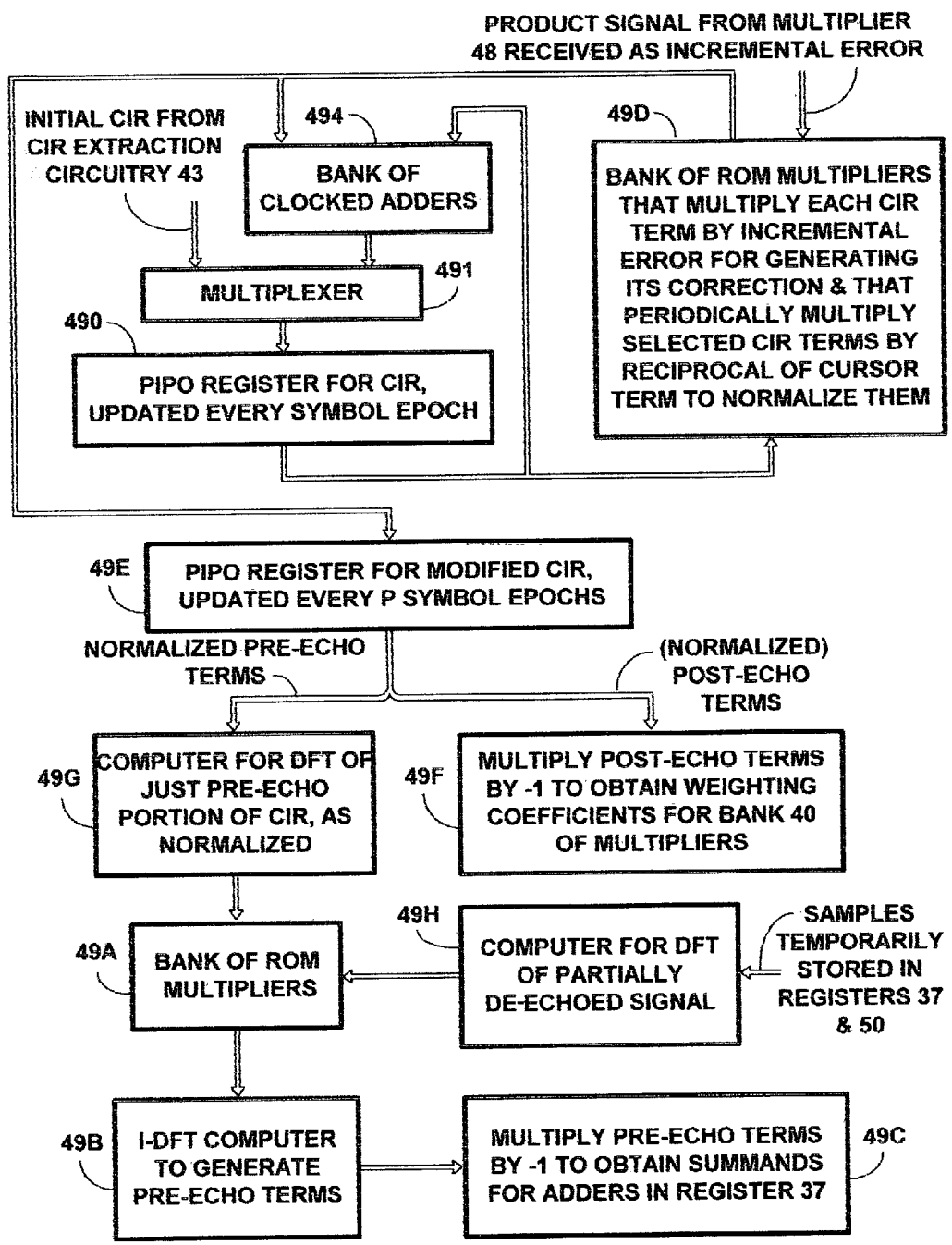
FIG. 11 is a schematic diagram showing in detail another way to construct the filter coefficients computer of the FIG. 9 adaptive equalizer.

FIG. 11 depicts such alternative constructions for the filter coefficients computer 49. The FIG. 11 filter coefficients computer 49 differs from the FIG. 10 filter coefficients computer 49. Instead of the CIR in the PIPO register 490 being forwarded every P symbol epochs to the further PIPO register 493 for CIR, the CIR from the PIPO register 490 is routed through a bank 49D of ROM multipliers for partial normalization before application to a further PIPO register 49E for CIR. At times other than loading the further PIPO register 49E, the bank 49D of ROM multipliers is operated in conjunction with the PIPO register 490, the multiplexer 491 and the bank 494 of adders in the same way as the bank 492 of ROM multipliers is operated in conjunction with those elements in the FIG. 10 filter coefficients computer 49.

The pre-echo terms of the CIR from the PIPO register 490 are multiplied by $1/W_0$, the reciprocal of the cursor term, in their transfer to the further PIPO register 49E via the bank 49D of ROM multipliers. The cursor term of the CIR from the PIPO register 490 is multiplied by unity in its transfer to the further PIPO register 49E via the bank 49D of ROM multipliers. (Alternatively, the cursor term of the CIR can be transferred directly from the PIPO register 490 to the further PIPO register 49E without passage through a ROM multiplier in the bank 49D of ROM multipliers, of course.) The cursor term of the CIR temporarily stored in the further PIPO register 49E is applied as a $W_0$ weighting coefficient to the multiplier 36-0 in FIG. 9 and to the I-and-Q-extraction circuitry 22 or 23 of FIG. 1.

The post-echo terms of the CIR from the PIPO register 490 are multiplied by unity in their transfer to the further PIPO register 49E via the bank 49D of ROM multipliers, or are transferred directly to the further PIPO register 49E without passage through the bank 49D of ROM multipliers. Alternatively, the post-echo terms of the CIR from the PIPO register 490 can instead be multiplied by $1/W_0$, the reciprocal of the cursor term, in their transfer to the further PIPO register 49E via the bank 49D of ROM multipliers. FIG. 11 shows connections in which the post-echo terms temporarily stored in the further PIPO register 49E are multiplied by minus one in circuitry 49F. This generates the weighting coefficients $W_{+1}, W_{+2}, W_{+3}, \ldots W_{+(N-1)}, W_{+N}$ and $W_{+(N+1)}$ that the digital multipliers 40-1, 40-2, 40-3, . . . 40-(N−1), 40-N and 40-(N+1) respectively use as their multiplier input signals.

In some variants of the FIG. 11 circuitry, the post-echo terms of the CIR from the PIPO register 490 are multiplied by minus unity or by $-1/W_0$ in their transfer to the further PIPO register 49E via the bank 49D of ROM multipliers. The post-echo terms of the CIR from the further PIPO register 49E are then applied directly to the digital multipliers 40-1, 40-2, 40-3, . . . 40-(N−1), 40-N and 40-(N+1) as the weighting coefficients $W_{+1}, W_{+2}, W_{+3}, \ldots W_{+(N-1)}, W_{+N}$ and $W_{+(N+1)}$. These variants of the FIG. 11 circuitry dispense with the circuitry 49F for multiplying by minus unity the post-echo terms of the CIR from the further PIPO register 49E.

A component computer 49G computes the DFT of just the pre-echo portion of the CIR as it appears in normalized form in the further PIPO register 49E. The terms of this DFT supply the multiplicand input signals for the bank 49A of ROM multipliers in FIG. 11. A component computer 49H computes the discrete Fourier transform (DFT) of input signal samples stored in the final P stages of the chain-of-adders register 37 and in the SIPO register 50. The terms of this DFT supply the multiplier input signals for the bank 49A of ROM multipliers in FIG. 11, to multiply term-by-corresponding-term the DFT computed by the component computer 49G. The product output signals of the bank 49A of ROM multipliers generate the DFT of pre-echoes in the input signal. The DFTs that are multiplied together term-by-corresponding-term by the bank 49A of ROM multipliers are zero-extended before that procedure, so that the product DFT can exhibit growth in the pre-echo terms without their wrapping around. The component computer 49B computes the inverse discrete Fourier transform (I-DFT) of the product DFT to recover samples of the pre-echoes in the input signal. These samples are multiplied by minus one in circuitry 49C to generate pre-echo compensation signals respectively applied as summand input signals to the clocked adders 37-1, 37-2, . . . 37-(N−2), 37-(N−1) and the final unclocked digital adder 37-N. After the application of these pre-echo compensation signals, these summand signals are zero-valued until P symbol epochs go by.

In some variants of the FIG. 11 circuitry, the pre-echo terms of the CIR from the PIPO register 490 are multiplied by $-1/W_0$ in their transfer to the further PIPO register 49E via the bank 49D of ROM multipliers. In these variants the samples of the I-DFT from the component computer 49B are pre-echo compensation signals respectively applied directly as summand input signals to the clocked adders 37-1, 37-2, . . . 37-(N−2), 37-(N−1) and the final unclocked digital adder 37-N. These variants of the FIG. 11 circuitry dispense with the circuitry 49C for multiplying these samples by minus unity.

Another variation of the equalization arrangement described with reference to FIGS. 9, 10 and 11 replaces the respective four SIPO registers 50 in the adaptive equalizers 16, 17, 20 and 21 with a shared SIPO register serially supplied input samples from the symbol synchronizer 24. The equalized data symbols stored in this shared SIPO register are used to extend the samples available to the component computer 49H from each of the four chain-of-adders registers 37.

Figure 12:
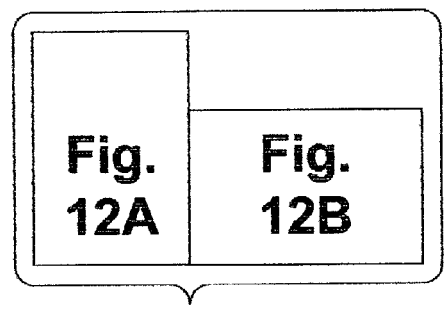
FIGS. 12A and 12B combine as shown in FIG. 12 to form a schematic diagram of an adaptive equalizer, which is alternative to the adaptive equalizers shown in FIGS. 2 and 9.
Figure 12A:
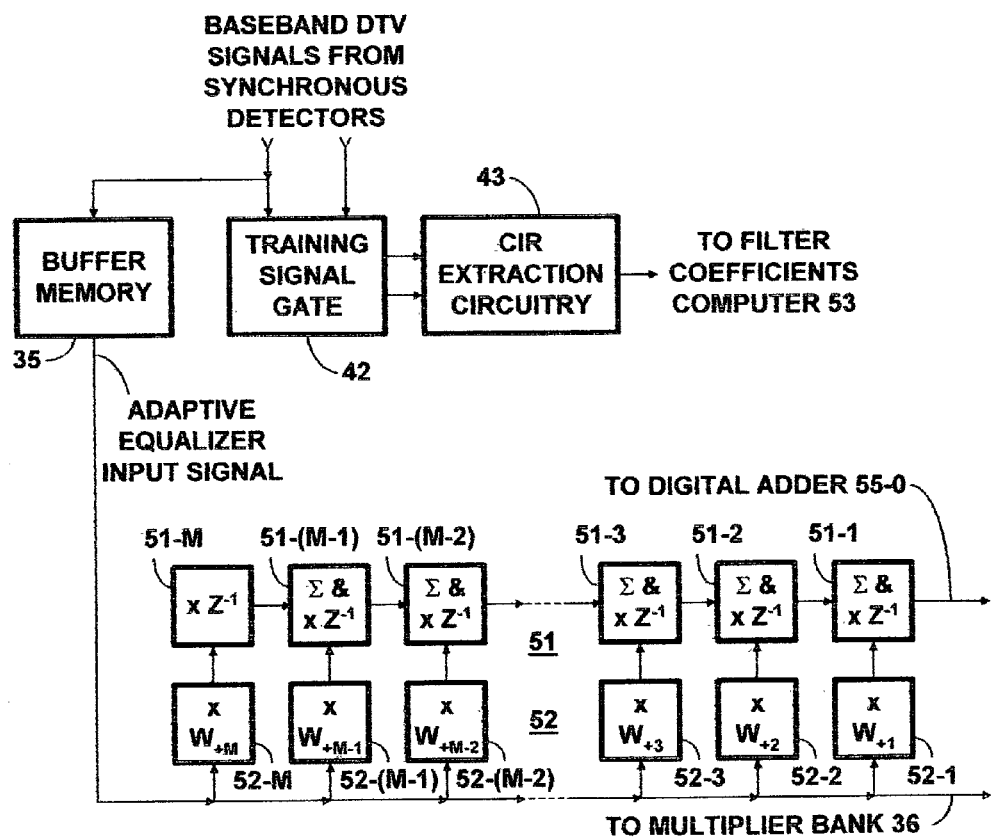
Figure 12B:
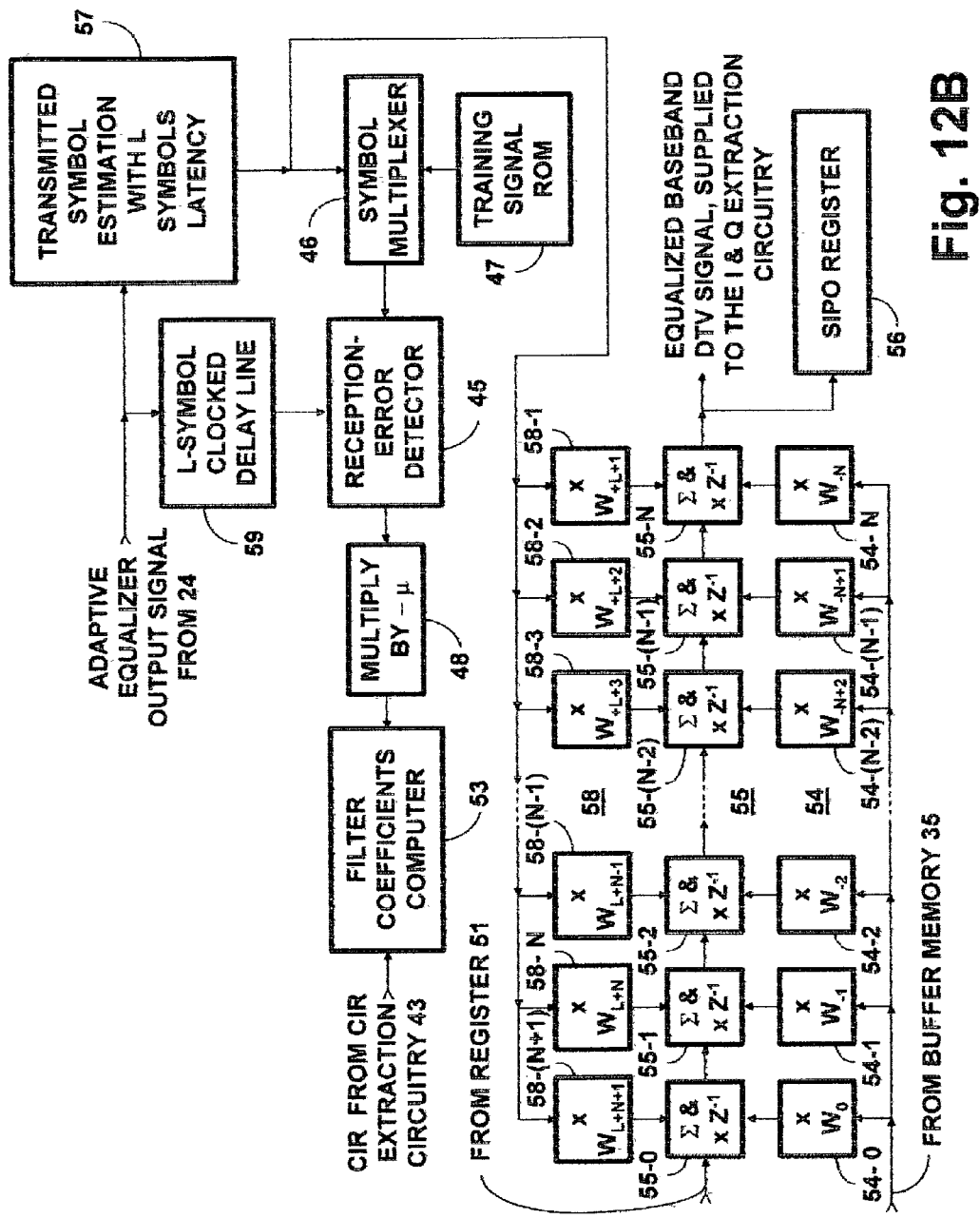
Figure 20:
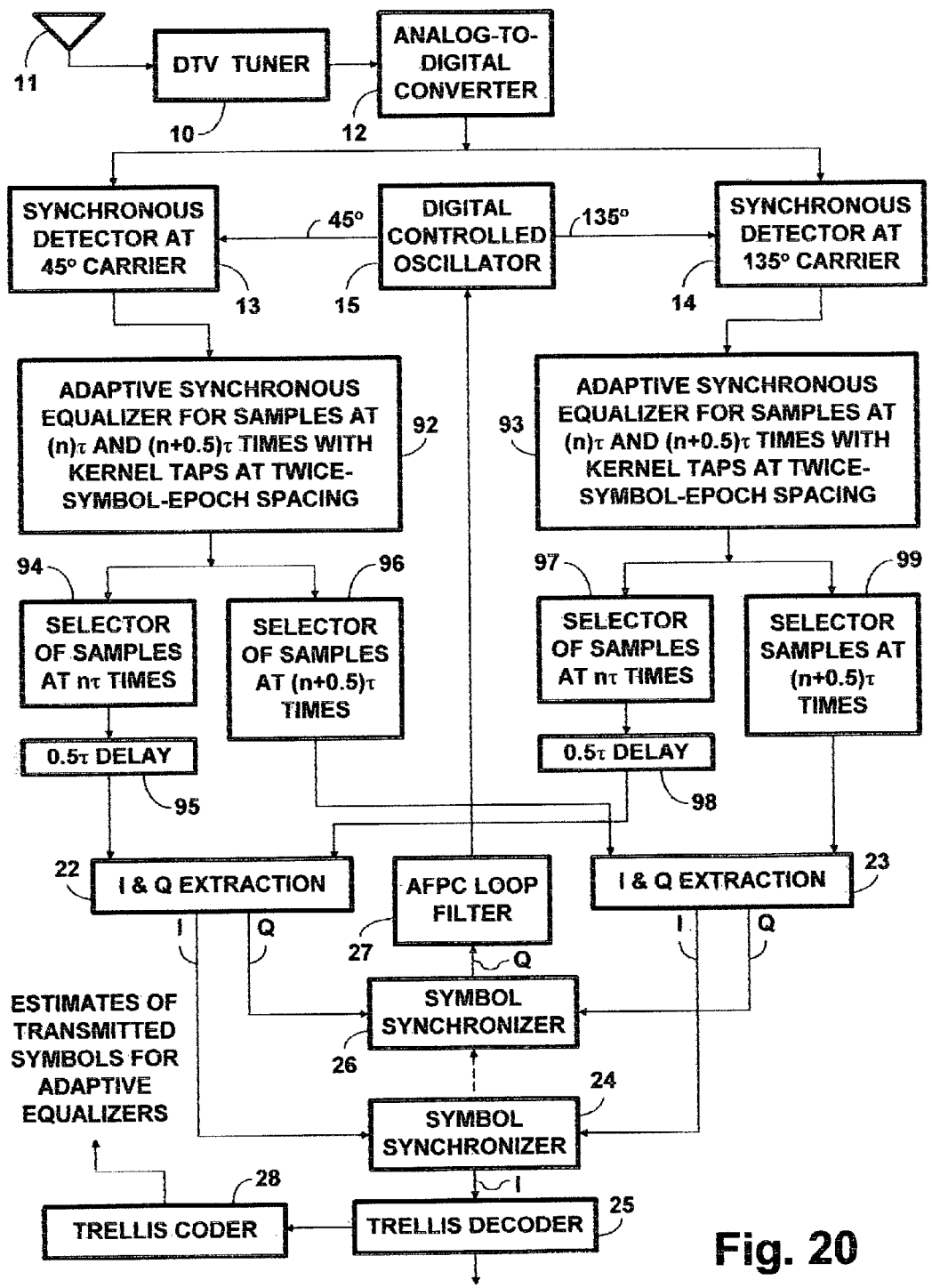
FIG. 20 is a schematic diagram of modifications that are made to the FIG. 1 DTV receiver to reduce the number of multipliers in the adaptive transverse filtering used for echo suppression and channel equalization.
Figure 21:
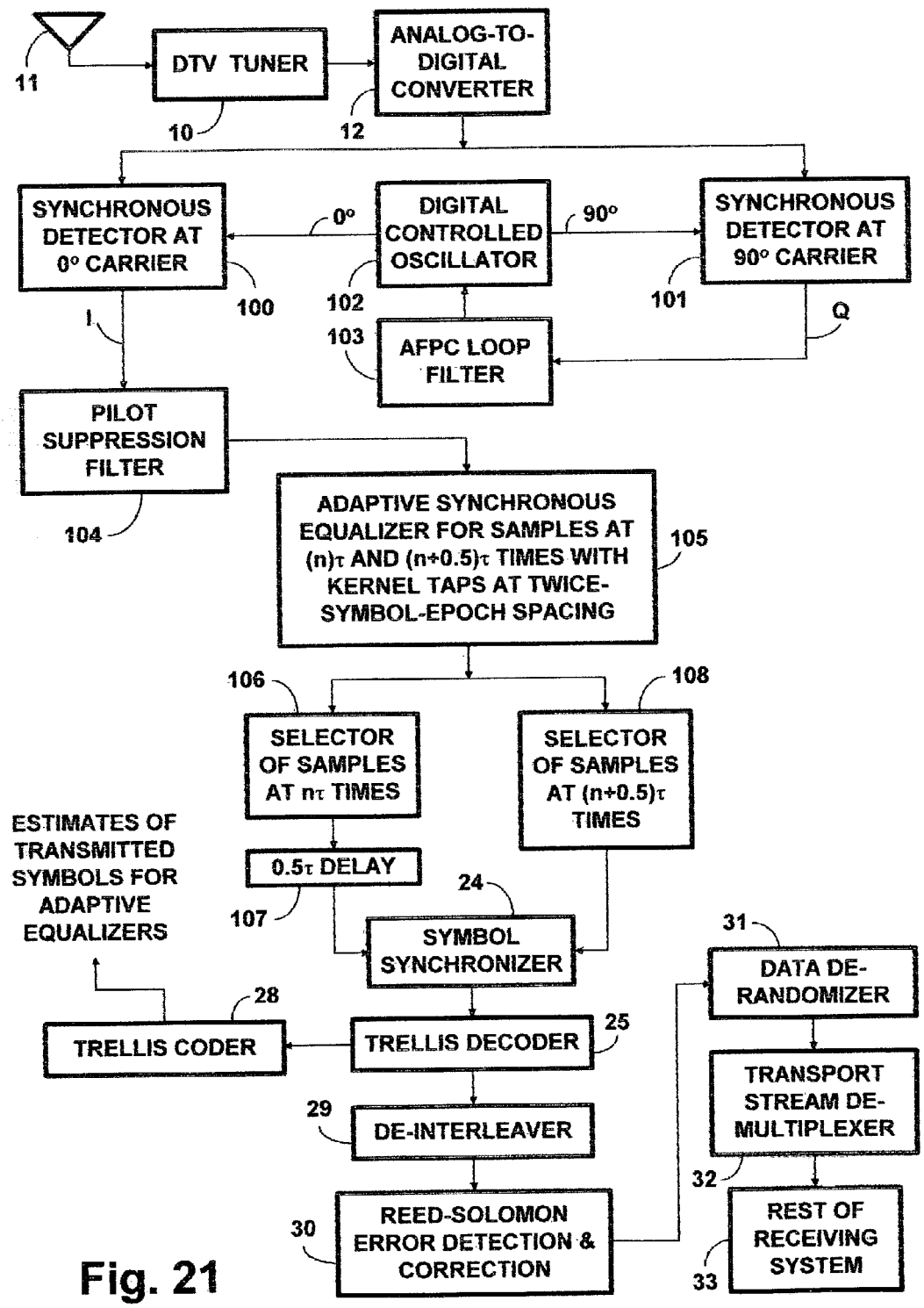
FIG. 21 is a schematic diagram of another DTV receiver in which the invention is embodied, which DTV receiver provides adaptive equalization for real-only baseband DTV signal.

FIGS. 12A and 12B combine as shown in FIG. 12 to form a schematic diagram of an adaptive equalizer structure that can be used in the FIG. 1 DTV receiver, in the FIG. 20 DTV receiver, or in the FIG. 21 DTV receiver. This adaptive equalizer structure differs from the FIG. 2 adaptive equalizer structure in that the chain-of-adders register 37 for suppressing pre-echo components is extended with a preceding chain-of-adders register 51 for suppressing short-delay post-echo components as well. FIG. 12A shows the chain-of-adders register 51 comprising a plurality (M−1) in number of clocked digital adders 51-1, 51-2, 51-3, . . . 51-(M−2) and 51-(M−1) connected, in reverse order of their numeric suffixes, in chain after a clocked data latch 51-M. FIG. 12A shows a bank 52 of read-only-memory digital multipliers, M in number, each supplied signal delayed baseband DTV signal from the buffer memory 35 as a multiplicand input signal. A multiplier 52-M in the bank 52 is connected to supply its product output to the clocked data latch 51-M as input signal thereto. The clocked digital adders 51-1, 51-2, 51-3, . . . 51-(M−2) and 51-(M−1) can be modified by respective summands other than the summands received via the chain connection. Multipliers 52-1, 52-2, 52-3, . . . 52-(M−2) and 52-(M−1) in the bank 52 are connected to supply their respective product output signals to the clocked digital adders 51-1, 51-2, 51-3, . . . 51-(M−2) and 51-(M−1) as their respective other summands. FIG. 12A indicates that the CIR extraction circuitry 43 connects to a filter coefficients computer 53 in FIG. 12B, through which connection extracted CIR signal is transferred to the computer 53.

Delayed baseband DTV signal supplied from the buffer memory 35 in FIG. 12A is the adaptive equalizer input signal applied in FIG. 12B as multiplicand input signal to a bank 54 of digital multipliers, N in number. These multipliers can be constructed in read-only memory, so as to exhibit minimal delay. Digital multipliers 54-0, 54-1, 54-2, . . . 54-(N−2), 54-(N−1) and 54-N in the bank 54 weight the adaptive equalizer input signal by respective weights $W_0$, $W_{-1}$, $W_{-2}$, . . . $W_{-(N-2)}$, $W_{-(N-1)}$, and $W_{-N}$ to generate products applied as summands to clocked digital adders 55-0, 55-1, 55-2, . . . 55-(N−2), 55-(N−1) and 55-N, respectively, which adders are N in number and are connected to form a chain-of-adders register 55. The bank 54 of digital multipliers and the chain-of-adders register 55 shown in FIG. 12B essentially correspond in function to the bank 36 of digital multipliers and the chain-of-adders register 37 in the FIG. 2 adaptive equalizer. The initial clocked digital adder 55-0 in this register 55 is connected to receive, as a further summand input thereto, the sum output signal from the final clocked digital adder 51-1 in the chain-of-adders register 51 depicted in FIG. 12A. The banks 52 and 54 of digital multipliers combine with the cascaded chain-of-adders registers 51 and 55 to form an FIR filter. This FIR filter is used to suppress pre-echoes and short-delay post-echoes in the adaptive equalizer output signal supplied from the final clocked digital adder 55-N in the chain-of-adders register 55 depicted in FIG. 12B. The final clocked digital adder 55-N in the chain-of-adders register 55 is connected to apply its output signal as serial input signal to a serial-in, parallel-out (SIPO) register 56.

In FIG. 12B transmitted symbol estimation circuitry 57 responds to each successive sample of the equalizer output signal supplied from the symbol synchronizer 24 to generate, a purality L symbol epochs later, a corresponding estimate of the symbol actually transmitted. A bank 58 of digital multipliers, N+1 in number, weights these estimates of the symbols actually transmitted, for application to taps in the chain-of-adders register 55. The digital multipliers 58-1, 58-2, 58-3, . . . 58-(N−1), 58-N and 59-(N+1) in the bank 58 can be constructed in read-only-memory to minimize their latent delay. In FIG. 12B a clocked digital delay line 59 responds to each successive sample of the equalizer output signal from the symbol synchronizer 24 to supply a similar sample, L symbol epochs later, to the decision-feedback error detector 45. Post-echoes with less than L symbol epochs delay are denominated "short-delay" post-echoes in this specification and its accompanying drawing. Post-echoes with at least L symbol epochs delay are denominated "long-delay" post-echoes.

The digital multipliers 58-1, 58-2, 58-3, . . . 58-(N−1), 58-N and 58-(N+1) weight each estimate by respective weights $W_{+(L+1)}$, $W_{+(L+2)}$, $W_{+(L+3)}$, . . . $W_{+(L+N-1)}$, $W_{+(L+N)}$ and $W_{+(L+N+1)}$. These weights are computed by the filter coefficients computer 53 and are periodically updated. The filter coefficients computer 53 also computes and periodically updates the weights $W_0$, $W_1$, $W_2$, . . . $W_{-(N-2)}$, $W_{-(N-1)}$, and $W_{-N}$ that FIG. 12B indicates the ROM multipliers 54-0, 54-1, 54-2, . . . 54-(N−2), 54-(N−1) and 54-N in the bank 54 use as their respective multiplier input signals. Furthermore, the computer 53 also computes and periodically updates the weighting coefficients $W_{+1}$, $W_{+2}$, $W_{+3}$, . . . $W_{+(M-2)}$, $W_{+(M-1)}$ and $W_{+M}$ that FIG. 12A indicates the digital multipliers 52-1, 52-2, 52-3, . . . 52-(M−2), 52-(M−1) and 52-M use as their respective multiplier input signals.

Figure 13:
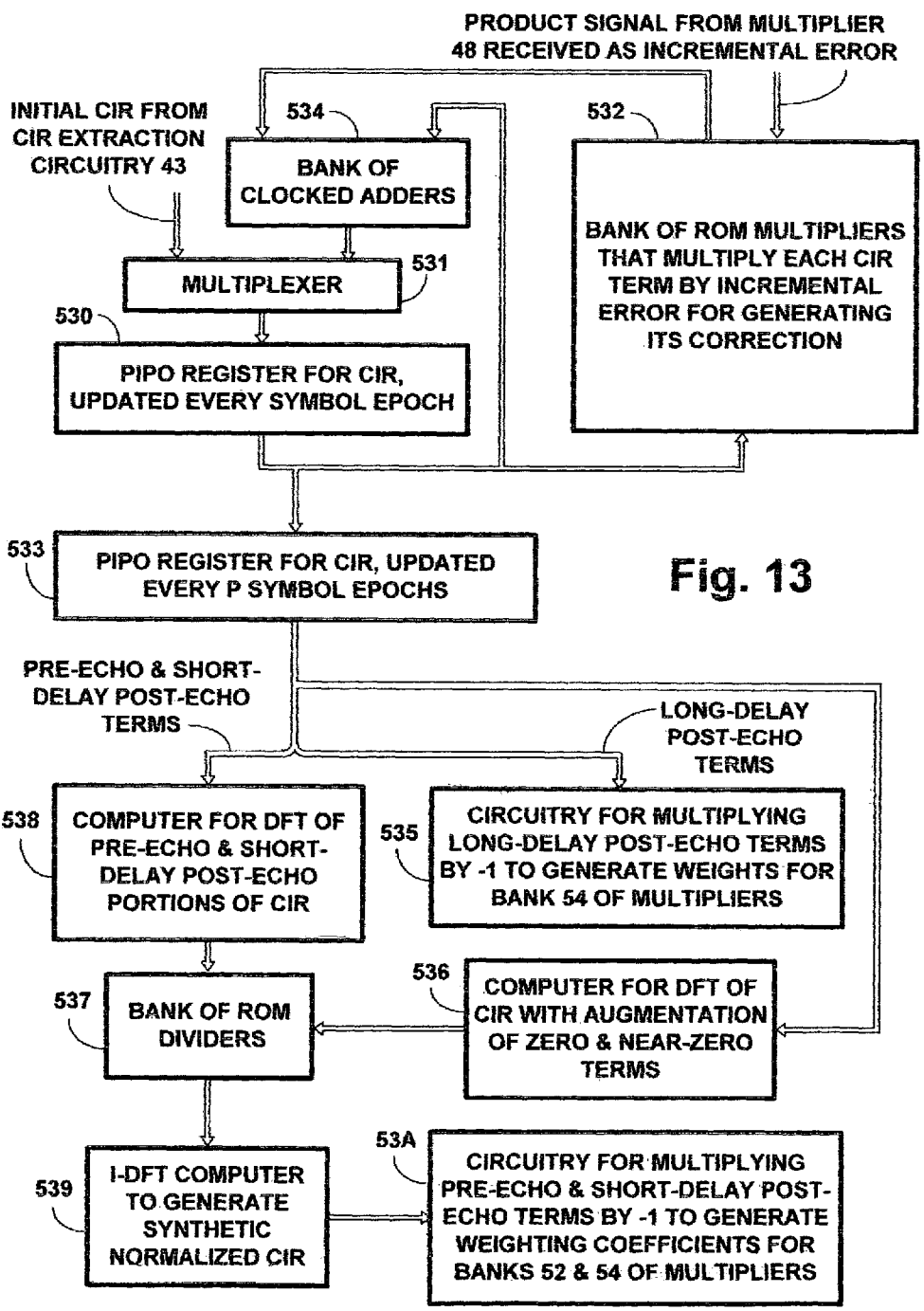
FIG. 13 is a schematic diagram showing details of circuitry in the filter coefficients computer of the adaptive equalizer depicted in FIGS. 12A and 12B.

FIG. 13 shows details of the filter coefficients computer 53, which includes a PIPO register 530 for CIR, a multiplexer 531, a bank 532 of ROM multipliers, a further PIPO register 533 for CIR, and a bank 534 of adders. These elements correspond in structure and operation to the PIPO register 410 for CIR, the multiplexer 411, the bank 412 of ROM multipliers, the PIPO register 434 for normalized CIR and the bank 414 of adders that FIG. 3 shows the FIG. 2 filter coefficients computer 41 to include.

The long-delay post-echo terms of each normalized CIR temporarily stored in the CIR register 533 are multiplied by minus one in circuitry 535. This generates the weighting coefficients $W_{+(L+1)}$, $W_{+(L+2)}$, $W_{+(L+3)}$, . . . $W_{+(L+N-1)}$, $W_{+(L+N)}$ and $W_{+(L+N+1)}$ that the FIG. 12B digital multipliers 58-1, 58-2, 58-3, . . . 58-(N−1), 58-N and 58-(N+1) respectively use as their multiplier input signals. The hR filtering performed by the chain-of-adders register 55 and the bank 58 of digital multipliers cancels all long-delay post-echoes, but pre-echoes and short-delay post-echoes remain to be suppressed by FIR filtering. The portion of the FIR filtering performed by the chain-of-adders register 55 and the bank 54 of multipliers in FIG. 12B suppresses the pre-echoes, and the portion of the FIR filtering performed by the chain-of-adders register 51 and the bank 52 of multipliers in FIG. 12A suppresses the short-delay post-echoes. The calculation of the impulse response of the FIR filtering, as modified so as to account for the echo-suppression components including only pre-echoes of succeeding signal and short-delay post-echoes of preceding signal, is more easily implemented using discrete Fourier transform (DFT) methods.

Accordingly, as FIG. 13 indicates, the computer 53 includes a component computer 536 for computing the DFT of each CIR temporarily stored in the CIR register 533 to determine the channel impulse response in the frequency domain. This DFT provides the divisor terms for a bank 537 of ROM dividers that perform a term-by-corresponding-term division process in the frequency domain, which division process corresponds to a de-convolution process in the time domain. Any terms of the DFT of the normalized CIR that the component computer 536 computes that would be smaller than a prescribed value associated with acceptably small noise growth are augmented by the computer 536, so as to replace the originally computed value with that prescribed value. I.e., the component computer 536 corresponds in structure and operation to the FIG. 3 component computer 416.

The CIR register 533 is connected for supplying the only the pre-echo terms and short-delay post-echo terms of each normalized CIR temporarily stored therein to a component computer 538. The computer 538 computes the DFT of the then-current pre-echo and short-delay post-echo terms for application to the bank 537 of ROM dividers as respective dividend terms for the term-by-corresponding-term division process in the frequency domain. The quotients from the bank 537 of ROM dividers specify a quotient DFT. A component computer 539 is connected to receive this quotient DFT from the bank 437 of ROM dividers and computes the inverse discrete Fourier transform (I-DFT) of the quotient DFT to synthesize the synthetic normalized CIR that is the impulse response in the time-domain that is to be compensated against by the FIR filtering. The echo terms of this synthetic normalized CIR are multiplied by minus one in circuitry 53A. The samples that succeed the sample associated with the cursor provide the weighting coefficients $W_{+1}$, $W_{+2}$, $W_{+3}$, . . . $W_{+(M-2)}$, $W_{+(M-1)}$ and $W_{+M}$ that FIG. 12A indicates the multipliers 52-1, 52-2, 52-3, . . . 52-(M−2), 52-(M−1) and 52-M use as their respective multiplier input signals. The samples that precede the sample associated with the cursor provide the weighting coefficients $W_{-1}$, $W_{-2}$, . . . $W_{-(N-2)}$, $W_{-(N-1)}$, and $W_{-N}$ that FIG. 12B indicates the multipliers 54-1, 54-2, . . . 54-(N−2), 54-(N−1) and 54-N use as their respective multiplier input signals.

Figure 14:
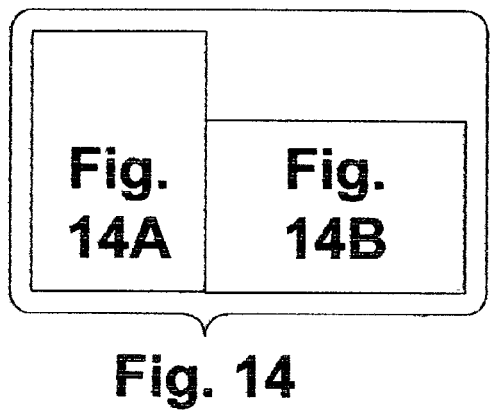
FIGS. 14A and 14B combine as shown in FIG. 14 to form a schematic diagram of an adaptive equalizer alternative to the adaptive equalizer shown in FIGS. 12A and 12B.
Figure 14A:
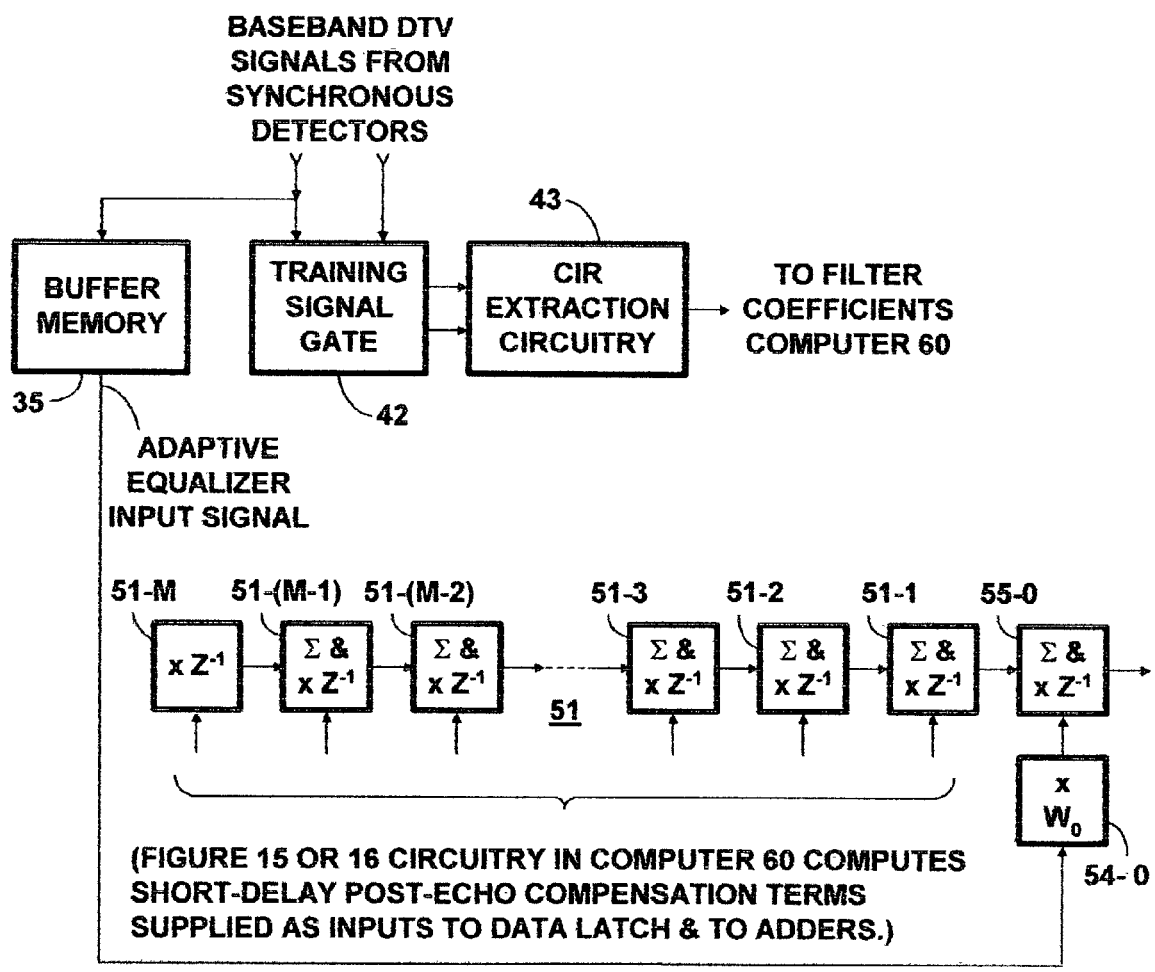
Figure 14B:
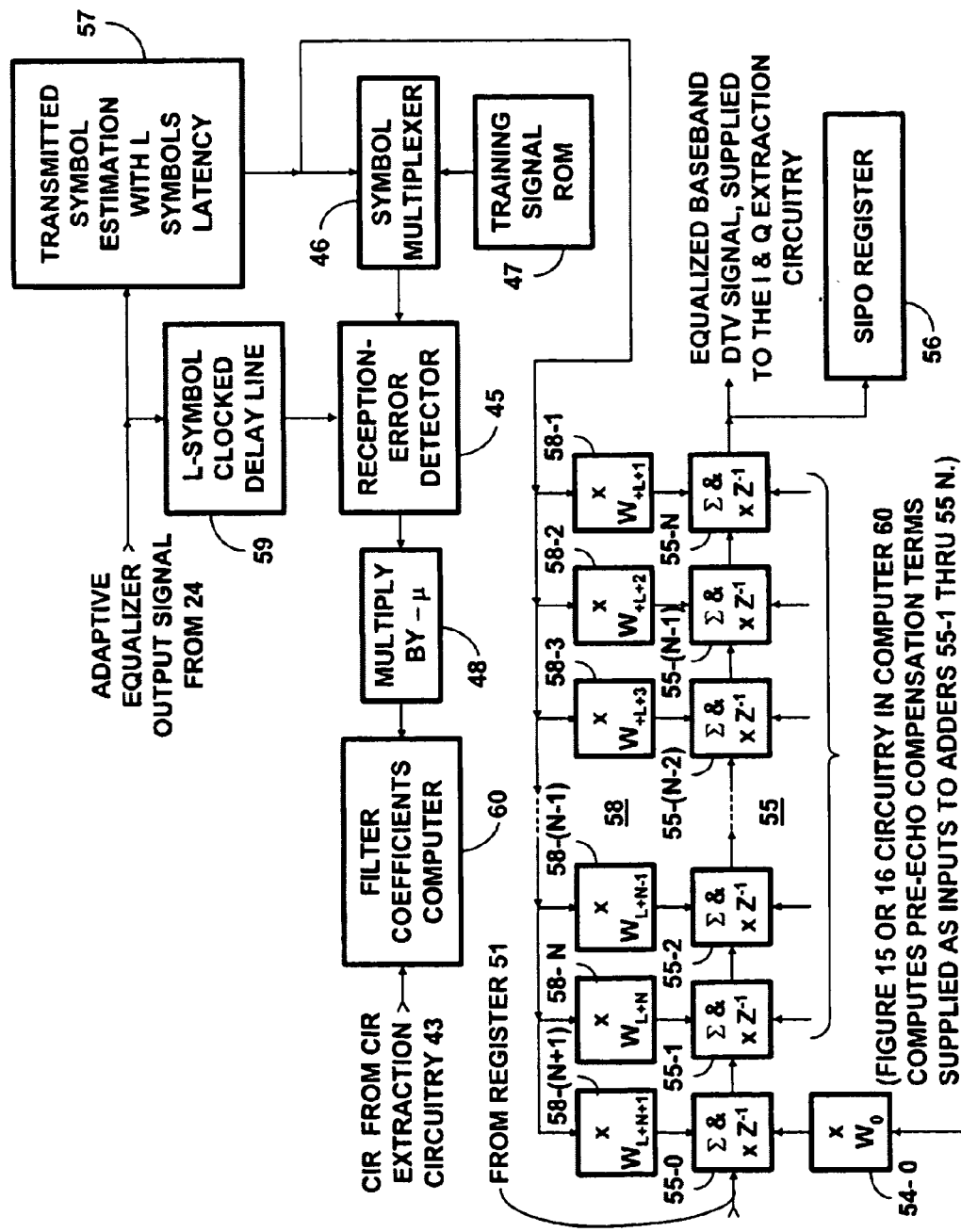

FIGS. 14A and 14B combine as shown in FIG. 14 to form a schematic diagram of an adaptive equalizer structure that can be used in the FIG. 1 DTV receiver, in the FIG. 20 DTV receiver, or in the FIG. 21 DTV receiver. This adaptive equalizer structure differs from that depicted in FIGS. 12A and 12B in that the banks 52 and 54 of multipliers are dispensed with. Instead, the summand terms for FIR filtering are supplied to the chain-of-adders registers 51 and 55 from a filter coefficients computer 60 that replaces the filter coefficients computer 53.

Figure 15:
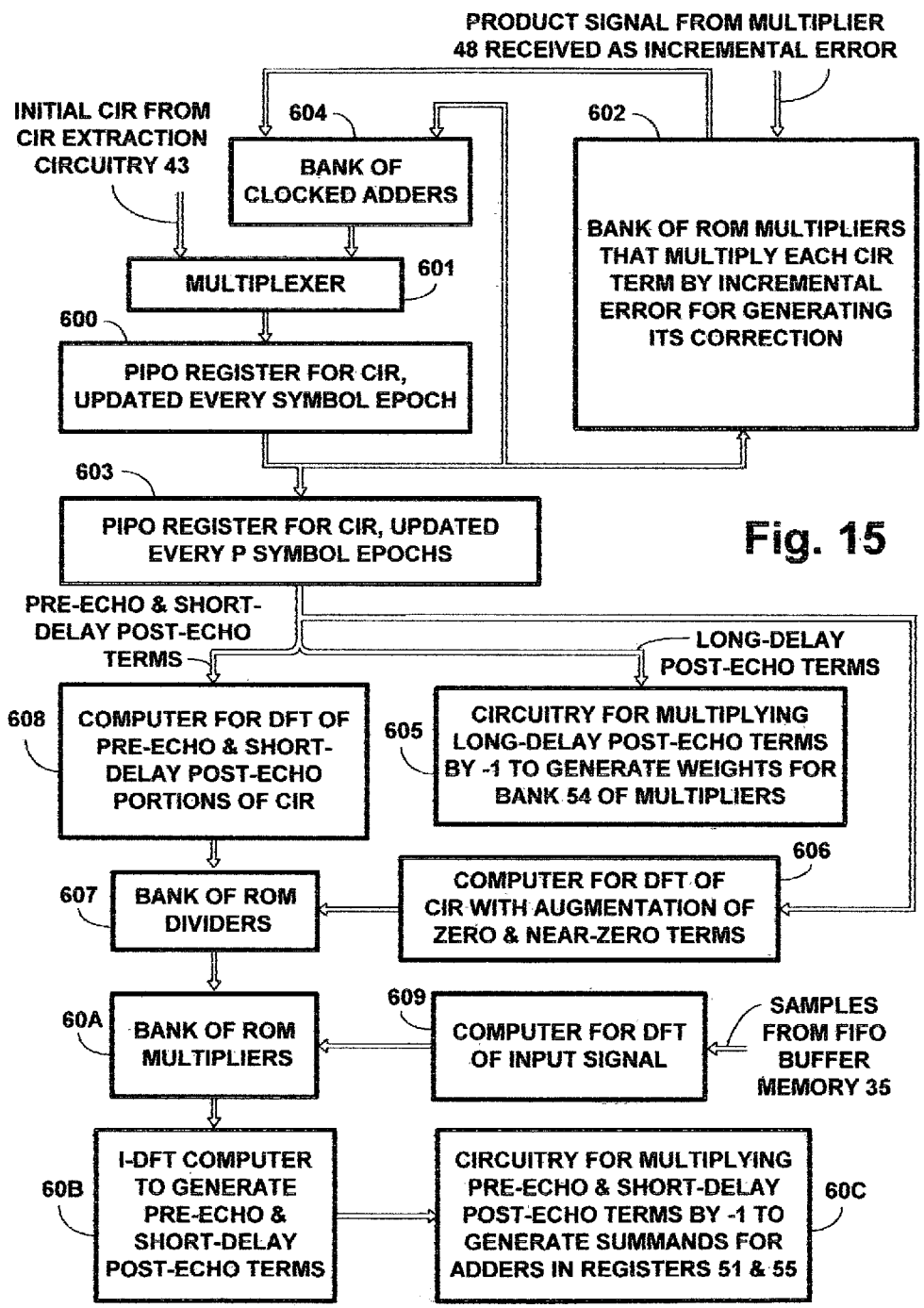
FIG. 15 is a schematic diagram showing details of circuit in one type of filter coefficients computer used with the adaptive equalizer depicted in FIGS. 14A and 14B.

FIG. 15 shows details of the filter coefficients computer 60. The filter coefficients computer 60 includes a PIPO register 600 for CIR, a multiplexer 601, a bank 602 of ROM multipliers, a further PIPO register 603 for CIR, a bank 604 of adders, circuitry 605 for multiplying long-delay post-echo terms in PIPO register 603 by −1, the bank 607 of ROM dividers, and component computers 606 and 608. These elements correspond in structure and operation to the PIPO register 530 for CIR, the multiplexer 531, the bank 532 of ROM multipliers, the further PIPO register 533 for CIR, the bank 534 of adders, the circuitry 535 for multiplying post-echo terms in PIPO register 533 by −1, the bank 537 of ROM dividers, and the component computers 536 and 538 that FIG. 13 shows as being included in the FIG. 12B filter coefficients computer 53.

The cursor term of the CIR temporarily stored in the further PIPO register 603 is applied as a $W_0$ weighting coefficient to the multiplier 54-0 in FIGS. 14A and 14B; and this and this cursor term is also supplied to the I-and-Q-extraction circuitry 22 or 23 of FIG. 1. The long-delay post-echo terms of each normalized CIR temporarily stored in the CIR register 603 are multiplied by minus one in circuitry 605. This generates the weighting coefficients $W_{+(L+1)}$, $W_{+(L+2)}$, $W_{+(L+3)}$, ... $W_{+(L+N-1)}$, $W_{+(L+N)}$ and $W_{+(L+N-1)}$ that the FIG. 14B digital multipliers 58-1, 58-2, 58-3, ... 58-(N−1), 58-N and 58-(N+1) respectively use as their multiplier input signals.

A component computer 609 computes the discrete Fourier transform (DFT) of input signal samples stored in the buffer memory 35. This DFT is supplied to a bank 60A of read-only-memory digital multipliers connected for multiplying this DFT term-by-corresponding-term by the quotient DFT supplied from the bank 607 of ROM dividers. The product output signals of the bank 60A of ROM multipliers generate the DFT of pre-echoes and short-delay post-echoes in the input signal. The DFTs that are multiplied together term-by-corresponding-term by the bank 60A of ROM multipliers are zero-extended before that procedure, so that the product DFT can exhibit growth in the pre-echo and short-delay post-echo terms without their wrapping around. A component computer 60B computes the inverse discrete Fourier transform (I-DFT) of the product DFT to recover samples of the pre-echoes and short-delay post-echoes in the input signal. These samples are multiplied by minus one in circuitry 60C to generate pre-echo compensation signals and short-delay post-echo compensation signals. The pre-echo compensation signal samples preceding the cursor sample are applied as summand input signals to the clocked adders 55-1, 55-2, ... 55-(N−2), 55-(N−1) and 55-N, respectively. The short-delay post-echo compensation signal samples succeeding the cursor sample are applied as summand input signals to the clocked adders 51-1, 51-2, 51-3, ... 51-(M−2) and 51-(M−1) and to clocked data latch 51-M for subsequent application to the clocked adder 51-(M−1). In the intervening sample times until the contents of the SIPO register 56 are completely updated again, the chain-of-adders register 55 is conditioned not to accept any updating of its contents from external summand inputs, but is clocked as a shift register to reload the SIPO register 56.

The term-by-corresponding-term multiplication of the DFT of input signal by the quotient DFT in the FIG. 15 bank 60A of ROM multipliers in the filter coefficients computer 60 of the adaptive equalizer shown in FIGS. 14A and 14B corresponds to the convolution in the time domain performed by the bank 52 of ROM multipliers in FIG. 12A and the bank 54 of ROM multipliers in FIG. 12B. Alternative constructions for the filter coefficients computer 60 take advantage of the fact that partially de-echoed signal with most of the post-echoes canceled is available in the registers 51 and 55.

Figure 16:
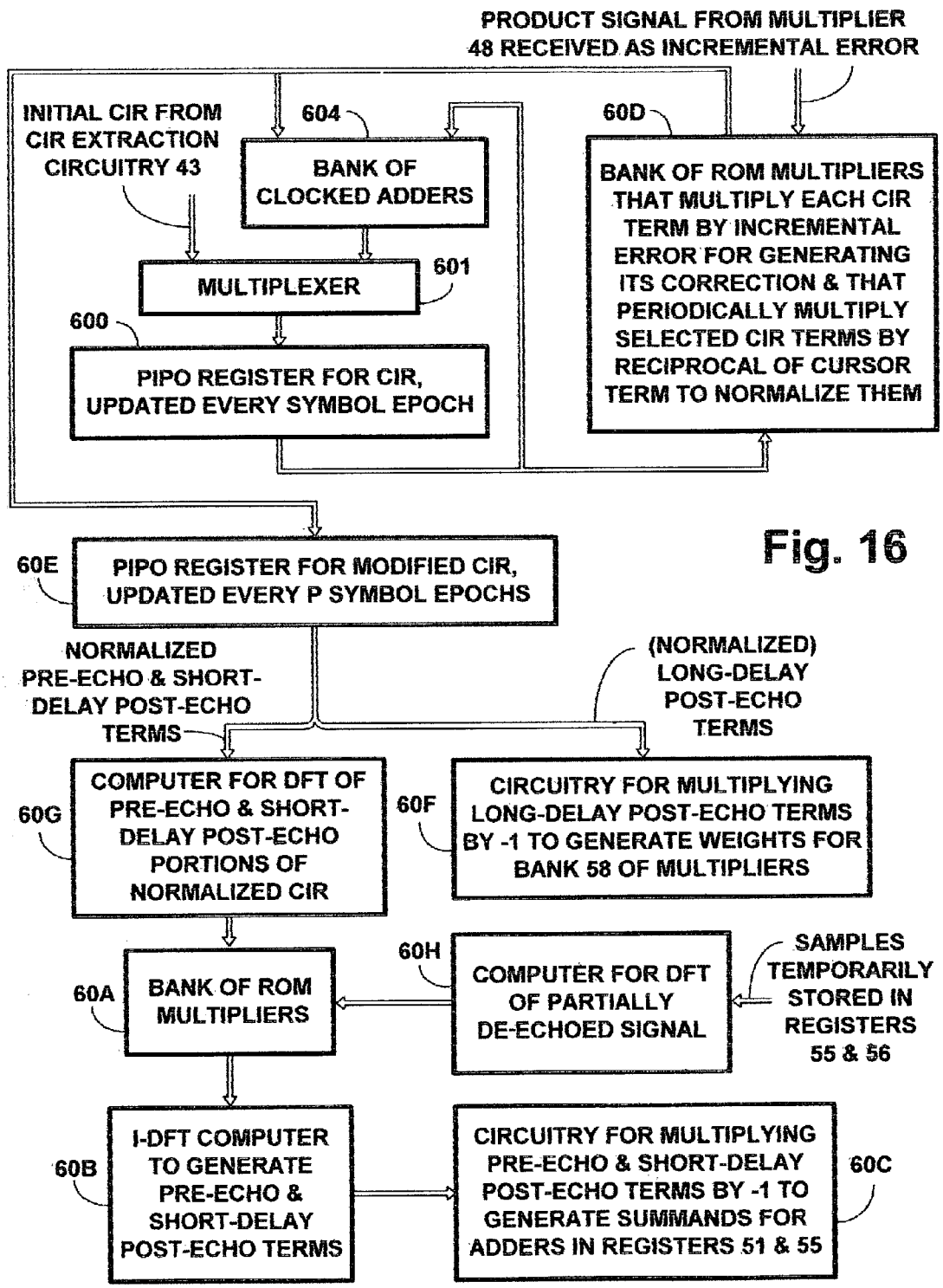
FIG. 16 is a schematic diagram showing details of circuitry in another type of filter coefficients computer alternatively used with the adaptive equalizer depicted in FIGS. 14A and 14B.

FIG. 16 depicts such alternative constructions for the filter coefficients computer 60. The FIG. 16 filter coefficients computer 60 differs from the FIG. 15 filter coefficients computer 60 in that instead of the CIR in the PIPO register 600 being forwarded every P symbol epochs to the further PIPO register 603 for CIR, the CIR from the PIPO register 600 is routed through a bank 60D of ROM multipliers for partial normalization before application to a further PIPO register 60E for CIR. At times other than loading the further PIPO register 60E, the bank 60D of ROM multipliers is operated in conjunction with the PIPO register 600, the multiplexer 601 and the bank 604 of adders in the same way as the batik 602, of ROM multipliers is operated in conjunction with those elements in the FIG. 15 filter coefficients computer 60.

The pre-echo terms and the short-delay post-echo terms of the CIR from the PIPO register 600 are multiplied by $1/W_0$, the reciprocal of the cursor term, in their transfer to the further PIPO register 60E via the bank 60D of ROM multipliers. The cursor term of the CIR from the PIPO register 600 is multiplied by unity in its transfer to the further PIPO register 60F via the bank 60D of ROM multipliers. (Alternatively, the cursor term of the CIR can be transferred directly from the PIPO register 600 to the further PIPO register 60E without passage through a ROM multiplier in the bank 60D of ROM multipliers,) The cursor term of the CIR temporarily stored in the further PIPO register 60E is applied as a $W_0$ weighting coefficient to the multiplier 54-0 in FIGS. 14A and 14B and to the I-and-Q-extraction circuitry 22 or 23 of FIG. 1.

The long-delay post-echo terms of the CIR from the PIPO register 600 are multiplied by unity in their transfer to the further PIPO register 60E via the bank 60D of ROM multipliers, or are transferred directly to the further PIPO register 60E without passage through the bank 60D of ROM multipliers. Alternatively, the long-delay post-echo terms of the CIR from the PIPO register 600 can instead be multiplied by $1/W_0$, the reciprocal of the cursor term, in their transfer to the further PIPO register 60E via the bank 60D of ROM multipliers. FIG. 16 shows connections in which the long-delay post-echo terms temporarily stored in the further PIPO register 60E are multiplied by minus one in circuitry 60F. This generates the weighting coefficients $W_{+(L+1)}$, $W_{+(L+2)}$, $W_{+(L+3)}$, ... $W_{+(L+N-1)}$, $W_{+(L+N)}$ and $W_{+(L+N+1)}$ that the FIG. 14B digital multipliers 58-1, 58-2, 58-3, ... 58-(N−−1), 58-N and 58-(N+1) respectively use as their multiplier input signals.

In some variants of the FIG. 16 circuitry, the long-delay post-echo terms of the CIR from the PIPO register 600 are multiplied by minus unity or by $-1/W_0$ in their transfer to the further PIPO register 60E via the bank 60D of ROM multipliers. The long-delay post-echo terms of the CIR from the further PIPO register 60E are then applied directly to the digital multipliers 58-1, 58-2, 58-3, ... 58-(N−1), 58-N and 59-(N+1) as the weighting coefficients $W_{+(L+1)}$, $W_{+(L+2)}$, $W_{+(L+3)}$, ... $W_{+(L+N-1)}$, $W_{+(L+N)}$ and $W_{+(L+N+1)}$. These variants of the FIG. 16 circuitry dispense with the circuitry 60F for multiplying by minus unity the long-delay post-echo terms of the CIR from the further PIPO register 60E.

A component computer 60G computes the DFT of just the pre-echo and short-delay post-echo portions of the CIR as they appear in normalized form in the further PIPO register 60F. The terms of this DFT supply the multiplicand input signals for the bank 60A of ROM multipliers in FIG. 16. A component computer 60H computes the discrete Fourier transform (DFT) of input signal samples stored in the final P stages of the chain-of-adders register 55 and in the SIPO register 56. The terms of this DFT supply the multiplier input signals for the bank 60A of ROM multipliers in FIG. 16, to multiply term-by-corresponding-term the DFT computed by the component computer 60G. The product output signals of the bank 60A of ROM multipliers generate the DFT of pre-echoes and short-delay post-echoes in the input signal. The DFTs that are multiplied together term-by-corresponding-term by the bank 60A of ROM multipliers are zero-extended before that procedure, so that the product DFT can exhibit growth in the pre-echo terms and short-delay post-echo terms without wrap-around. The component computer 60B computes the I-DFT of the product DFT to recover samples of the pre-echoes and short-delay post-echoes in the input signal. These samples are multiplied by minus one in circuitry 60C to generate pre-echo compensation signals and short-delay post-echo compensation signals. The pre-echo compensation signal samples preceding the cursor sample are applied as summand input signals to the clocked adders 55-1, 55-2, ... 55-(N−2), 55-(N−1) and 55-N, respectively. The short-delay post-echo compensation signal samples succeeding the cursor sample are applied as summand input signals to the clocked adders 51-1, 51-2, 51-3, ... 51-(M−2) and 51-(M−1) and to clocked data latch 51-M for subsequent application to the clocked adder 51-(M−1). In the intervening sample times until the contents of the SIPO register 56 are completely updated again, the chain-of-adders register 55 is conditioned not to accept any updating of its contents from external summand inputs, but is clocked as a shift register to reload the SIPO register 56.

In some variants of the FIG. 16 circuitry, the long-delay post-echo terms of the CIR from the PIPO register 60O are multiplied by minus unity or by $-1/W_0$ in their transfer to the further PIPO register 60E via the bank 60D of ROM multipliers. The long-delay post-echo terms of the CIR from the further PIPO register 60E are then applied directly to the digital multipliers 58-1, 58-2, 58-3, ... 58-(N−1), 58-N and 58-(N+1) as the weighting coefficients $W_{+(L+1)}$, $W_{+(L+2)}$, $W_{+(L+3)}$, ... $W_{+(L+N-1)}$, $W_{+(L+N)}$ and $W_{+(L+N+1)}$. These variants of the FIG. 16 circuitry dispense with the circuitry 60F for multiplying by minus unity the long-delay post-echo terms of the CIR from the further PIPO register 60E.

Figure 17:
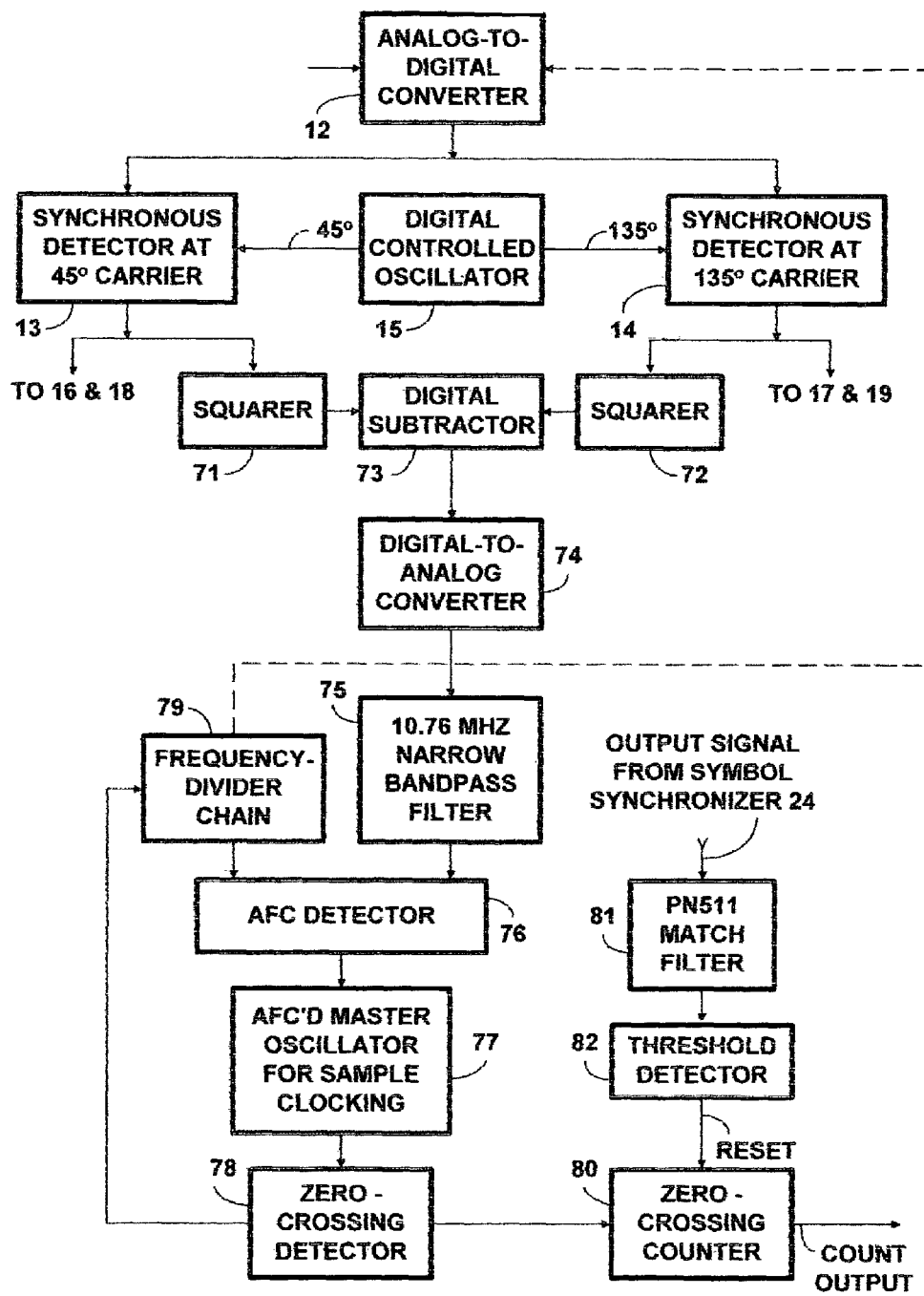
FIG. 17 is a schematic diagram showing details of typical circuitry for controlling sample clocking in the FIG. 1 DTV receiver.

FIG. 17 shows typical circuitry for controlling sample clocking in the FIG. 1 DTV receiver. This circuitry employs bright-spectral-line techniques to regenerate the 10.76 MHz symbol clock frequency. The digital samples of baseband DTV signals recovered by the synchronous demodulators 13 and 14 are squared by squarers 71 and 72, respectively. The resulting squared samples are then differentially combined by a digital subtractor 73 to generate a digital difference signal with a strong 10.76 MHz component in its system function. The digital subtractor 73 is connected for supplying this digital difference signal to a digital-to-analog converter 74 for conversion to an analog signal with a strong 10.76 MHz component. The DAC 74 is connected for applying that analog signal as an input signal to a narrow bandpass filter 75 for selecting the 10.76 MHz component as first input signal to an automatic-frequency-control detector 76. The narrow bandpass filter 75 typically includes a surface-acoustic-wave (SAW) filter designed to exhibit minimal change in phase response near the center of its passband. Alternative ways of supplying the narrow bandpass filter 75 all analog signal with a strong 10.76 MHz component are known, envelope detection of DTV IF signal being one of them.

Figure 19:
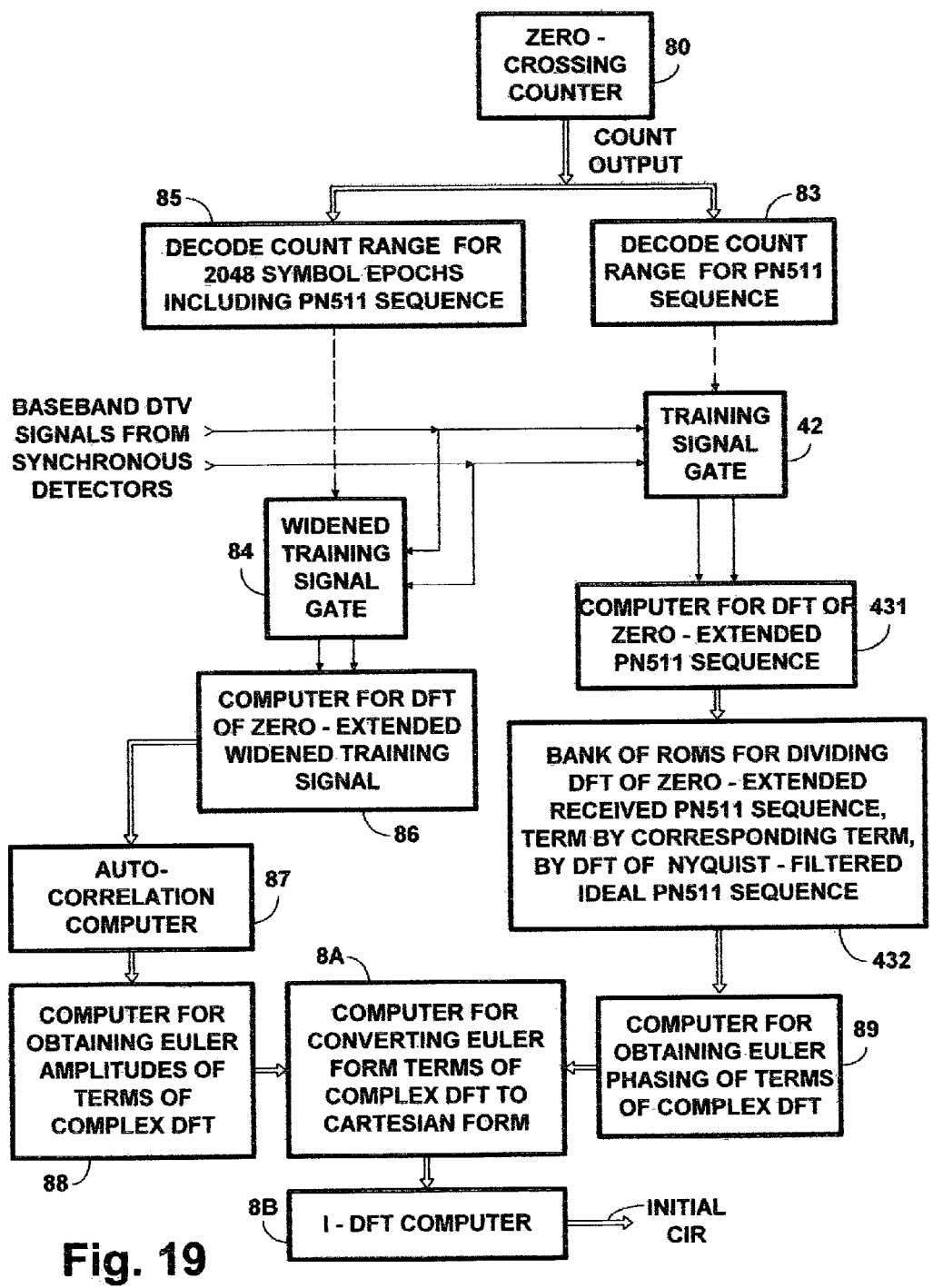
FIG. 19 is a schematic diagram showing details of circuitry for determining the channel impulse response from a received training signal, which circuitry is alternative to that shown in FIG. 18 and is used in other DTV receivers embodying the invention.

The AFC detector 76 supplies automatic-frequency-control signal for adjusting the frequency of oscillations generated by a master oscillator 77 for clocking digital sampling throughout the DTV receiver. The master oscillator 77 is typically a crystal-controlled-oscillator having a natural oscillation frequency that is a multiple of 10.76 MHz. The average-axis or "zero" crossings of the sinusoidal oscillations of the master oscillator 77 are detected by a zero-crossing detector 78, which typically comprises a symmetrical clipper followed by a differentiator and then a pulse rectifier. The pulses generated by the zero-crossing detector 78 when the sinusoidal oscillations of the master oscillator 77 cross average axis are supplied as input trigger signal to a frequency-divider chain 79 of flip-flops. The frequency-divider chain 79 divides the frequency of the master oscillator 77 oscillations to a nominally 10.76 MHz submultiple thereof for application to the AFC detector 76 as its second input signal. The AFC detector 76 compares the frequencies of its first and second input signals over time to generate the AFC error signal used to trim the frequency of the master oscillator 77 oscillations. This trimming is done to regulate the second input signal supplied to the AFC detector 76 so as to match the 10.76 MHz symbol rate of the DTV transmitter from which the FIG. 1 DTV receiver currently receives DTV signals. This locks the frequency of the master oscillator 77 oscillations to a predetermined multiple of the 10.76 MHz symbol rate of the DTV signal currently being received. The frequency-divider chain 79 supplies signals related to the frequency of the master oscillator 77 oscillations for clocking various digital operations in the FIG. 1 DTV receiver. By way of example, FIG. 19 shows a control connection from the frequency-divider chain 79 to the ADC 12 for controlling digital sampling therein.

The pulses generated by the zero-crossing detector 78 when the sinusoidal oscillations of the master oscillator 77 cross average axis are supplied as count input to a zero-crossing counter 80. The zero-crossing counter 80 counts the number of average-axis of the sinusoidal oscillations of the master oscillator 77 over one or more data frames, and the counter 80 count output or portions thereof can be decoded for controlling many operations in the DTV receiver. For example, the count range in which an echo-cancellation reference signal is expected to occur is decoded for controlling the training signal gate 42. It is generally convenient to construct the counter 80 so that, in respective portions of its complete count, the counter 80 modularly counts the number of samples per symbol epoch, the number of symbol epochs per data segment, the number of data segments per data field, and the number of data fields per data frame. This simplifies decoding portions of the full count for respective operations in the DTV receiver.

FIG. 17 shows apparatus for synchronizing the count from the counter 80 responsive to the occurrence of the PN511 sequence in the first data segment of each field of a DTV signal transmitted in accordance with the ATSC Digital Television Standard Document A/53, Annex D. A PN511 match filter 81 is connected for responding to the baseband DTV signal supplied from the symbol synchronizer 24 as its output signal. The response of the PN511 match filter 81 exhibits a very high peak when the PN511 sequence occurs in the first data segment of each data field. A threshold detector 82 responds to the occurrence of this very high peak to generate a reset signal, which is supplied to the counter 80. Responsive to this reset signal the binary counter stages in the counter 80 are jam loaded to cause a prescribed count output from the counter 80. More sophisticated circuits for periodically resetting the counter 80 to prescribed count output are possible, of course, as known or obvious to those skilled in the art.

Up to this point, this specification has chiefly concerned itself with the tracking operation of the adaptive equalizers 16, 17, 20 and 21, after the initial values of the weighting coefficients in these digital filters have been established. The initialization of the weighting coefficients in these digital filters will depend on whether or not changes are made in the ATSC Digital Television Standard set forth in Document A/53 (Annex D). Modifications of Annex D to include repetitive-PN511 or repetitive-PN1023 sequences with baud rate symbols at either +5 or −5 modulation levels in each data field have been proposed. With such modifications the computation of initial values of the weighting coefficients for the adaptive equalizers 16, 17, 20 and 21 can be done by DFT methods adapted from those described by Charles Dietrich and Arthur Greenberg in U.S. Pat. No. 5,065,242 issued 23 Aug. 1994 and titled "DEGHOSTING APPARATUS USING PSEUDORANDOM SEQUENCES". More specific description of the computation of initial values of the weighting coefficients for adaptive equalizers from repetitive-PN511 sequences can be found in U.S. patent application No. 20010033341 published Oct. 25, 2001; titled "GHOST CANCELLATION REFERENCE SIGNALS FOR BROADCAST DIGITAL TELEVISION SIGNAL RECEIVERS AND RECEIVERS FOR UTILIZING THEM"; and filed by A. L. R. Limberg on Jan. 18, 2001. Correspondingly titled U.S. Pat. No. 6,816,204 issued Nov. 9, 2004. More specific description of the computation of initial values of the weighting coefficients for adaptive equalizers from repetitive-PN1023 sequences can be found in U.S. patent application No. 20020051087 published May 2, 2002; titled "REPETITIVE-PN1023-SEQUENCE ECHO-CANCELLATION REFERENCE SIGNAL FOR SINGLE-CARRIER DIGITAL TELEVISION BROADCAST SYSTEMS"; and filed by A. L. R. Limberg, J. D. McDonald and C. B. Patel on Jul. 11, 2001. Correspondingly titled U.S. Pat. No. 6,768,517 issued Jul. 27, 2004. The initialization of the weighting coefficients of the adaptive equalizers 16, 17, 20 and 21 when receiving DTV signals transmitted in accordance with Document A/53, Annex D is a substantially more challenging task.

Figure 18:
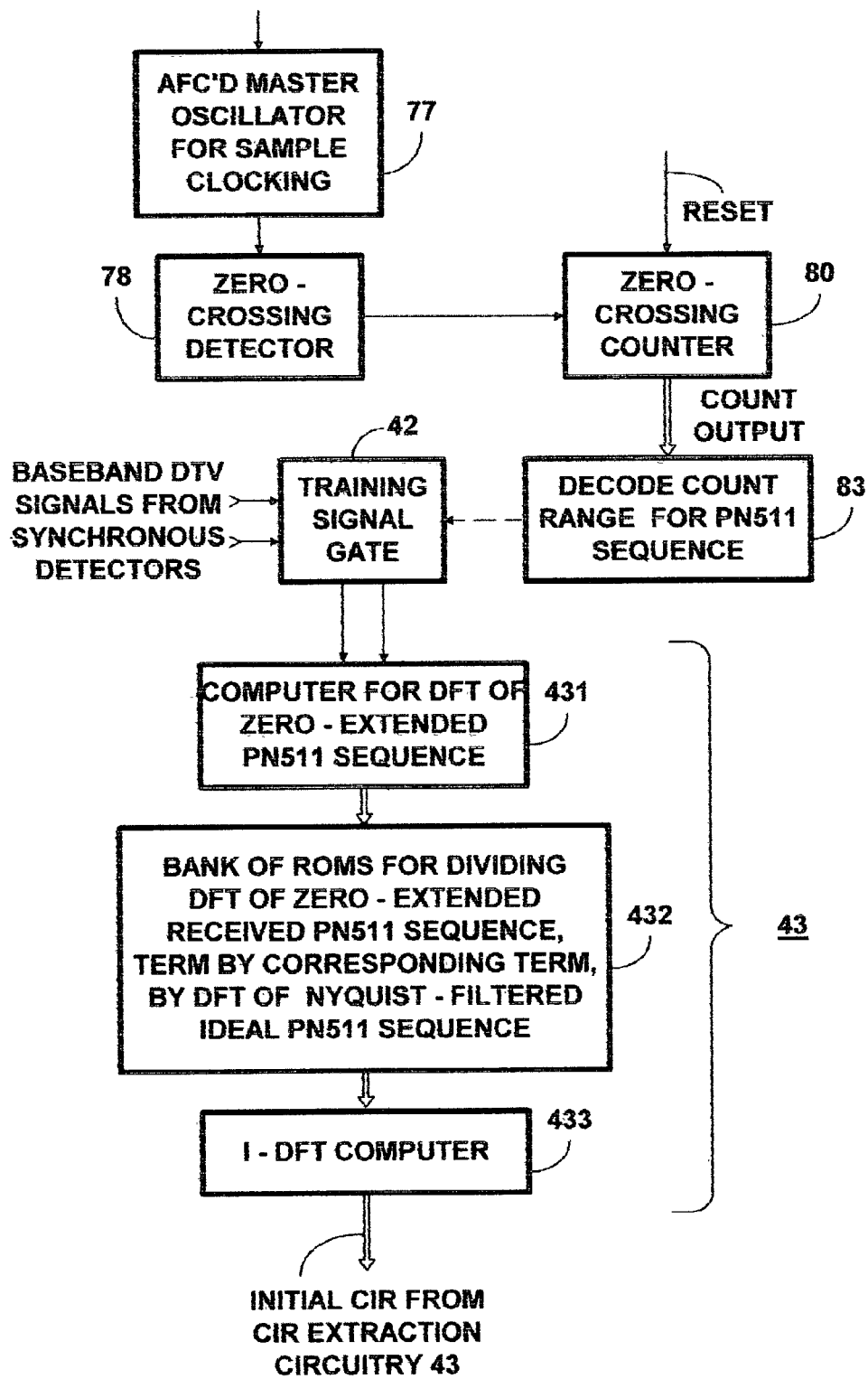
FIG. 18 is a schematic diagram showing details of circuitry for determining the channel impulse response from a received training signal, which circuitry is used in some DTV receivers embodying the invention.

FIG. 18 shows details of the CIR extraction circuitry 43 in a less expensive embodiment of the FIG. 1 DTV receiver that is designed to receive DTV signals transmitted in accordance with Document A/53, Annex D. A decoder 83 is connected for responding to a range of counter 80 output count corresponding to the interval when PN511 sequence is expected to occur, to generate a control signal. This control signal conditions the training signal gate 42 to extract those portions of the responses of the synchronous detectors 13 and 14 that occur at the times the PN511 sequence occurs in the initial segment of each data field. A computer 431 in the CIR extraction circuitry 43 zero-extends the extracted PN511 sequence to at least 1024 samples and thereafter computes the DFT of the-zero-extended sequence. A bank 432 of read-only memories divides this DFT, term by corresponding term by the DFT of a Nyquist-filtered ideal PN511 sequence to generate the initial CIR in the frequency domain. A computer 433 computes the inverse discrete Fourier transform of the initial CIR in the frequency domain to generate the initial CIR in the time domain from which the initial weighting coefficients for the adaptive equalizers 16, 17, 20 and 21 are determined.

This initial CIR is close enough that the customary operating procedures can establish close tracking within a few thousand symbols. However, in order to accomplish this, the trellis decoder 25 has to make very few errors or none at all, so that the decisions fed in to the decision feedback part of the decoder are cumulatively correct. This means that, when multipath reception conditions are adverse, establishing tracking (or re-establishing tracking, if it be lost) is apt to be slow or may not be possible. Start-up performance of the DTV receiver using the single PN511 sequence is improved by limiting the amount of new data processed in each successive set of DFT computations to only 256 symbols or less. The improvement is as compared to the processing of 2048 symbols or so of new data that is customary once close tracking has been established.

FIG. 19 shows details of how the initial CIR is extracted in a more expensive embodiment of the FIG. 1 DTV receiver that is designed to receive DTV signals transmitted in accordance with Document A/53, Annex D. A decoder 84 is connected for generating a control signal in response to ranges of counter 80 output count that overlap the conclusions of data, fields and extend into the beginnings of succeeding data fields when PN511 sequences should occur. This control signal conditions a widened training signal gate 84 to selectively reproduce concurrent portions of the baseband DTV signals that the synchronous detector 13 and the synchronous detector 14 supply. The widened training signal gate 84 is connected for supplying these reproduced portions of the baseband DTV signal as input signal to a computer 86. The computer 86 is used for computing the DFT of each sequence selectively reproduced by the gate 84 during an interval 2048 or 4096 symbol epochs long.

A further computer 87 performs an auto-correlation of this DFT to generate a CIR in the frequency domain. If this CIR in the frequency domain were converted to Euler form, a portion of its amplitude spectrum would be similar to that of the CIR generated from the bank 432 of ROMs as converted to Euler form. However, this portion of the amplitude spectrum of the CIR generated by the computer 87 is relatively free of the noise caused by edge effects that would reduce the SNR of the amplitude spectrum of the CIR generated from the bank 432 of ROMs in response to just the PN511 sequence. The phases of the corresponding spectral components would differ owing in the time differential in when the samples are taken for computation of the CIR generated by the computer 87 and the CIR generated from the bank 432 of ROMs. A computer 88 converts the CIR generated by the computer 87 in the frequency domain to recover the amplitude spectrum portion of that CIR expressed in Euler form. A computer 89 converts the CIR generated from the bank 432 of ROMs in the frequency domain to recover the phasing portions of that CIR expressed in Euler form. In accordance with an aspect of the invention as embodied in preferred forms of DTV receiver, a computer 8A combines the amplitude spectrum portion of the CIR generated by the computer 87 with the corresponding phasing portion of the CIR generated from the bank 432 of ROMs. This is done so as to generate a CIR in the frequency domain that is expressed in Euler form and that has about a 3 dB better SNR than the CIR generated from the bank 432 of ROMs in the frequency domain would have if converted to Euler form. The computer 8A subsequently converts to Cartesian form this initial CIR in the frequency domain, which CIR is expressed in Euler form and has better SNR. A computer 8B computes the inverse discrete Fourier transform of the initial CIR in the frequency domain, as expressed in Cartesian form to generate the initial CIR in the time domain from which the initial weighting coefficients for the adaptive equalizers 16, 17, 20 and 21 are determined.

In a variant of the FIG. 19 circuitry the widened training signal gate 84 is interposed between the synchronous detection circuitry and the training signal gate 42. A variant of the FIG. 19 circuitry in which the inverse-DFT of the CIR in the frequency domain that is expressed in Euler form is calculated without conversion to Cartesian form is possible, with the inverse-DFT results being subsequently converted to Cartesian form.

FIG. 20 shows modifications of the FIG. 1 DTV receiver that replace the adaptive synchronous equalizers 16 and 17, the shim delay circuitry 18 and 19, and the adaptive synchronous equalizers 20 and 21. Adaptive equalizers 92 and 93 perform a novel species of synchronous equalization in the FIG. 20 modifications. The adaptive synchronous equalizer 92 has the same number of digital multipliers as each of the adaptive synchronous equalizers 16 and 20. The adaptive synchronous equalizer 93 has the same number of digital multipliers as each of the adaptive synchronous equalizers 17 and 21. So, the FIG. 20 modification halves the number of digital multipliers used for equalization.

FIG. 20 the samples at $n\tau$ times and the samples at $(n+0.5)\tau$ times in the baseband DTV signal from the synchronous detector 13 remain time-division multiplexed for application as input signal to the adaptive synchronous equalizer 92. The adaptive synchronous equalizers 16 and 20 in the FIG. 1 DTV receiver have respective sets of weighting coefficients, which sets of weighting coefficients are similar to each other. The set of weighting coefficients in the FIG. 20 adaptive synchronous equalizer 92 is the same as the respective sets of weighting coefficients in the FIG. 1 adaptive synchronous equalizers 16 and 20, but these weighting coefficients are applied to kernel taps two half-symbol-epochs apart, rather than a single-symbol-epoch apart. The intervening kernel taps in the adaptive synchronous equalizer 92 have zero-valued weighting coefficients associated with them. Selector circuitry 94 selects to shim delay circuitry 95 baud-rate alternate samples of adaptive synchronous equalizer 92 response to the samples at $n\tau$ times of the baseband DTV signal from the synchronous detector 13. The shim delay circuitry 95 delays these samples one-half a symbol epoch for application to the I-and-Q-extraction circuitry 22 as a replacement for the response of the FIG. 1 adaptive synchronous equalizer 20. Selector circuitry 96 selects to the I-and-Q-extraction circuitry 23 baud-rate alternate samples of adaptive synchronous equalizer 92 response to the samples at $(n+0.5)\tau$ times of the baseband DTV signal from the synchronous detector 13. In FIG. 20 the output signal from the selector circuitry 96 replaces the response of the FIG. 1 adaptive synchronous equalizer 16 as input signal for the I-and-Q-extraction circuitry 23.

In FIG. 20 the samples at $n\tau$ times and the samples at $(n+0.5)\tau$ times in the baseband DTV signal from the synchronous detector 14 remain time-division multiplexed for application as input signal to the adaptive synchronous equalizer 93. The adaptive synchronous equalizers 17 and 21 in the FIG. 1 DTV receiver have respective sets of weighting coefficients, which sets of weighting coefficients are similar to each other. The set of weighting coefficients in the FIG. 20 adaptive synchronous equalizer 93 is the same as the respective sets of weighting coefficients in the FIG. 1 adaptive synchronous equalizers 17 and 210, but these weighting coefficients are applied to kernel taps two half-symbol-epochs apart, rather than a single-symbol-epoch apart. The intervening kernel taps in the adaptive synchronous equalizer 93 have zero-valued weighting coefficients associated with them. Selector circuitry 97 selects to shim delay circuitry 98 baud-rate alternate samples of adaptive synchronous equalizer 93 response to the samples at $n\tau$ times of the baseband DTV signal from the synchronous detector 14. The shim delay circuitry 98 delays these samples one-half a symbol epoch for application to the I-and-Q-extraction circuitry 22 as a replacement for the response of the FIG. 1 adaptive synchronous equalizer 21. Selector circuitry 99 selects to the I-and-Q-extraction circuitry 23 baud-rate alternate samples of adaptive synchronous equalizer 93 response to the samples at $(n+0.5)\tau$ times of the baseband DTV signal from the synchronous detector 14. In FIG. 20 the output signal from the selector circuitry 99 replaces the response of the FIG. 1 adaptive synchronous equalizer 17 as input signal for the I-and-Q-extraction circuitry 23.

The DTV receiver as shown in FIG. 1 and or as modified per FIG. 20 provides for the equalization of Q imaginary baseband DTV signal as well as the equalization of I real baseband DTV signal. However, equalization of Q imaginary baseband DTV signal is foregone in some designs in order to reduce the delay in the AFPC loop for the DCO used to generate orthogonal digital carriers for synchrodyning the IF DTV signal to baseband.

FIG. 21 shows a DTV receiver that provides for the equalization of the real component I of a complex baseband DTV signal, but not for the equalization of its imaginary component Q. FIG. 21 shows the ADC 12 connected to digitize IF DTV signal from the tuner 10 to be applied as a respective input signal to each of two synchronous detectors 100 and 101. The two synchronous detectors 100 and 101 are connected for performing respective synchronous detection procedures nominally in phase with the suppressed carrier of the IF DTV signal and in quadrature with the suppressed carrier of the IF DTV signal, respectively. In actual practice the two synchronous detectors 100 and 101 are usually constructed as parts of a shared structure including digital complex multiplier apparatus. The digitized IF DTV signal is supplied to a phase-splitter in this shared structure for conversion to a complex digital multiplicand for the digital complex multiplier apparatus. A digital controlled oscillator (DCO) 102 is connected for supplying the digital complex multiplier apparatus with a digital complex multiplier signal. This digital complex multiplier signal is composed of two digital carrier signals orthogonal in their respective phasings. Nominally, one of these two digital carrier signals is in phase with the suppressed carrier of the digitized IF DTV signal, and the other of these two digital carrier signals is advanced 90° respective to the suppressed carrier of the digitized IF DTV signal. The demodulation results for the synchronous detectors 100 and 101 are the real and imaginary components, respectively, of the complex product signal generated by the digital complex multiplier apparatus in their shared structure. The demodulation results for the synchronous detectors 100 and 101 are each composed of a set of samples of baseband DTV signals generated at twice Nyquist rate.

The samples of the imaginary component Q of the baseband DTV signal generated by the synchronous detector 101 are supplied to an AFPC loop filter 103, which responds with an automatic-phase-and-frequency-control (AFPC) signal for the DCO 102. The AFPC loop formed by feeding back the AFPC signal to the DCO 102 is designed to control the phases of the orthogonal digital carrier signals to keep synchrodyning of the digitized IF signal by the synchronous detector 100 in phase with the suppressed carrier of the digitized IF DTV signal and to keep synchrodyning of the digitized IF signal by the synchronous detector 101 in quadrature with the suppressed carrier of the digitized IF DTV signal.

The samples of the real component I of the complex baseband DTV signal generated by the synchronous detector 100 are applied as input signal to a pilot suppression filter 104. The pilot suppression filter 104 suppresses in its system response the zero-frequency component of the samples of the real-only baseband DTV signal I, which zero-frequency component usually is primarily attributable to synchronous detection of the pilot. The pilot suppression filter 104 is connected to apply its pilot-free response as input signal to an adaptive synchronous equalizer 105. The AFPC loop for the DCO 102 is not routed through channel-equalization and echo-suppression filtering, so there is no need for such filtering to preserve the zero-frequency component attributable to synchronous detection of the pilot. The data slicing procedures in the quantizers of the adaptive synchronous equalizer 105 are simplified if the data slicing bills are symmetrically disposed above and below zero-signal level. The suppression of the zero-frequency pilot component of the response of an adaptive synchronous equalizer can be done just before quantization, but doing it before the application of input signal to the equalizer has a number of practical advantages known to equalizer designers. For example, the suppression of the zero-frequency pilot component of the input signal to the adaptive synchronous equalizer 105 reduces the dynamic range required for that signal, since fluctuation of that the zero-frequency pilot component no longer is a consideration in determining that dynamic range.

FIG. 21 shows the adaptive synchronous equalizer 105 having adjustable weighting coefficients applied to kernel taps two half-symbol-epochs apart, rather than a single-symbol-epoch apart. The intervening kernel taps in the adaptive synchronous equalizer 105 have zero-valued weighting coefficients associated with them. This procedure halves the number of multipliers used in the adaptive equalizer compared to spacing kernel taps a single-symbol-epoch apart in two adaptive synchronous equalizers, one for processing even samples at nτ times and the other for processing odd samples at (n+0.5τ) times.

Selector circuitry 106 selects to shim delay circuitry 107 baud-rate samples of adaptive synchronous equalizer 105 response to the alternate samples at nτ times of the baseband DTV signal from the synchronous detector 100. The shim delay circuitry 107 delays these samples one-half a symbol epoch for application to the symbol synchronizer 24. Selector circuitry 108 selects to the symbol synchronizer 24 baud-rate samples of adaptive synchronous equalizer 105 response to alternate samples at (n+0.5)τ times of the baseband DTV signal from the synchronous detector 100. The symbol synchronizer 24 combines the equalized real (I) components of the baseband DTV signal supplied from the I shim delay circuitry 107 and from the selector circuitry 108 to generate the samples of the equalized real (I) component of baseband DTV signal applied to the trellis decoder 25. The symbol synchronizer 24 combines the equalized real components such that the samples applied to the trellis decoder 25 are timed to occur at τ intervals that minimize inter-symbol interference (ISI). The circuitry in the FIG. 21 receiver after the trellis decoder 25 is similar to that in the FIG. 1 DTV receiver.

Figure 22:
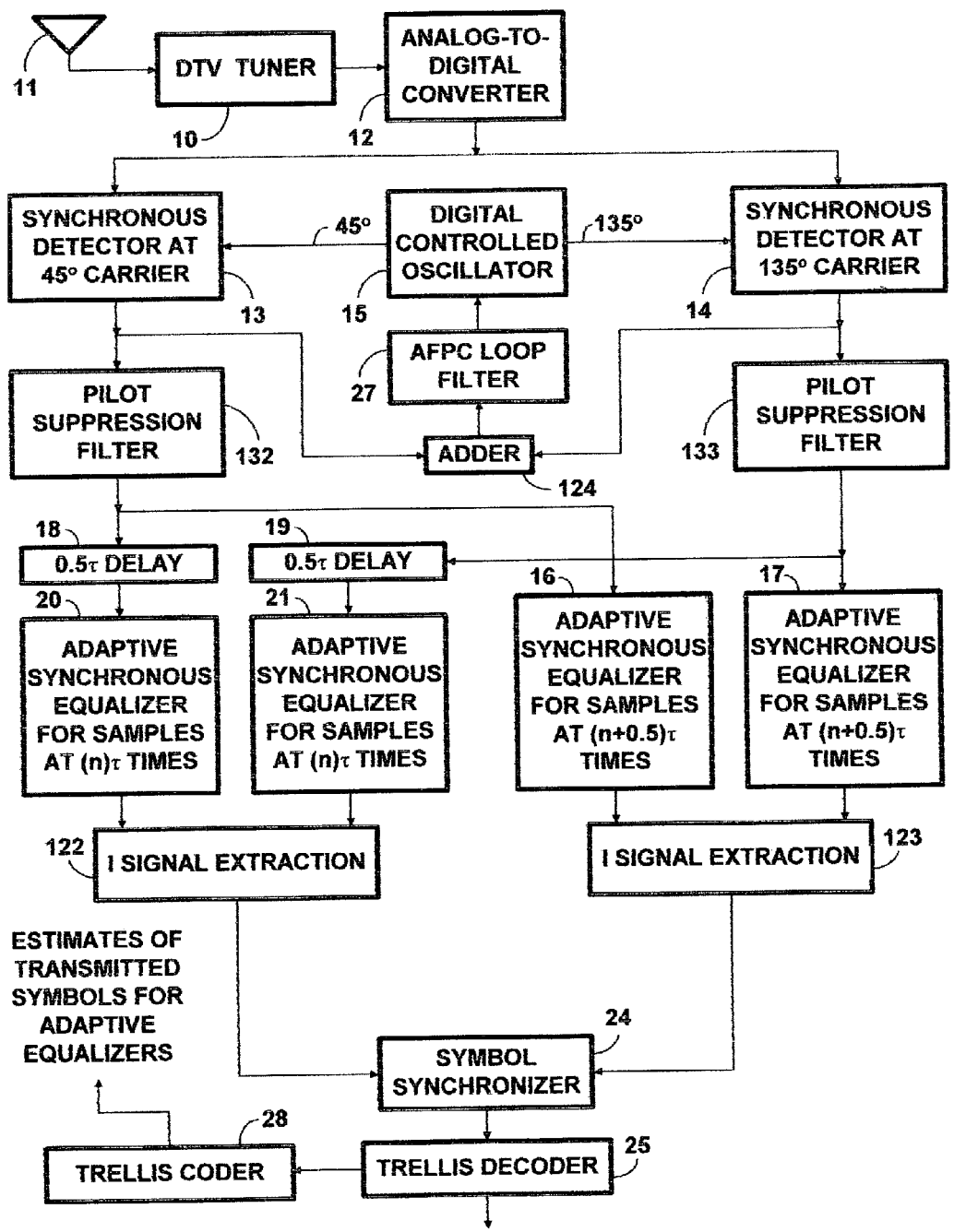
FIG. 22 is a schematic diagram of modifications made to the FIG. 1 DTV receiver in another embodiment of the invention, which modifications exclude the adaptive equalizer from carrier tracking circuitry.

FIG. 22 shows how the FIG. 1 DTV receiver is modified so that the adaptive equalizer is not included in the DCO 15 AFPC loop. An adder 124 additively combines the responses of the synchronous detectors 13 and 14 to obtain a sum signal that is, in effect, a synchronous detection response for 90° digital carrier when reception is free from multipath distortion. This sum signal is supplied to the AFPC loop filter 27 for being lowpass filtered to generate AFPC signal for controlling the DCO 15. In the FIG. 1 DTV receiver modified per FIG. 22, the AFPC loop for the DCO 15 is not routed through the adaptive synchronous equalizers 16, 17, 20 and 21. So, there is no need for the equalizers 16, 17, 20 and 21 to preserve the zero-frequency component attributable to synchronous detection of the pilot.

A pilot suppression filter 132 is connected for receiving as its input signal the synchronous detector 13 response. The pilot suppression filter 132 is connected for applying its response, which is essentially free of zero-frequency pilot component, as input signal to the adaptive synchronous equalizer 16 and as input signal to the shim delay circuitry 18. A pilot suppression filter 133 is connected for receiving as its input signal the synchronous detector 14 response. The pilot suppression filter 133 is connected for applying its response, which is essentially free of zero-frequency pilot component, as input signal to the adaptive synchronous equalizer 17 and as input signal to the shim delay circuitry 19.

In the FIG. 22 modification of the FIG. 1 DTV receiver I-extraction circuitry 122 replaces the I-and-Q-extraction circuitry 22 and I-extraction circuitry 123 replaces the I-and-Q-extraction circuitry 23. The I-extraction circuitry 122 can be constructed similarly to the I-and-Q-extraction circuitry 22 shown in FIG. 4, but omitting the adder 227 and the ROM multipliers 226, 228 and 229. The I-extraction circuitry 123 can constructed similarly to the I-and-Q-extraction circuitry 23 shown in FIG. 5, but omitting the adder 237 and the ROM multipliers 236, 238 and 239.

Figure 23:
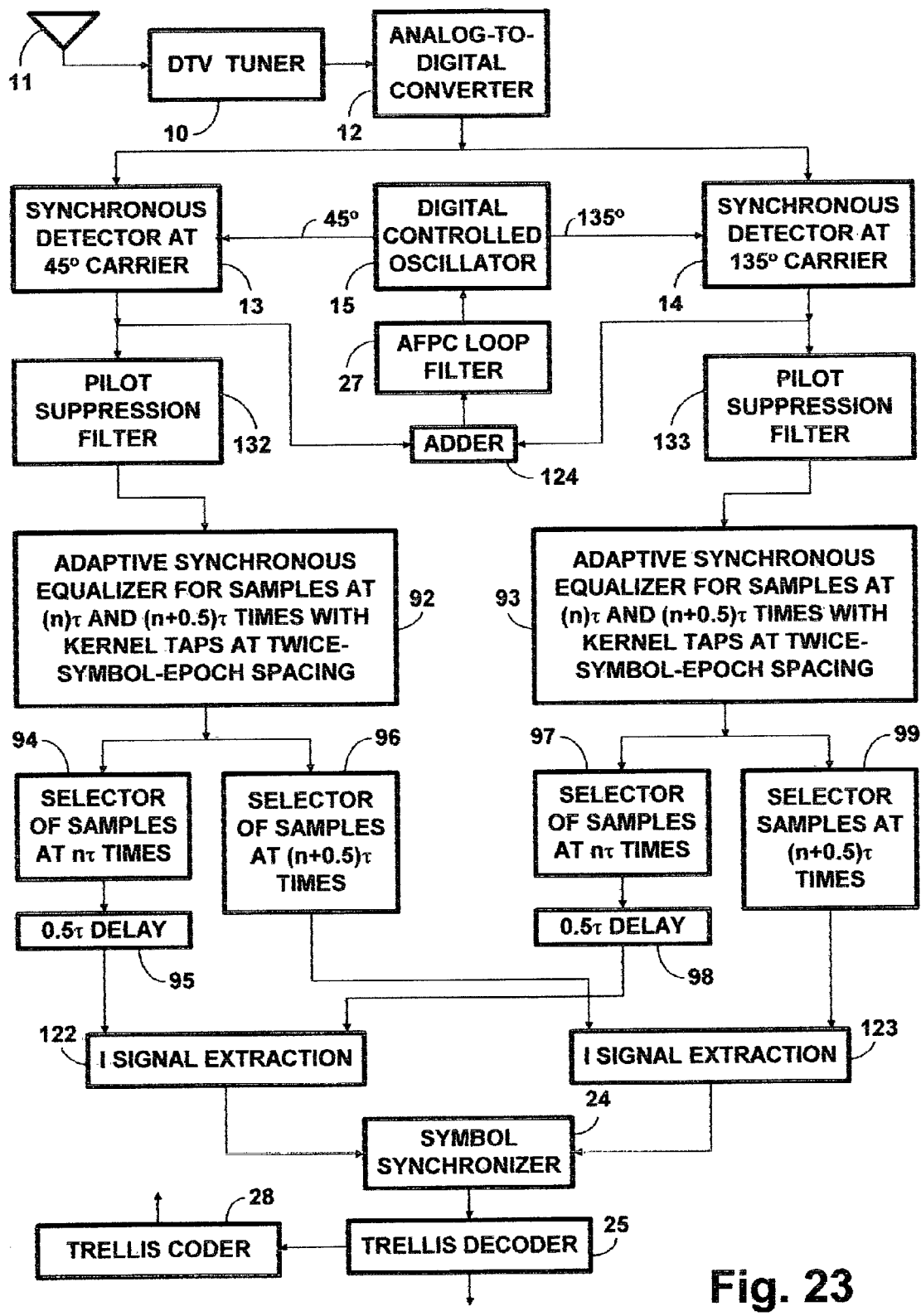
FIG. 23 is a schematic diagram of further modifications to the FIG. 1 DTV receiver modified per FIG. 20 in another embodiment of the invention, which modifications exclude the adaptive equalizer from carrier tracking circuitry.

FIG. 23 shows how the FIG. 20 modification of the FIG. 1 DTV receiver is modified so that the adaptive equalizer is not included in the DCO 15 AFPC loop. The further modifications in FIG. 23 are similar to the modifications in FIG. 22, described in the preceding paragraph.

Figure 24:
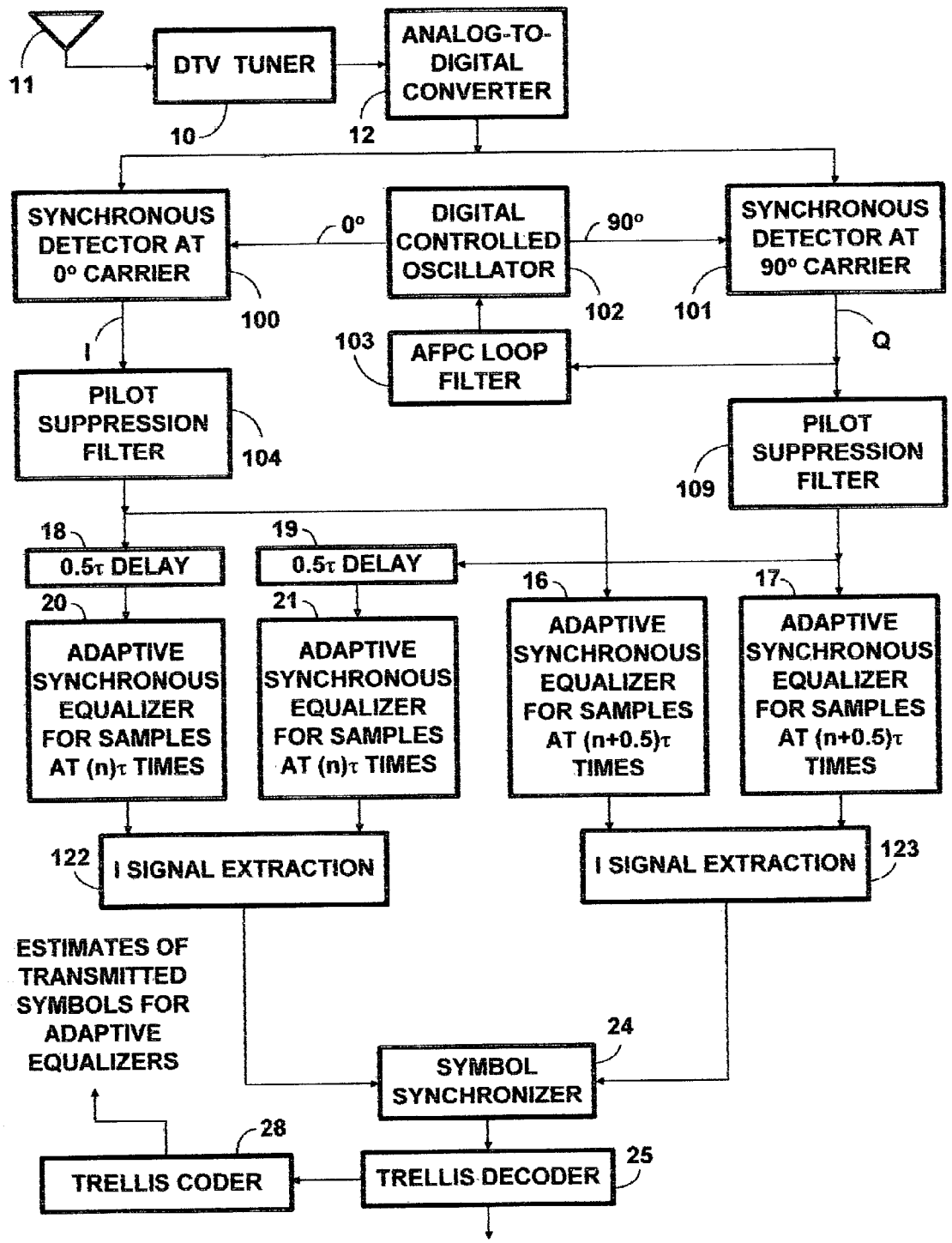
FIG. 24 is a schematic diagram of further modifications to the FIG. 1 DTV receiver modified per FIG. 22 that substitute synchronous detectors demodulating at 0° and 90°, respectively, for synchronous detectors demodulating at 45° and 135°, respectively.

FIG. 24 shows the FIG. 1 DTV receiver as modified in FIG. 22 further modified so as to substitute the synchronous detectors 100 and 101 demodulating at 0° and 90° for the synchronous detectors 13 and 14 demodulating at 45° and 135°. As in the FIG. 21 DTV receiver, the digital controlled oscillator (DCO) 102 is connected for supplying two digital carrier signals for implementing synchronous detection by the synchronous detectors 100 and 101. Nominally, one of these two digital carrier signals is in phase with the suppressed carrier of the digitized IF DTV signal, and the other of these two digital carrier signals is advanced 90° respective to the suppressed carrier of the digitized IF DTV signal. The imaginary component Q of the baseband DTV signal generated by the synchronous detector 101 is supplied to an AFPC loop filter 103, which responds with an AFPC signal for the DCO 102. As in the FIG. 21 DTV receiver, a pilot suppression filter 104 is connected for receiving, as its input signal, the I signal demodulated by the synchronous detector 100. Another pilot suppression filter 109 of construction similar to the filter 104 is connected for receiving, as its input signal, the Q signal demodulated by the synchronous detector 101. The samples of the baseband DTV signals from the pilot suppression filters 104 and 109 occurring at $(n+0.5)\tau$ times are applied as input signals to the adaptive equalizers 16 and 17, respectively, in a 2:1 decimation procedure. The samples of the baseband DTV signals from the synchronous pilot suppression filters 104 and 109 occurring at $n\tau$ times are delayed $0.5\tau$ by re-clocking in the shim delay circuitry 18 and 19, respectively. The re-clocked samples from the shim delay circuitry 18 and from the shim delay circuitry 19 are applied as input signals to adaptive equalizers 20 and 21, respectively, in a 2:1 decimation procedure. The re-clocking in the shim delay circuitry 18 and 19 temporally aligns the subsets of samples occurring at $n\tau$ times that are applied as input signals to the adaptive equalizers 20 and 21 with the subsets of samples occurring at $(n+0.5)\tau$ times that are applied as input signals to the adaptive equalizers 16 and 17.

A surprising result in the operation of the DTV receiver modified as shown in FIG. 24 is that the weighting coefficients of the adaptive equalizers 17 and 21 are automatically adapted so they perform as a Hilbert filter to supply samples at $n\tau$ times and at $(n+0.5)\tau$ times of de-echoed signal similar to those supplied by the adaptive equalizers 16 and 20. This result confirms the capability of the FIG. 1 DTV receiver modified per FIG. 22 to correct for demodulation by the synchronous detectors 13 and 14 being rotated from the nominal demodulation axes.

A variant of the FIG. 24 modification of the FIG. 1 DTV receiver inserts a Hilbert filter after the synchronous detector 101. In this variant the adaptive equalizer 17 and the shim delay 19 are connected to receive the Hilbert filter response as their respective input signals, rather than to receive their input signals directly from the synchronous detector 101. In this variant, the synchronous detector 100 response is delayed to compensate for the latent delay in the Hilbert filter, and the adaptive equalizer 16 and the shim delay 18 are connected to receive this delayed synchronous detector 100 response as their respective input signals, rather than to receive their input signals directly from the synchronous detector 100.

Figure 25:
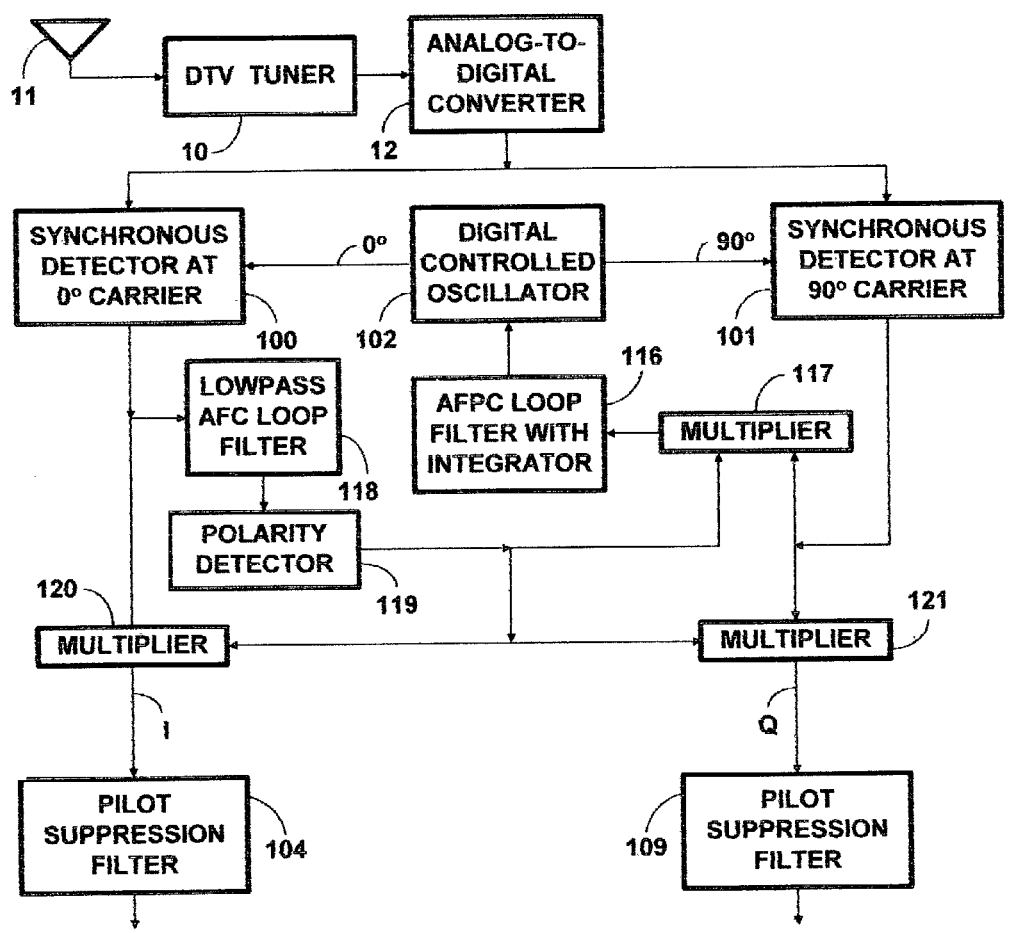
FIG. 25 is a schematic diagram showing how the FIG. 22 DTV receiver or the FIG. 24 DTV receiver is modified to incorporate a Costas loop for carrier recovery.

FIGS. 1 and 20 show a simple AFPC loop being used to develop AFPC signal for the DCO 15, which loop includes the adaptive synchronous equalization filtering. FIGS. 22 and 23 show a simple AFPC loop being used to develop AFPC signal for the DCO 15, which loop excludes the adaptive synchronous equalization filtering. The bandwidth of the AFPC loop filter 27 can be chosen to be around 2 kHz. FIGS. 21 and 25 show a simple AFPC loop being used to develop AFPC signal for the DCO 102, which loop excludes the adaptive synchronous equalization filtering. The bandwidth of the AFPC loop filter 103 can also be chosen to be around 2 kHz. A 2 kHz bandwidth for the AFPC loop of carrier recovery circuitry is common practice since it allows phase noise in the DTV receiver local oscillators to be tracked, but keeps the effects of data on the AFPC signal negligible. An AFPC loop of such narrow bandwidth restricts the range of frequency over which local oscillations can be pulled into phase-lock with the carrier of the IF DTV signal more than is desirable in a DTV receiver intended for the home market. For this reason, it is preferable that a Costas type of AFPC loop is used to develop AFPC signal for the DCO 15 in modifications of the DTV receivers of FIGS. 1, 20, 22 and 23. For the same reason, it is preferable that a Costas type of AFPC loop is used to develop AFPC signal for the DCO 103 in modifications of the DTV receivers in FIGS. 21 and 24.

FIG. 25 shows specifically how the FIG. 21 DTV receiver or the FIG. 24 receiver is modified to use a Costas type of AFPC loop to develop AFPC signal for the DCO 103. The AFPC loop is preferably constructed using digital circuitry, but resembles an AFPC loop constructed using analog circuitry that is described in Subsection 10.2.3.2 "Channel filtering and VSB carrier recovery" of ATSC Document A/54 *Guide to the Use of the ATSC Digital Television Standard* published 4 Oct. 1995. In these modifications the AFPC loop filter 103 is replaced by an AFPC loop filter 116 with an integrator. The synchronous detector 101 is connected for applying the samples of the imaginary component Q of the baseband DTV signal that it generates to a multiplier 117 as a multiplicand input signal. The multiplier 117 is connected to supply its product output signal to the AFPC loop filter 116. The synchronous detector 100 is connected for applying the samples of the real component I of the baseband DTV signal that it generates to a lowpass AFC loop filter 118 as input signal thereto. The AFC loop filter 118 is designed to exhibit lag in its response to the frequencies contained in the real component I of the baseband DTV signal which lag increases with frequency, from zero lag at zero-frequency to 90° at a frequency well above the filter 118 cut-off frequency of about 100 kHz. A polarity detector 119 is connected to receive the lowpass AFC loop filter 118 response as input signal. The polarity detector 119 is connected to supply its output signal to the multiplier 117 as a multiplier input signal.

Since the AFC loop filler 118 has a lowpass cut-off frequency of about 100 kHz, the spectral energy in demodulated data from the synchronous detector 100 and from any strong Johnson noise accompanying that demodulated data is strongly attenuated, presuming that those spectral components have reasonably uniform spectral distribution over the synchronous detector 100 baseband response. Most of the spectral energy in the synchronous detector 100 baseband response from any demodulation artifacts of an interfering co-channel NTSC analog television signal is also strongly attenuated. The demodulation artifacts from frequency components of the interfering co-channel NTSC analog television signal near its video carrier and in its upper sideband are especially attenuated. When the IF DTV signal carrier and oscillations from the DCO 102 are not in a phase-lock condition, the lowpass filter response from the AFC loop filter 118 will be predominately an I-channel beat signal. This I-channel beat signal is composed of the difference frequencies between the frequency of oscillations from the DCO 102 and frequencies of the IF DTV signal. The I-channel beat signal will be primarily at the difference frequency between the frequency of oscillations from the DCO 102 and the frequencies of the pilot component of the IF DTV signal. The polarity detector 119 generates a +1 multiplier input signal for the multiplier 117 at instants when the I-channel beat signal is zero-valued or positive. At instants when that I-channel beat signal is negative, the polarity detector 119 generates a +1 multiplier input signal for the multiplier 117. I.e., when the IF DTV signal carrier and oscillations from the DCO 102 are not in a phase-lock condition, so the I-channel beat signal is generated, the multiplier input signal for the multiplier 117 is a square wave with a fundamental frequency equal to the I-channel beat frequency signal and with a phase that is retarded in proportion to that fundamental frequency. The polarity detector 119 provides an amplitude-limiter type of operation which is usually "captured" by the I-channel beat signal being the strongest component of the lowpass filter response from the AFC loop filter 118.

When the IF DTV signal carrier and oscillations from the DCO 102 are not in a phase-lock condition, the synchronous detector 101 baseband response includes a Q-channel beat signal at the difference frequencies between the frequencies of the IF DTV signal pilot and oscillations from the DCO 102. The multiplier 117 operates as a mixer for the I-channel beat signal and the Q-channel beat signal generating a product signal that includes a zero-frequency component. The polarity of this zero-frequency component indicates whether the frequency of the pilot in the final IF DTV signal is above or below the frequency of oscillations from the DCO 102. The amplitude of this zero-frequency component is proportional to the frequency of the beat signal between the DCO 102 oscillations and the pilot in the final IF DTV signal. This zero-frequency component ramps the AFPC signal stored in the integrator in the AFPC loop filter 116 up or down in value, depending on the polarity of the zero-frequency component. This change in the AFPC signal adjusts the DCO 102 so the frequency of its oscillations draw closer to the frequency of the pilot in the IF DTV signal. Pull-in range is ±100 kHz, as set by the cut-off frequency of the lowpass AFC loop filter 118.

When the IF DTV signal carrier and oscillations from the DCO 102 come into the phase-lock condition, the demodulated pilot in the real component I of the complex baseband DTV signal supplied by the synchronous detector 100 becomes a zero-frequency component of constant polarity. This zero-frequency component of constant polarity is the principal component of the lowpass filter response from the AFC loop filter 118, and the polarity detector 119 responds to supply a constant-value multiplier input signal to the multiplier 117. Multiplicative mixing operation by the multiplier 117 is accordingly discontinued, and the multiplier 117 reproduces in its product output signal the quadrature component Q of the complex baseband DTV signal supplied by the synchronous detector 101. This product signal is supplied as the input signal to the AFPC loop filter 116 to complete a simple AFPC loop for controlling the DCO 102. This loop adjusts the phase of oscillations from the DCO 102 to be in prescribed relationship with the phase of the pilot signal in the IF DTV signal that is to be synchronously detected.

The Costas loop can lock to pilot carrier in either of two phases. In one lock-up condition the demodulated DTV signal from the synchronous detector 100 has a zero-frequency component of positive polarity owing to the synchronous detection of pilot. In the other lock-up condition the demodulated DTV signal from the synchronous detector 100 has a zero-frequency component of negative polarity owing to the synchronous detection of pilot. Although in actual practice the direct component of the demodulated DTV signal from the synchronous detector 100 is customarily removed before supplying it to the adaptive synchronous equalizer 105, it is desirable that the demodulated DTV signal invariably have a prescribed direction of modulation.

In the FIG. 25 modification of the FIG. 21 DTV receiver or the FIG. 24 DTV receiver the synchronous detector 100 is connected to supply the real component I of the complex baseband DTV signal to a multiplier 120 as a multiplicand input signal. The multiplier 120 is connected to receive the output signal of the polarity detector 119 as multiplier input signal. When the zero-frequency component in the demodulated DTV signal from the synchronous detector 100 has positive polarity, the polarity detector 119 supplies a +1 multiplier input signal to the multiplier 120. This conditions the multiplier 120 to reproduce in its product output signal the demodulated DTV signal from the synchronous detector 100. When the zero-frequency component in the demodulated DTV signal from the synchronous detector 100 has negative polarity, the polarity detector 119 supplies a −1 multiplier input signal to the multiplier 120. This conditions the multiplier 120 to produce as its product output signal an inverted response to the demodulated DTV signal from the synchronous detector 100. The product output signal supplied from the multiplier 120 has a prescribed sense of modulation and its zero-frequency pilot has a prescribed polarity. The multiplier 120 is connected to apply its product output signal as the input signal to the pilot suppression filter 104.

In the FIG. 25 modification of the FIG. 24 DTV receiver the synchronous detector 101 is connected to supply the quadrature component Q of the complex baseband DTV signal to a multiplier 121 as a multiplicand input signal. The multiplier 121 is connected to receive the output signal of the polarity detector 119 as multiplier input signal. When the zero-frequency component in the demodulated DTV signal from the synchronous detector 100 has positive polarity, the polarity detector 119 supplies a +1 multiplier input signal to the multiplier 121. This conditions the multiplier 121 to supply a product output signal that reproduces the demodulated DTV signal from the synchronous detector 101. When the zero-frequency component in the demodulated DTV signal from the synchronous detector 100 has negative polarity, the polarity detector 119 supplies a −1 multiplier input signal to the multiplier 121. This conditions the multiplier 121 to invert the polarity of demodulated DTV signal from the synchronous detector 101 in its product output signal. The multiplier 121 is connected to apply its product output signal as input signal to the pilot suppression filter 109.

Figure 26:
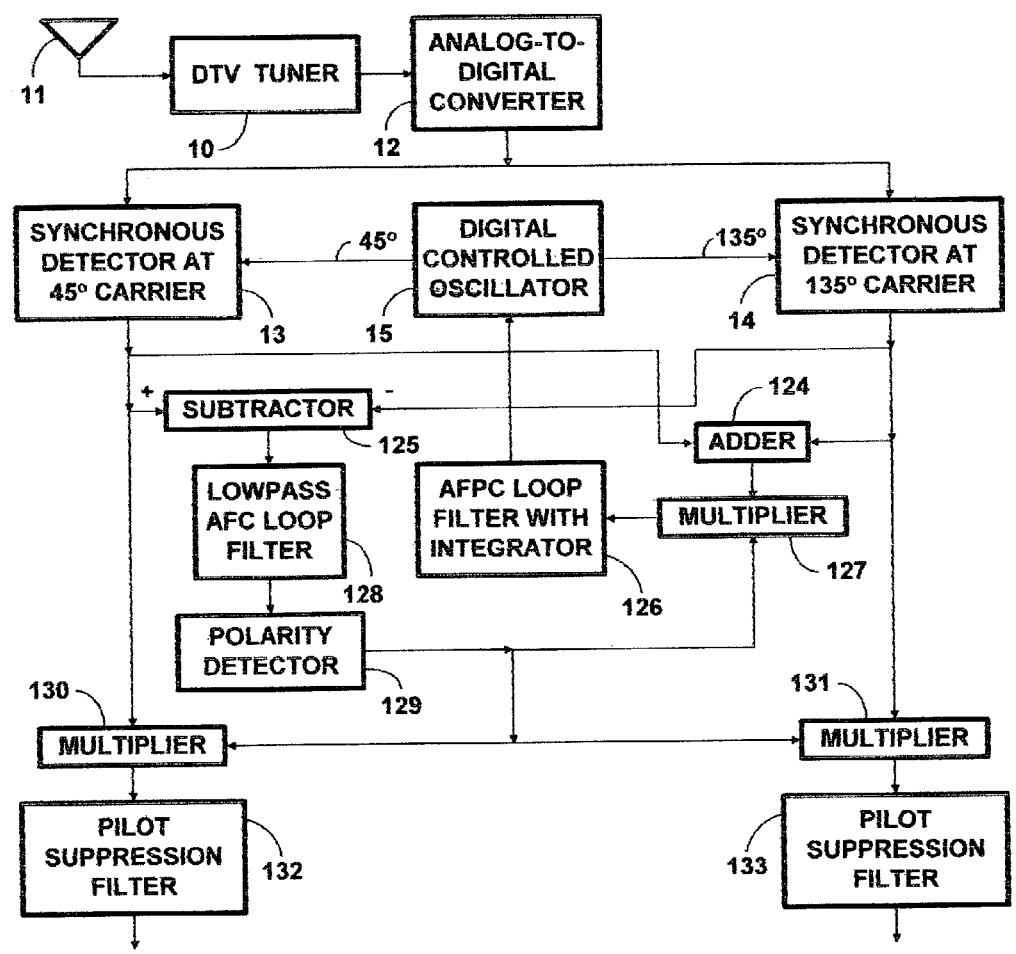
FIG. 26 is a schematic diagram showing how the FIG. 1 DTV receiver modified per

FIG. 26 shows how the FIG. 23 DTV receiver or the FIG. 24 DTV receiver is modified to use a Costas type of AFPC loop to develop AFPC signal for the DCO 15. In this modification a subtractor 125 is connected for receiving the output signal of the synchronous detector 13 as minuend input signal and for receiving the output signal of the synchronous detector 14 as subtrahend input signal. Responsive to these input signals the subtractor 125 develops a real component I signal with accompanying echoes as its difference output signal. An AFPC loop filter 126 with an integrator, a multiplier 127, a lowpass AFC loop filter 128 and a polarity detector 129 in the FIG. 26 Costas loop perform analogously to the AFPC loop filter 116 with an integrator, the multiplier 117, the lowpass AFC loop filter 118 and the polarity detector 119 in the FIG. 25 Costas loop.

In the FIG. 26 modification of the FIG. 23 or 24 DTV receiver the synchronous detector 13 is connected to supply demodulated DTV signal to a multiplier 130 as a multiplicand input signal. The multiplier 130 is connected to receive the output signal of the polarity detector 129 as multiplier input signal. The multiplier 130 supplies, as its product output signal, a baseband DTV signal that invariably has a prescribed direction of modulation no matter whether originally being demodulated at 45° or at 225°. The multiplier 130 product output signal is applied as input signal to the pilot suppression filter 132.

In the FIG. 26 modification of the FIG. 23 or 24 DTV receiver the synchronous detector 14 is connected to supply DTV signal to a multiplier 131 as a multiplicand input signal. The multiplier 131 is connected to receive the output signal of the polarity detector 129 as multiplier input signal. The multiplier 131 supplies, as its product output signal, a baseband DTV signal that invariably has a prescribed direction of modulation no matter whether originally being demodulated at 135° or at 315°. The multiplier 131 product output signal is applied as input signal to the pilot suppression filter 133.

The adaptive equalizers shown in FIG. 2, in FIG. 9, in FIGS. 12A and 12B, and in FIGS. 14A and 14B all employ transverse filters of the "inverse canonic" form in which the samples of equalizer input signal are weighted before being differentially delayed and then combined. There are alternative adaptive equalizer constructions that employ transverse filters of the "canonic" form in which the samples of equalizer input signal are differentially delayed before being weighted and then combined, which alternative constructions are used in further embodiments of the invention. Each of these farther embodiments of the invention requires separate digital delay structures for its FIR-filter and IIR-filter portions. In actual practice an equalizer embodying the invention is likely to use a small computer constructed within monolithic integrated circuitry for performing the adaptive transverse filtering, with equalizer input signal samples being stored in random-access memory (RAM) for a time to support that filtering. This loosens real-time processing constraints considerably—e.g., facilitating parallel processing so as to change the selection of principal signal within a data field rather than having to wait until the initial data segment of a data field.

While the computers 86, 416, 418, 496, 498, 499, 49G, 49H, 606, 608, 609, 60G and 60H for computing DFTs could be microcomputers, those skilled in the art of designing such computers will understand that other constructions are preferable. In part this is because frequency-domain data are never used except in term-by-term multiplication procedures, so there is no call for the onerous "bit-reverse step" in the computations involving DFTs. Furthermore, it is easy to implement multiple "butterflies" in hardware, with hard-wired sines and cosines for 32 butterflies, by way of example. Thus, a 4096-point DFT takes 2048/32=64 steps for the first pass, 32 steps for the second pass, 16 steps for the third pass, 8 steps for the fourth pass, 4 steps for the fifth pass, 2 steps for the sixth pass, and a single step for each of the seventh through twelfth passes, for a total of 132 total time steps. Supposing the clock is four times 10.76 MHz—i.e., 43 Mhz— in an inexpensive silicon implementation, the 132 steps for performing the 4096-point DFT take 3.1 microseconds. However, since the last 5 stages use less than half the butterflies, two pipelined DFT operations can be overlapped. Thus on average, each 4096-point transform takes, say, 2.5 microseconds. Sixteen DFTs in total are needed per block taking 2.5×16=40 microseconds to perform. There are also other steps including the divides, so the time for a complete calculation is approximately 60 microseconds. 2048 symbol epochs extend over about 200 microseconds. So, about 30% of the time for processing a 2048-symbol block is needed for the DFTs, leaving 70% of the time for the remainder of the calculations of equalizer coefficient updates. Pipelined DFT is commercially available, though DTV receiver designs will usually use custom integrated circuitry. Similarly, while the computers 419, 49B, 60B, 433 and 8B for computing I-DFTs could be microcomputers, those skilled in the art of designing such computers will understand that other constructions are preferable.

More extensive experience with the properties of these adaptive equalizers gained from computer simulations shows that how the time-domain responses of the FIR and IIR portions of the adaptive channel-equalization and echo-suppression filtering join affects how well some ensembles of echoes can be suppressed. The time-domain responses of the FIR and IIR portions of the adaptive filtering were originally conceived of as abutting each other at or shortly past the cursor component associated with the principal signal. Overlapping the time-domain responses of the FIR and IIR portions of the adaptive filtering can improve echo suppression, however, so simply abutting brick-wall time-domain responses of the FIR and IIR portions of the adaptive channel-equalization and echo-suppression filtering is not the optimal way to join these time-domain responses. These time-domain responses are better joined if the separation of the normalized CIR into portions for computing the IIR weighting coefficients for feedback filtering and for computing the FIR weighting coefficients for feed-forward filtering is done using digital filtering that exhibits a gradual cross-over. The cross-over stretches from a shorter-delayed post-echo term of the normalized CIR that can be suppressed by the IIR filtering to a longer-delayed post-echo term of the normalized CIR. Preferably, from the standpoint of reducing multiplications in the adaptive channel-equalization and echo-suppression filtering, the shorter-delayed post-echo term is the shortest-delayed post-echo term of the normalized CIR that can be suppressed by the IIR filtering. The cross-over can extend over as many as several tens of symbol epochs.

In the early development of the adaptation algorithms, the post-echo portion of the synthetic normalized CIR that was beyond the extent of the FIR filtering kernel was ignored in the generation of weighting coefficients, even though components of that post-echo portion might have significant energy, especially if there were not a gradual cross-over when separating the normalized CIR into portions for computing IIR weighting coefficients and for computing FIR weighting coefficients. Adaptation algorithms that are currently preferred do not ignore the post-echo terms of the synthetic normalized CIR that have significant energy, but are beyond the extent of the FIR filtering kernel. Instead, these post-echo terms are complemented and used to augment the weighting coefficients of the IIR-filtering. This completes the suppression of significant-energy post-echo terms that are generated by the FIR filtering suppressing preceding terms with delayed, scaled responses to equalizer input signal that is not echo-free. This procedure reduces the problems of equalization being satisfactory when post-echo terms of the synthetic normalized CIR have significant energy, but are beyond the extent of the FIR filtering kernel. Accordingly, the cross-over between the portions of the normalized CIR, respectively used for computing FIR weighting coefficients and for computing IIR weighting coefficients, does not need to extend over as many tens of symbol epochs.

The adaptation procedures described with reference to FIGS. 3 and 13 can be adapted for use with adaptive equalizers that use only FIR filtering. There is no IIR filtering, so no weighting coefficients are derived by complementing-post-echo terms of the normalized CIR. The normalized CIR is convolved with its entire self to synthesize the synthetic normalized CIR, and the echo terms of this synthetic normalized CIR are complemented to determine the array of weighting coefficients for the FIR filtering.

In the claims which follow, the definite article "the" is used for grammatical purposes other than for indicating antecedence. Where antecedence is intended in a claim, it is indicated by the adjective "said".

What is claimed is:

1. A method for adapting adjustable weighting coefficients of a feed-forward finite-impulse-response (FIR) digital filter that provides for performing at least a part of the channel-equalization and echo-suppression filtering of successive samples of a demodulation signal resulting from demodulation of an amplitude-modulation signal descriptive of digital symbols occurring at a baud rate, which demodulation signal is subject to being accompanied by unwanted echoes because of said amplitude-modulation signal being received via a channel that at times has more than one length of propagation path therethrough, which unwanted echoes are to be suppressed in successive baud-rate samples of a baseband response of said channel-equalization and echo-suppression filtering to said successive samples of said demodulation signal, said method comprising steps of:

initially measuring the echo content of samples of said demodulation signal to determine an initial channel impulse response (CIR) that characterizes the reception channel in the time-domain;

measuring reception error in said baseband response of said channel-equalization and echo-suppression filtering to said successive samples of said demodulation signal;

continuously updating the CIR responsive to said reception error;

periodically, normalizing the CIR with respect to the strength of a cursor component thereof to generate a normalized CIR;

convolving the normalized CIR with at least a portion thereof to generate a synthetic normalized CIR; and determining the weighting coefficients of said feed-forward FIR digital filter from corresponding terms of said synthetic normalized CIR.

2. The method set forth in claim 1, wherein said step of convolving the normalized CIR with at least a portion thereof to generate a synthetic normalized CIR is performed so as to convolve the normalized CIR with itself, so said feed-forward FIR digital filter provides for performing all of said channel-equalization and echo-suppression filtering.

3. The method set forth in claim 1, wherein said step of convolving the normalized CIR with at least a portion thereof to generate a synthetic normalized CIR is performed so as to convolve the normalized CIR with just the portion thereof consisting of pre-echo terms and short-delay post-echo terms, so said feed-forward FIR digital filter provides for performing only a part of said channel-equalization and echo-suppression filtering, said method further adapting adjustable weighting coefficients of an infinite-impulse-response (IIR) digital filter that provides for performing a further part of said channel-equalization and echo-suppression filtering, said further adapting being done by the further step of:

determining the weighting coefficients of said IIR digital filter from long-delay post-echo terms of said normalized CIR.

4. Channel-equalization and echo-suppression filtering apparatus connected for processing successive samples of a demodulation signal resulting from demodulation of an amplitude-modulation signal descriptive of digital symbols occurring at a baud rate, which demodulation signal is subject to being accompanied by unwanted echoes because of said amplitude-modulation signal being received via a channel that at times has more than one length of propagation path therethrough, which unwanted echoes are to be suppressed in successive baud-rate samples of a baseband response of said channel-equalization and echo-suppression filtering apparatus to said successive samples of said demodulation signal, said channel-equalization and echo-suppression filtering apparatus comprising:

adaptive digital transversal filtering apparatus with adjustable weighting coefficients, said adaptive digital transversal filtering apparatus connected for receiving as an input signal thereof said successive samples of said demodulation signal and for supplying an output signal from which is derived said response of said channel-equalization and echo-suppression filtering apparatus to said successive samples of said demodulation signal;

apparatus for determining an initial channel impulse response (CIR) that characterizes the reception channel in the time-domain;

apparatus for generating estimates of the digital modulation of the amplitude-modulation signal as originally transmitted;

a reception error detector connected for generating a reception error signal responsive to the amount by which the baseband response of said channel-equalization and echo-suppression filtering apparatus differs from estimates of the digital modulation of the amplitude-modulation signal at the transmitter thereof;

a filter coefficients computer connected for receiving said CIR and said reception error signal, operable for continually updating the CIR responsive to said reception error signal, operable for periodically normalizing the CIR with respect to a principal component thereof to generate a periodically-updated normalized CIR, operable for computing an update of the adjustable weighting coefficients of said adaptive digital transversal filtering apparatus from each periodically-updated normalized CIR.

5. The channel-equalization and echo-suppression filtering apparatus of claim 4, wherein said adaptive digital transversal filtering apparatus comprises:

apparatus for supplying said demodulation signal as a complex demodulation signal with orthogonal first and second components each sampled at twice baud rate, each of said orthogonal first and second components of said complex demodulation signal being supplied as even and odd sets of alternate samples occurring at baud rate an in temporal alignment with each other;

first, second, third and fourth adaptive filters of similar construction with respective sets of adjustable weighting coefficients that said filter coefficients computer adjusts in parallel, said first adaptive filter connected to respond to said odd set of alternate samples of said first component of said complex demodulation signal to generate a first adaptive filter response, said second adaptive filter connected to respond to said odd set of alternate samples of said second component of said complex demodulation signal to generate a second adaptive filter response, said third adaptive filter connected to respond to said even set of alternate samples of said first component of said complex demodulation signal to generate a third adaptive filter response, and said fourth adaptive filter connected to respond to said even set of alternate samples of said second component of said complex demodulation signal to generate a fourth adaptive filter response;

circuitry connected for supplying odd samples of I signal in a de-rotated response to said first adaptive filter response and said second adaptive filter response;

circuitry connected for supplying even samples of I signal in a de-rotated response to said third adaptive filter response and said fourth adaptive filter response; and a first symbol synchronizer connected for receiving said odd samples of I signal from said circuitry for supplying them, connected for receiving said even samples of I signal from said circuitry for supplying them, and connected for supplying optimally sampled baud-rate samples of I signal as said baseband response of said channel-equalization and echo-suppression filtering apparatus.

6. The channel-equalization and echo-suppression filtering apparatus of claim 5, wherein said adaptive digital transversal filtering apparatus includes:

first I-and-Q-extraction circuitry comprising, in addition to said circuitry connected for supplying odd samples of I signal, circuitry connected for supplying odd samples of Q signal in a de-rotated response to said first adaptive filter response and said second adaptive filter response;

second I-and-Q-extraction circuitry comprising, in addition to said circuitry connected for supplying even samples of I signal, circuitry connected for supplying even samples of Q signal in a de-rotated response to said third adaptive filter response and said fourth adaptive filter response; and a second symbol synchronizer connected for receiving said odd samples of Q signal from said circuitry for supplying them, connected for receiving said even samples of Q signal from said circuitry for supplying them, and connected for supplying optimally sampled baud-rate samples of Q signal as a further response of said channel-equalization and echo-suppression filtering, said further response being supplied for controlling the demodulation of said amplitude-modulation signal.

7. The channel-equalization and echo-suppression filtering apparatus of claim 5; wherein said first, second, third and fourth adaptive filters of similar construction each comprise a respective component FIR digital filter and a respective component IIR digital filter; wherein said filter coefficients computer is operable for computing the updates of the adjustable weighting coefficients of said component IIR digital filters from post-echo terms of said normalized CIR; wherein said filter coefficients computer is operable for convolving said normalized CIR with a portion of said normalized CIR consisting of its pre-echo terms to generate a synthetic normalized CIR; and wherein said filter coefficients computer is operable for computing the updates of the adjustable weighting coefficients of said component FIR digital filters from terms of said synthetic normalized CIR.

8. The channel-equalization and echo-suppression filtering apparatus of claim 5; wherein said first, second, third and fourth adaptive filters of similar construction each comprise a respective component FIR digital filter and a respective component IIR digital filter; wherein said filter coefficients computer is operable for computing the updates of the adjustable weighting coefficients of said component IIR digital filters from longer-delayed post-echo terms of said normalized CIR; wherein said filter coefficients computer is operable for convolving said normalized CIR with a portion of said normalized CIR consisting of its pre-echo and shorter-delayed post-echo terms to generate a synthetic normalized CIR; and wherein said filter coefficients computer is operable for computing the updates of the adjustable weighting coefficients of said component FIR digital filters from at least the pre-echo and shorter-delayed post-echo terms of said synthetic normalized CIR.

9. The channel-equalization and echo-suppression filtering apparatus of claim 5, wherein said first symbol synchronizer comprises:

I-signal interpolation circuitry for combining concurrent odd and even samples of said I signal as received by said first symbol synchronizer, said combining being done in a plurality of various $v$ and $(1-v)$ proportions to generate a plurality of respective I-signal interpolation results, where $v$ is a variable having a number of values from zero to one;

circuitry for detecting the departures of each of said plurality of respective I-signal interpolation results from estimates of transmitted symbols and determining respective averages of the absolute values of those departures of each of said plurality of respective I-signal interpolation results over a prescribed time interval; and I-signal selection circuitry for selecting one of the respective I-signal interpolation results that has the lowest of said respective averages to be said baseband response of said channel-equalization and echo-suppression filtering apparatus.

10. The channel-equalization and echo-suppression filtering apparatus of claim 9, wherein said adaptive digital transversal filtering apparatus includes:

first I-and-Q-extraction circuitry comprising, in addition to said circuitry connected for supplying odd samples of I signal, circuitry connected for supplying odd samples of Q signal in a de-rotated response to said first adaptive filter response and said second adaptive filter response;

second I-and-Q-extraction circuitry comprising, in addition to said circuitry connected for supplying even samples of I signal, circuitry connected for supplying even samples of Q signal in a de-rotated response to said third adaptive filter response and said fourth adaptive filter response;

Q-signal interpolation circuitry for combining concurrent ones of said odd and even samples of said Q signal, said combining being done in said plurality of various $v$ and $(1-v)$ proportions to generate a plurality of respective Q-signal interpolation results; and Q-signal selection circuitry for selecting, as a signal for controlling the demodulation of said amplitude-modulation signal, the respective Q-signal interpolation result that combines said odd and even samples of said Q signal in the same $v$ and $(1-v)$ proportion as the I-signal interpolation result that said I-signal selection circuitry selects as said response of said channel-equalization and echo-suppression filtering apparatus.

11. The channel-equalization and echo-suppression filtering apparatus of claim 4, wherein said adaptive digital transversal filtering apparatus comprises:

apparatus for supplying said demodulation signal as a complex demodulation signal with orthogonal first and second components each sampled at twice baud rate;

first and second adaptive filters of similar construction with respective sets of adjustable weighting coefficients that said filter coefficients computer adjusts in parallel, each said set of adjustable weighting coefficients being associated with kernel taps at two half-symbol-epochs spacing, the intervening kernel taps of said first and second adaptive filters being zero-valued, said first adaptive filter connected to respond to samples of said first component of said complex demodulation signal to generate a first adaptive filter response, said second adaptive filter connected to respond to samples of said second component of said complex demodulation signal to generate a second adaptive filter response;

first sample-separation circuitry for separating said first adaptive filter response into odd and even sets of alternate samples occurring at baud rate and being in temporal alignment with each other;

second sample-separation circuitry for separating said second adaptive filter response into odd and even sets of alternate samples occurring at baud rate and being in temporal alignment with each other;

circuitry connected for supplying odd samples of I signal in a de-rotated response to concurrent samples in the odd set of alternate samples of said first adaptive filter response and in the odd set of alternate samples of said second adaptive filter response;

circuitry connected for supplying even samples of I signal in a de-rotated response to concurrent samples in the even set of alternate samples of said first adaptive filter response and in the even set of alternate samples of said second adaptive filter response; and a first symbol synchronizer connected for receiving said odd samples of I signal from said circuitry for supplying them, connected for receiving said even samples of I signal from said circuitry for supplying them, and connected for supplying optimally sampled baud-rate samples of I signal as said baseband response of said channel-equalization and echo-suppression filtering apparatus.

12. The channel-equalization and echo-suppression filtering apparatus of claim 11, wherein said adaptive digital transversal filtering apparatus includes:

first I-and-Q-extraction circuitry comprising, in addition to said circuitry connected for supplying odd samples of I signal, circuitry connected for supplying odd samples of Q signal in a de-rotated response to concurrent odd samples of said first adaptive filter response and said second adaptive filter response;

second I-and-Q-extraction circuitry comprising, in addition to said circuitry connected for supplying even samples of I signal, circuitry connected for supplying even samples of Q signal in a de-rotated response to concurrent even samples of said first adaptive filter response and said second adaptive filter response;

a second symbol synchronizer connected for receiving said odd samples of Q signal from said circuitry for supplying them, connected for receiving said even samples of Q signal from said circuitry for supplying them, and connected for supplying optimally sampled baud-rate samples of Q signal as a further response of said channel-equalization and echo-suppression filtering apparatus, said further response being supplied for controlling the demodulation of said amplitude-modulation signal.

13. The channel-equalization and echo-suppression filtering apparatus of claim 11; wherein said first and second adaptive filters of similar construction each comprise a respective component FIR digital filter and a respective component IIR digital filter; wherein said filter coefficients computer is operable for computing the updates of the adjustable weighting coefficients of said component IIR digital filters from post-echo terms of said normalized CIR;

wherein said filter coefficients computer is operable for convolving said normalized CIR with a portion of said normalized CIR consisting of its pre-echo terms to generate a synthetic normalized CIR; and wherein said filter coefficients computer is operable for computing the updates of the adjustable weighting coefficients of said component FIR digital filters from terms of said synthetic normalized CIR.

14. The channel-equalization and echo-suppression filtering apparatus of claim 11; wherein said first and second adaptive filters of similar construction each comprise a respective component FIR digital filter and a respective component IIR digital filter; wherein said filter coefficients computer is operable for computing the updates of the adjustable weighting coefficients of said component IIR digital filters from longer-delayed post-echo terms of said normalized CIR; wherein said filter coefficients computer is operable for convolving said normalized CIR with a portion of said normalized CIR consisting of its pre-echo and shorter-delayed post-echo terms to generate a synthetic normalized CIR; and wherein said filter coefficients computer is operable for computing the updates of the adjustable weighting coefficients of said component FIR digital filters from at least the pre-echo and shorter-delayed post-echo terms of said synthetic normalized CIR.

15. The channel-equalization and echo-suppression filtering apparatus of claim 11, wherein said first symbol synchronizer comprises:

I-signal interpolation circuitry for combining concurrent odd and even samples of said I signal as received by said first symbol synchronizer, said combining being done in a plurality of various v and (1−v) proportions to generate a plurality of respective I-signal interpolation results, where v is a variable having a number of values from zero to one;

circuitry for detecting the departures of each of said plurality of respective I-signal interpolation results from estimates of transmitted symbols and determining respective averages of the absolute values of those departures of each of said plurality of respective I-signal interpolation results over a prescribed time interval; and I-signal selection circuitry for selecting one of the respective I-signal interpolation results that has the lowest of said respective averages to be said baseband response of said channel-equalization and echo-suppression filtering apparatus.

16. The channel-equalization and echo-suppression filtering apparatus of claim 15, wherein said adaptive digital transversal filtering apparatus includes:

first I-and-Q-extraction circuitry comprising, in addition to said circuitry connected for supplying odd samples of I signal, circuitry connected for supplying odd samples of Q signal in a de-rotated response to concurrent odd samples of said first adaptive filter response and said second adaptive filter response;

second I-and-Q-extraction circuitry comprising, in addition to said circuitry connected for supplying even samples of I signal, circuitry connected for supplying even samples of Q signal in a de-rotated response to concurrent even samples of said first adaptive filter response and said second adaptive filter response;

circuitry connected for supplying even samples of Q signal in a de-rotated response to said third adaptive filter response and said fourth adaptive filter response;

Q-signal interpolation circuitry for combining concurrent ones of said odd and even samples of said Q signal, said combining being done in said plurality of various v and (1−v) proportions to generate a plurality of respective Q-signal interpolation results; and Q-signal selection circuitry for selecting, as a signal for controlling the demodulation of said amplitude-modulation signal, the respective Q-signal interpolation result that combines said odd and even samples of said Q signal in the same v and (1−v) proportion as the I-signal interpolation result that said I-signal selection circuitry selects as said response of said channel-equalization and echo-suppression filtering apparatus.

17. The channel-equalization and echo-suppression filtering apparatus of claim 4; wherein said adaptive digital transversal filtering apparatus is connected for receiving as an input signal thereof said demodulation signal as a real-only signal supplied at twice baud rate; wherein the adjustable weighting coefficients of said adaptive digital transversal filtering apparatus are associated with kernel taps at two half-symbol-epochs spacing, the intervening kernel taps of said adaptive digital transversal filtering apparatus being zero-valued; and wherein there is further included:

sample-separation circuitry for separating said output signal of said adaptive digital transversal filtering into odd and even sets of alternate samples occurring at baud rate and being in temporal alignment with each other
into a set of odd alternate samples thereof and a set of even alternate samples thereof, the samples of each of said sets of alternate samples occurring at baud rate and being in temporal alignment with each other; and a symbol synchronizer connected for receiving said odd set of alternate samples of said output signal of said adaptive digital transversal filtering from said sample-separation circuitry that occur at baud rate, connected for receiving said even set of alternate samples of said output signal of said adaptive digital transversal filtering apparatus from said sample-separation circuitry, and connected for supplying optimally sampled baud-rate samples of said baseband response of said channel-equalization and echo-suppression filtering apparatus.

18. The channel-equalization and echo-suppression filtering apparatus of claim 17; wherein said adaptive digital transversal filtering apparatus comprises a component FIR digital filter and a component IIR digital filter; wherein said filter coefficients computer is operable for computing the updates of the adjustable weighting coefficients of said component IIR digital filter from post-echo terms of said normalized CIR; wherein said filter coefficients computer is operable for convolving said normalized CIR with a portion of said normalized CIR consisting of its pre-echo terms to generate a synthetic normalized CIR; and wherein said filter coefficients computer is operable for computing the updates of the adjustable weighting coefficients of said component FIR digital filter from terms of said synthetic normalized CIR.

19. The channel-equalization and echo-suppression filtering apparatus of claim 17; wherein said adaptive digital transversal filtering apparatus comprises a component FIR digital filter and a component IIR digital filter; wherein said filter coefficients computer is operable for computing the updates of the adjustable weighting coefficients of said component IIR digital filter from longer-delayed post-echo terms of said normalized CIR; wherein said filter coefficients computer is operable for convolving said normalized CIR with a portion of said normalized CIR consisting of its pre-echo and shorter-delayed post-echo terms to generate a synthetic normalized CIR; and wherein said filter coefficients computer is operable for computing the updates of the adjustable weighting coefficients of said component FIR digital filter from at least the pre-echo and shorter-delayed post-echo terms of said synthetic normalized CIR.

20. The channel-equalization and echo-suppression filtering apparatus of claim 17, wherein said symbol synchronizer comprises:

interpolation circuitry for combining concurrent samples from said odd and even sets of alternate samples of said output signal of said adaptive digital transversal filtering, said combining being done in a plurality of various v and (1−v) proportions to generate a plurality of respective interpolation results, where v is a variable having a number of values from zero to one;

circuitry for detecting the departures of each of said plurality of respective interpolation results from estimates of transmitted symbols and determining respective averages of the absolute values of those departures of each of said plurality of respective interpolation results over a prescribed time interval; and selection circuitry for selecting one of the respective interpolation results that has the lowest of said respective averages to be said baseband response of said channel-equalization and echo-suppression filtering apparatus.

* * * * *